(12) United States Patent
Pillai et al.

(10) Patent No.: US 12,217,155 B2
(45) Date of Patent: Feb. 4, 2025

(54) DEEP NEURAL NETWORK ARCHITECTURE USING PIECEWISE LINEAR APPROXIMATION

(71) Applicant: Intel Corporation, Santa Clara, CA (US)

(72) Inventors: Kamlesh Pillai, Bangalore (IN); Gurpreet S. Kalsi, Bangalore (IN); Amit Mishra, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/455,026

(22) Filed: Aug. 24, 2023

(65) Prior Publication Data

US 2024/0020518 A1    Jan. 18, 2024

Related U.S. Application Data

(63) Continuation of application No. 16/023,441, filed on Jun. 29, 2018, now Pat. No. 11,775,805.

(51) Int. Cl.
*G06N 3/048* (2023.01)
*G06F 7/499* (2006.01)
(Continued)

(52) U.S. Cl.
CPC ......... *G06N 3/048* (2023.01); *G06F 7/49957* (2013.01); *G06F 7/556* (2013.01);
(Continued)

(58) Field of Classification Search
CPC ...... G06N 3/04; G06N 3/0454; G06N 3/0481; G06N 3/063; G06N 3/084; G06N 3/0445;
(Continued)

(56) References Cited

U.S. PATENT DOCUMENTS 5,581,661 A * 12/1996 Wang ............... G06N 3/063
                                            706/43
5,796,925 A * 8/1998 Deville ............. G06N 3/048
                                            706/26

(Continued)

FOREIGN PATENT DOCUMENTS

| JP | H08504046 A | 4/1996 |
|---|---|---|
| KR | 100649111 B1 | 11/2006 |
| WO | 2017073000 A1 | 5/2017 |

OTHER PUBLICATIONS

Mishra, Amit, and Krishna Raj. "Implementation of a digital neuron with nonlinear activation function using piecewise linear approximation technique." 2007 International Conference on Microelectronics. IEEE, 2007: 1-4 (Year: 2007).*

(Continued)

*Primary Examiner* — Randall K. Baldwin
(74) *Attorney, Agent, or Firm* — Akona IP PC

(57) ABSTRACT

In one embodiment, an apparatus comprises a log circuit to: identify an input associated with a logarithm operation, wherein the logarithm operation is to be performed by the log circuit using piecewise linear approximation; identify a first range that the input falls within, wherein the first range is identified from a plurality of ranges associated with a plurality of piecewise linear approximation (PLA) equations for the logarithm operation, and wherein the first range corresponds to a first equation of the plurality of PLA equations; compute a result of the first equation based on a plurality of operands associated with the first equation; and return an output associated with the logarithm operation, wherein the output is generated based at least in part on the result of the first equation.

20 Claims, 27 Drawing Sheets

(51) Int. Cl.
*G06F 7/556* (2006.01)
*G06F 17/11* (2006.01)
*G06F 17/17* (2006.01)
*G06N 3/044* (2023.01)
*G06N 3/045* (2023.01)
*G06N 3/063* (2023.01)
*G06N 3/084* (2023.01)

(52) U.S. Cl.
CPC .............. *G06F 17/11* (2013.01); *G06F 17/17* (2013.01); *G06N 3/045* (2023.01); *G06N 3/063* (2013.01); *G06N 3/084* (2013.01); *G06N 3/044* (2023.01)

(58) Field of Classification Search
CPC ...... G06F 7/49957; G06F 7/556; G06F 17/11; G06F 17/17
See application file for complete search history.

(56) References Cited

U.S. PATENT DOCUMENTS

| | | | | |
|---|---|---|---|---|
| 11,775,805 | B2* | 10/2023 | Pillai | G06F 17/11 706/25 |
| 2003/0220953 | A1* | 11/2003 | Allred | G06F 1/0307 708/277 |
| 2004/0267854 | A1* | 12/2004 | Haider | G06F 7/556 708/512 |
| 2016/0026912 | A1* | 1/2016 | Falcon | G06N 3/045 706/25 |
| 2016/0380653 | A1* | 12/2016 | Sheikh | H04B 1/0475 370/282 |
| 2017/0011288 | A1* | 1/2017 | Brothers | G06F 9/30036 |
| 2018/0189651 | A1* | 7/2018 | Henry | G06N 3/044 |
| 2018/0373977 | A1* | 12/2018 | Carbon | G06N 3/048 |

OTHER PUBLICATIONS

Jin, Zhanpeng. Autonomously reconfigurable artificial neural network on a chip. University of Pittsburgh, 2010: i-230 (Year: 2010).*
Sheikh, Farhana, et al. "A 2.05 GVertices/s 151 mW lighting accelerator for 3D graphics vertex and pixel shading in 32 nm CMOS." IEEE journal of solid-state circuits 48.1 (2012): 128-139. (Year: 2012).*
Eldridge, Schuyler, et al. "Neural network-based accelerators for transcendental function approximation." Proceedings of the 24th edition of the great lakes symposium on VLSI. 2014: 169-174 (Year: 2014).*
Avramović, Aleksej, et al. "An approximate logarithmic squaring circuit with error compensation for DSP applications." Microelectronics Journal 45.3 (2014): 263-271. (Year: 2014).*
Altaf, Muhammad Awais Bin, and Jerald Yoo. "A 1.83 muJ/classification, 8-channel, patient-specific epileptic seizure classification SoC using a non-linear support vector machine." IEEE Transactions on Biomedical Circuits and Systems 10.1 (2015): 49-60. (Year: 2015).*
Trinh, Hong-Phuc, Marc Duranton, and Michel Paindavoine. "Efficient data encoding for convolutional neural network application." ACM Transactions on Architecture and Code Optimization (TACO) 11.4 (2015): 1-21. (Year: 2015).*
Bhanja, Mousumi, and Baidya Nath Ray. "OTA-based logarithmic circuit for arbitrary input signal and its application." IEEE Transactions on Very Large Scale Integration (VLSI) Systems 24.2 (2015): 638-649. (Year: 2015).*
Ramachandran, Prajit, Barret Zoph, and Quoc V. Le. "Searching for activation functions." arXiv preprint arXiv:1710.05941 (2017): 1-13. (Year: 2017).*
Ramachandran, Prajit, Barret Zoph, and Quoc V. Le. "Swish: a self-gated activation function." arXiv preprint arXiv:1710.05941 7 (2017): 1-12 (Year: 2017).*
Alcaide, Eric. "E-swish: Adjusting activations to different network depths." arXiv preprint arXiv:1801.07145 (Jan. 2018): 1-13 (Year: 2018).*
Ortiz, Marc, et al. "Low-precision floating-point schemes for neural network training." arXiv preprint arXiv:1804.05267 (Apr. 2018). (Year: 2018).*

* cited by examiner

DEEP NEURAL NETWORK ARCHITECTURE USING PIECEWISE LINEAR APPROXIMATION

CROSS-REFERENCE TO RELATED APPLICATION

This application is a continuation of (and claims the benefit of priority to) U.S. application Ser. No. 16/023,441, filed Jun. 29, 2018, entitled "DEEP NEURAL NETWORK ARCHITECTURE USING PIECEWISE LINEAR APPROXIMATION," the disclosure of which is considered part of, and is incorporated by reference in, the disclosure of this application.

FIELD OF THE SPECIFICATION

This disclosure relates in general to the field of computer architecture and design, and more particularly, though not exclusively, to a processing architecture for deep neural networks (DNNs).

BACKGROUND

Due to the continuously increasing number of deep learning applications that are being developed for many different use cases, there is a strong demand for specialized hardware designed for deep neural networks (DNNs). For example, DNNs typically require a substantial amount of real-time processing, which often involves multiple layers of complex operations on floating-point numbers, such as convolution layers, pooling layers, fully connected layers, and so forth. Existing hardware solutions for DNNs suffer from various limitations, however, including heavy power consumption, high latency, significant silicon area requirements, and so forth.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
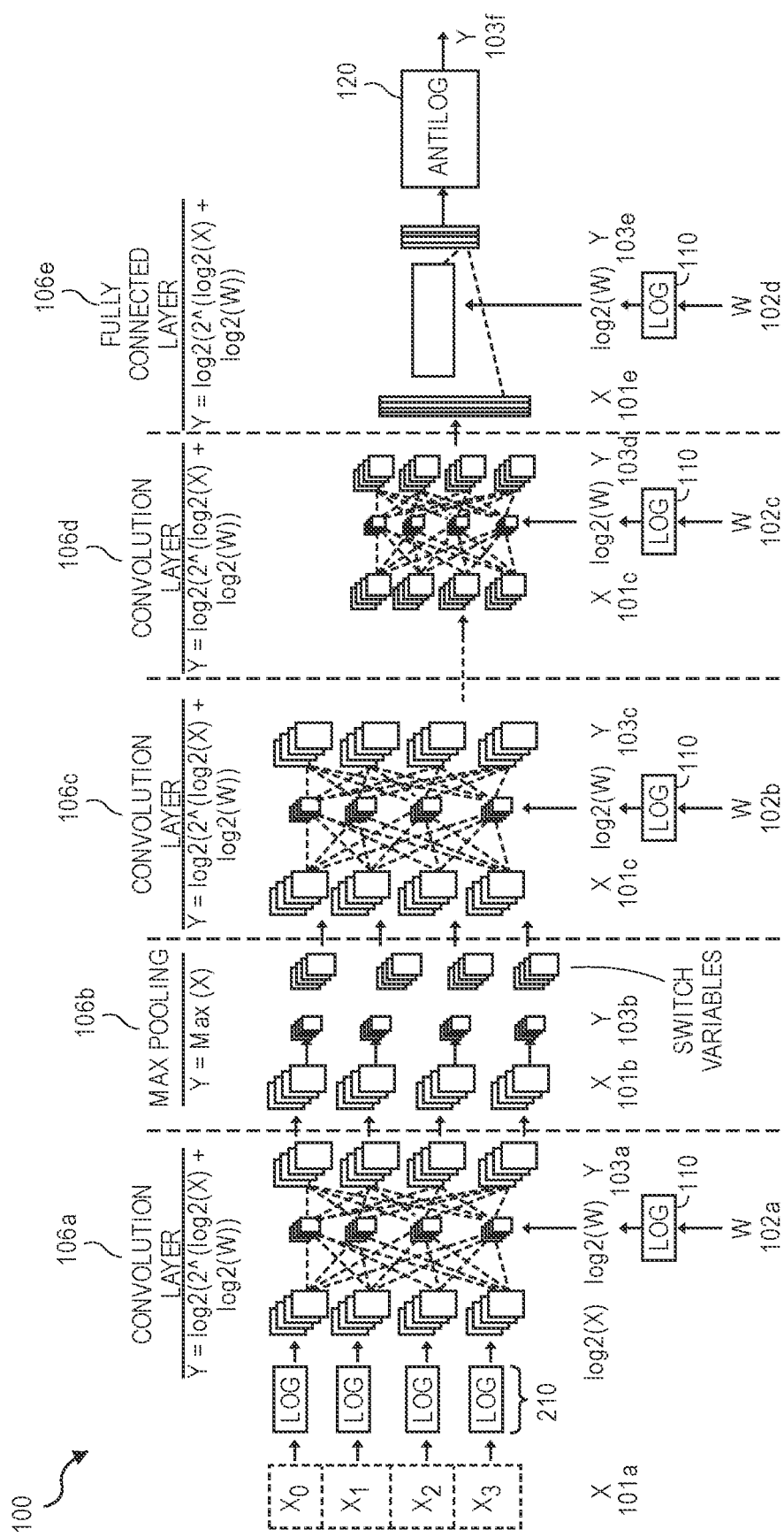
FIG. 1 illustrates an example embodiment of a deep neural network (DNN) implemented using log and antilog piecewise linear approximation circuits.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Deep Neural Network (DNN) Inference Using Log/Antilog Piecewise Linear Approximation Circuits Due to the continuously increasing number of artificial intelligence applications that rely on machine learning (e.g., deep learning), there is a strong demand for specialized hardware that is designed for implementing artificial neural networks (e.g., deep neural networks, convolutional neural networks, feedforward neural networks, recurrent neural networks, and so forth). Low-power, low-area, and high-speed hardware is ideal for deep learning applications.

In particular, artificial neural networks, such as deep neural networks (DNNs), are implemented using multiple layers of processing nodes or "neurons," such as convolution layers, pooling layers, fully connected layers, and so forth. The nodes in each layer perform computations on a collection of inputs and associated weights (typically represented as vectors) to generate outputs, which are then used as inputs to the nodes in the next layer. The computations performed by nodes in each layer typically involve transformations of the inputs based on the associated weights, along with activation functions that are used to determine whether each node should be "activated." Further, the layers are typically repeated in this manner based on the requirements of a particular application in order to reach the global minima.

Moreover, state-of-the-art DNNs are typically implemented using operations on numeric values that are represented using single-precision (32-bit) floating-point format. DNN inference generally requires a significant volume of real-time processing on these floating-point numbers, as it involves multiple layers of complex operations, such as convolution layers, pooling layers, fully connected layers, and so forth. Further, because these complex operations often involve multiplications, floating-point multipliers are one of the key components in existing DNN solutions. Floating-point multipliers, however, are extremely costly in terms of power consumption, silicon area, and latency. Further, while lookup tables (LUTs) may be used to simplify DNN operations in some cases, LUTs similarly require costly silicon area.

Accordingly, in some cases, DNN optimization techniques may be leveraged in order to improve performance and/or reduce the requisite silicon area of hardware used for implementing DNNs and other types of artificial neural networks. These DNN optimization techniques, however, typically focus on reducing the cost of operations by reducing the overall precision and/or reducing the number of underlying operations (e.g., limiting the number of convolution layers, pooling layers, and so forth). In some embodiments, for example, hardware used for implementing DNNs may be designed to operate on floating-point representations that have fewer bits and thus provide less precision (e.g., from 8-bit quantized floating-point to 16-bit fixed-point representations). The use of lower-precision floating-point representations, however, results in an unacceptable accuracy loss in some cases, particularly for larger datasets. Moreover, DNN optimization techniques that reduce the number of underlying operations or layers may have adverse effects, such as poor convergence time for reaching the global minima during DNN training. Further, because these various optimizations still require floating-point multipliers, they still suffer from the power, area, and performance limitations of multiplier circuits.

In some cases, DNNs may be implemented using circuitry that performs logarithm, antilogarithm, and/or exponent calculations using lookup tables (LUTs) in order to mitigate the requirements of multiplier circuitry. In some embodiments, for example, the parabolic curve of a log, antilog, and/or exponent operation may be divided into multiple segments, a curve fitting algorithm may be used to precompute the values of the respective coefficients, and the pre-computed coefficients may then be stored in a lookup table implemented using a memory component (e.g., ROM). In this manner, in order to compute $ax^2+bx+c$ for any point on the curve, the values of coefficients a, b, and c are first fetched from the lookup table, and the result is then calculated using multipliers and adders. This approach requires significant silicon area for the associated LUTs and multipliers, however, and it may also consume multiple clock cycles (e.g., 5-8 clock cycles) in order to compute the above equation.

Accordingly, this disclosure describes various embodiments of hardware that can perform DNN computations efficiently without depending on lookup tables and/or multipliers. Example embodiments that may be used to implement the features and functionality of this disclosure will now be described with more particular reference to the attached FIGURES.

FIG. 1 illustrates an example embodiment of a deep neural network (DNN) 100 implemented using log and antilog piecewise linear approximation circuits. In the illustrated example, DNN 100 is implemented using multiple layers 106*a-e*, including a first convolution layer 106*a*, a max pooling layer 106*b*, a second convolution layer 106*c*, a third convolution layer 106*d*, and a fully connected layer 106*e*. Moreover, DNN 100 is implemented using a multiplier-free neural network microarchitecture, which uses log and antilog circuits 110, 120 rather than multiplier circuits in order to perform computations for the respective DNN layers 106*a-e*. In particular, the log and antilog circuits 110, 120 perform log base 2 ($\log_2$) and antilog base 2 ($\text{antilog}_2$) calculations, which can be leveraged to convert the multiplication operations that are typically required in certain DNN layers 106 into addition. Further, the log and antilog circuits 110, 120 use piecewise linear approximation to perform the loge and antilog$_2$ calculations, which enables each calculation to be performed in a single clock cycle and without the use of lookup tables or multipliers. In this manner, the illustrated embodiment reduces DNN processing latency while also eliminating the need for multiplier circuitry and lookup tables, which significantly reduces the requisite silicon area of the hardware. Example implementations of the log 110 and antilog 120 circuits are further illustrated and described in connection with FIGS. 5A-C and 6A-C.

As an example, with respect to the convolution layer(s) of a DNN (e.g., layers 106*a,c,d* of DNN 100), convolution can generally be represented by the following equation (where f(n) and g(n) are floating-point vectors):

$$(f*g)(n) = \sum_{k=-inf}^{+inf} f(k)g(n-k)$$

In this equation, each summation term is computed using multiplication. If loge is taken on both sides of the equation, however, the equation becomes:

$$\log_2(f*g)(n) = \log_2 \Sigma_{k=-inf}^{+inf} f(k)g(n-k)$$

Further, if the left side of the equation is defined as y(n), meaning $\log_2(f*g)(n)=y(n)$, the equation then becomes:

$$y(n) = \log_2 \sum_{k=-inf}^{+inf} f(k)g(n-k)$$

The above equation no longer serves the purpose of convolution, however, as convolution cannot be performed by accumulating the results of loge calculations. Accordingly, antilog$_2$ must be taken on each summation term before it is accumulated (e.g., in order to convert each summation term from the loge domain back to the original domain):

$$y(n) = \sum_{k=-inf}^{+inf} 2^{\log_2(f(k))+\log_2(g(n-k))}$$

In this alternative equation for convolution, each summation term is now computed using addition. Thus, while the original convolution equation shown above requires multiplication to compute each summation term, this alternative convolution equation requires addition rather than multiplication. Accordingly, this alternative equation essentially leverages $\log_2$ (and antilog$_2$) operations to convert the multiplications required by the original convolution equation into additions. For example, since f(n) and g(n) in the convolution equation are floating-point numbers (e.g., IEEE-754 single-precision floating-point numbers), $\log_2$ and antilog$_2$ are taken on the mantissa bits, while the exponent and sign bits are handled separately, as discussed further in connection with FIGS. 5A-C and 6A-C. In this manner, the log and antilog circuitry 110, 120 can be used to perform convolution using this alternative equation instead of the original equation in order to avoid complex floating-point multiplication operations.

As another example, a fully connected layer (e.g., layer 106*e* of DNN 100) is the last layer of a DNN and is responsible for performing the final reasoning and decision making. In general, a fully connected layer is similar to a convolution layer, but typically involves single-dimension vectors. Accordingly, a fully connected layer can leverage loge calculations in a similar manner as a convolution layer in order to convert multiplication operations into addition. However, because a fully connected layer is the last layer of a DNN, the final outputs should be in the normal domain rather than the $\log_2$ domain.

To illustrate, a fully connected layer can generally be represented using the following equation:

$$(f_{fcl} * g_{fcl})(n) = \sum_{k=-inf}^{+inf} f(k)_{fcl} g(n-k)_{fcl}$$

As with convolution, $\log_2$ can be taken on both sides of the equation in order to convert the multiplication into addition in the summation terms. After taking $\log_2$ on both sides of the equation, and further substituting the left side of the equation with $y_{fci}$ the resulting equation becomes:

$$y_{fcl} = \sum_{k=-inf}^{+inf} \log_2(f(k))_{fcl} + \log_2(g(n-k))_{fcl}$$

Antilog$_2$ can then be taken on the respective summation terms before they are accumulated, thus converting them from the $\log_2$ domain back to the normal domain:

$$y_{fcl} = \sum_{k=-inf}^{+inf} 2^{\log_2(f(k))_{fcl} + \log_2(g(n-k))_{fcl}}$$

In this manner, the final outputs of the fully connected layer are in the normal domain rather than the $\log_2$ domain. Further, the multiplications required by the original equation have been converted into additions in this alternative equation.

In the illustrated embodiment, for example, DNN 100 is implemented using multiple layers 106a-e, including a first convolution layer 106a, a max pooling layer 106b, a second convolution layer 106c, a third convolution layer 106d, and a fully connected layer 106e. Each layer 106a-e performs computations using an input (X) 101a-e, along with a weight vector (W) 102a-d in certain layers, and produces a corresponding output (Y) 103a-f. Moreover, an initial input vector (X) 101a is fed into the first layer 106a of DNN 100, while each remaining layer 106b-e is fed with the output (Y) 103a-d of the preceding layer as its input (X) 101b-e.

Further, log and antilog circuits 110, 120 implemented using piecewise linear approximation are leveraged to perform the computations at each layer 106 of DNN 100, thus eliminating the need for multiplier circuits and lookup tables, while also reducing latency. For example, the log circuitry 110 performs loge calculations in order to convert floating-point numbers into fixed-point numbers, which enables complex operations such as floating-point multiplications to be converted into fixed-point additions, and the antilog circuitry 120 performs antilog$_2$ calculations in order to subsequently convert fixed-point numbers back to floating-point numbers. Moreover, the log and antilog circuits 110, 120 use piecewise linear approximation to perform the respective log$_2$ and antilog$_2$ calculations, which enables each calculation to be performed in a single clock cycle.

In the illustrated embodiment, for example, log circuitry 110 is used to convert the original input vector (X) 101a and each weight vector (W) 103a-d into the log$_2$ domain before they are fed into DNN 100, while antilog circuitry 120 is used to convert the final output (Y) 103f of the fully connected layer 106e back to the normal domain from the log$_2$ domain. Further, additional antilog$_2$ and log$_2$ operations (not shown) are also performed throughout the hidden layers of DNN 100 (e.g., the intermediate layers between the input and output layers) in order to convert between the log$_2$ domain and the normal domain, as necessary. For example, as explained above, a convolution layer requires each summation term to be converted back to the normal domain before it is accumulated, and thus an anitlog$_2$ operation must be performed before accumulating each summation term. The final output of a hidden layer is subsequently converted back to the log$_2$ domain before being provided to the next layer, however, in order to continue avoiding multiplication operations in subsequent layers.

For example, the result of each hidden layer node is typically passed to an activation function that determines whether the node should be "activated," and the output of the activation function is then fed as input to the next layer. Accordingly, in order to avoid multiplication operations in the next layer, log$_2$ of the activation function of a hidden layer node is supplied to the next layer. For example, after a hidden layer node performs antilog$_2$ operations for the purpose of computing a convolution component, the result is converted back to the log$_2$ domain before being passed to the activation function. In this manner, the output (Y) computed by each hidden layer node is already in the log$_2$ domain when it is provided as input (X) to the next layer.

Accordingly, the illustrated embodiment provides numerous advantages, including low latency, high precision, and reduced power consumption using a flexible, low-area hardware design that is highly scalable and portable. For example, in the illustrated embodiment, DNN 100 is implemented using log and antilog circuits 110, 120 that perform log$_2$ and antilog$_2$ calculations using piecewise linear approximation, which eliminates the need for multiplier circuits and lookup tables in the hardware design. In this manner, the illustrated embodiment significantly reduces the requisite silicon area (e.g., by eliminating multipliers and lookup tables), power consumption, and latency of the hardware, yet still provides high precision. In particular, the proposed microarchitecture performs each log$_2$ and antilog$_2$ calculation in a single clock cycle, which decreases the delay through the datapath and thus decreases the overall latency of the hardware.

The proposed microarchitecture is also highly scalable. In particular, the flexible implementation of the proposed microarchitecture allows the hardware to be replicated as needed in order to increase the number of supported parallel operations. For example, the proposed microarchitecture may be implemented using any number of log and antilog circuit(s) 110, 120. In this manner, the proposed microarchitecture can be easily scaled to support the number of parallel operations required by a particular application or use case. The precision of the proposed microarchitecture can also be scaled based on application requirements. For example, if an application demands greater precision, the number of segments in the piecewise linear approximation model used by the log and antilog circuitry 110, 120 can be increased to accommodate the precision requirements. In this manner, the proposed microarchitecture is also highly portable, as it can be easily ported and/or scaled for any product or form factor, including mobile devices (e.g., handheld or wearable devices), drones, servers, and/or any other artificial intelligence solutions that require DNN operations without any dependencies or modifications.

DNN Activation Function Circuit Using Piecewise Linear Approximation

Due to the continuously increasing number of products designed with artificial intelligence (AI) capabilities, there is a strong demand for specialized hardware capable of accelerating fundamental AI operations (e.g., neural network activation functions), while also remaining generic enough to support a variety of different implementations and associated algorithms, particularly for resource-constrained form factors (e.g., small, low-power edge devices).

In particular, the rising popularity of AI solutions that rely on machine learning (e.g., deep learning) has led to a demand for hardware acceleration designed for artificial neural networks (e.g., deep neural networks, convolutional neural networks, feedforward neural networks, recurrent neural networks, and so forth). For example, a deep neural network (DNN) is implemented using multiple layers of "artificial neurons," which are typically processing nodes that use non-linear activation functions to determine whether they should each "activate" in response to a particular input. An activation function, for example, is a function that typically maps an input to an output using a non-linear transformation in order to determine whether a particular processing node or "artificial neuron" should activate. The use of activation functions is an important aspect of DNNs, but it can also be very computationally-intensive.

There are many different types of activation functions that can be used in the implementation of a DNN, including Sigmoid, Hyperbolic Tangent (Tanh), Rectified Linear Unit (ReLU), Leaky ReLU, and Swish, among other examples. The choice of activation function(s) has a significant impact on the training dynamics and task performance of a DNN. Thus, in some cases, a DNN may be implemented using multiple activation functions within a single neural network in order to increase training dynamics and performance. DNN compute engines may also rely on specialized hardware for implementing these activation functions, which typically occupies a decent amount of area on silicon. For example, hardware designed for state-of-the-art DNNs typically operates on single-precision (32-bit) floating-point numbers and uses a lookup table (LUT) approach to implement activation functions. The use of a lookup table (LUT) approach for activation functions, however, increases silicon area, power consumption, and latency, which each continue to grow as the number of neurons in a DNN increases. Moreover, because each activation function requires its own lookup table, the use of multiple activation functions in a single DNN increases the requisite number of lookup tables, thus further impacting silicon area, power, and latency.

As an example, using a lookup table approach, the curve of an activation function is typically bounded between an interval [--, m] (where 'm' is a real number), and the bounded curve may then be divided into multiple segments. A curve fitting algorithm may then be used to pre-compute the values of the respective coefficients, and the pre-computed coefficients may then be stored in a lookup table implemented using a memory component (e.g., ROM). In this manner, in order to compute $ax^2+bx+c$ for any point on the curve, the values of coefficients a, b, and c are first fetched from the lookup table, and the result is then calculated using multipliers and adders. This approach requires significant silicon area for the associated lookup tables and multipliers, however, and it may also consume multiple clock cycles (e.g., 5-8 clock cycles) in order to compute the above equation.

To illustrate, a bounded curve over the interval [−3, 3] that is divided into 256 uniform segments with a 64-bit coefficient width (a: 20 bits, b: 20 bits, c: 24 bits) produces 21-bit mantissa precision for IEEE-754 single-precision floating-point numbers. In certain embodiments, this approach requires a 256×64 ROM and a compute block which respectively comprise 41,853 and 5,574 synthesis gates (e.g., NAND equivalent gates). Scaling down this hardware with less precision (e.g., 12-bit or 10-bit precision) will only save ROM area. In certain embodiments, for example, the estimated silicon area required for the Sigmoid activation function with 10-bit precision is 17,120 synthesis gates. Moreover, this area must be further replicated or instantiated based on the number of parallel operations that the hardware is required to support.

Thus, existing hardware used to implement DNN activation functions (e.g., hardware implemented using lookup tables) has various drawbacks, including costly silicon area requirements, poor power consumption, and high processing latency, among other examples. These drawbacks are further magnified as the hardware is scaled, such as by increasing the number of artificial neurons, parallel operations, and/or activation functions. Further, there are no unified hardware solutions that can implement multiple activation functions without using separate hardware blocks and/or lookup tables for each activation function.

Accordingly, this disclosure describes various embodiments of a unified hardware solution that supports multiple DNN activation functions without using lookup tables, as described further below.

Figure 2A:
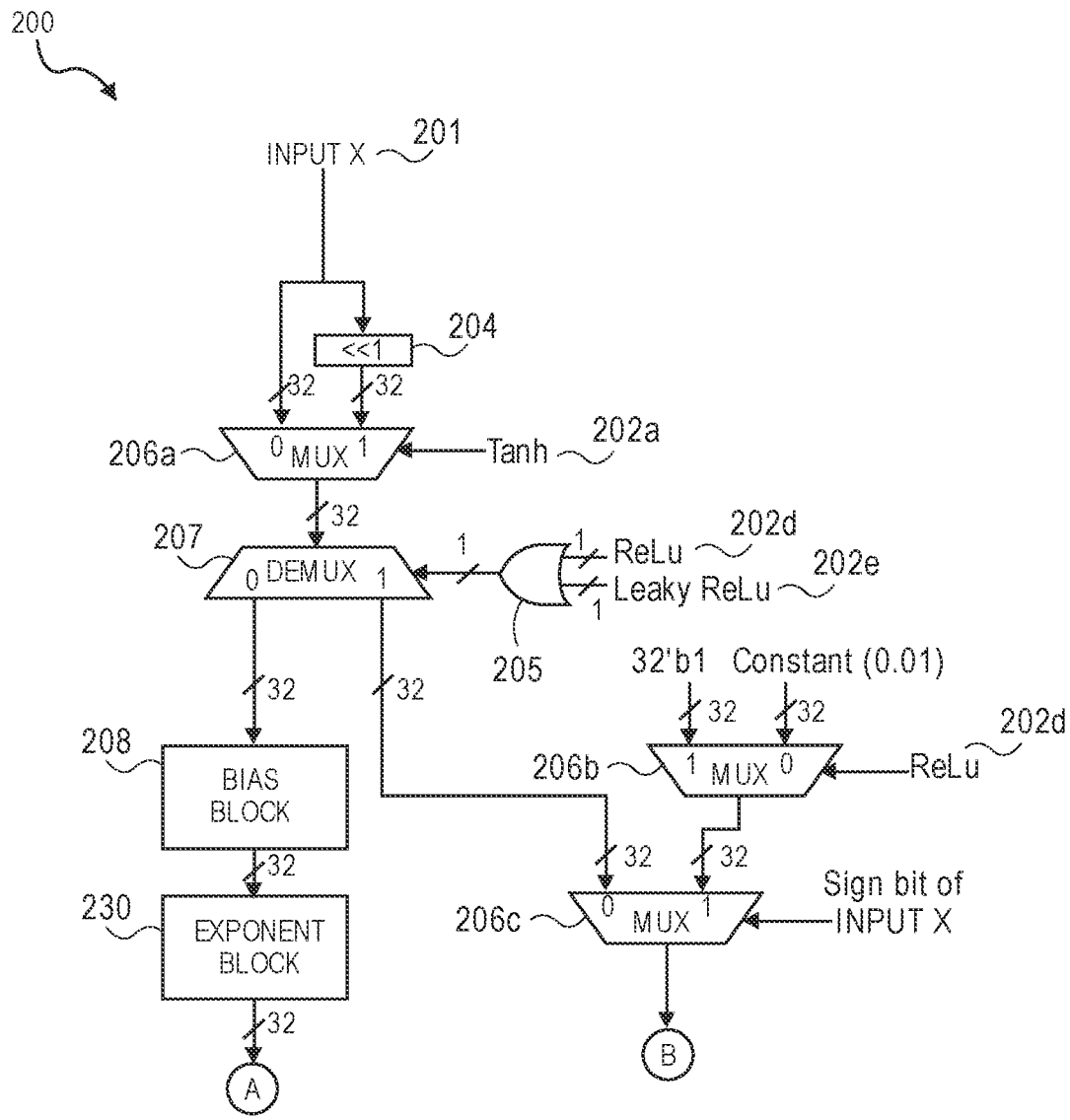
FIGS. 2A-B illustrate an example embodiment of a unified activation function circuit for deep neural networks (DNNs).
Figure 2B:
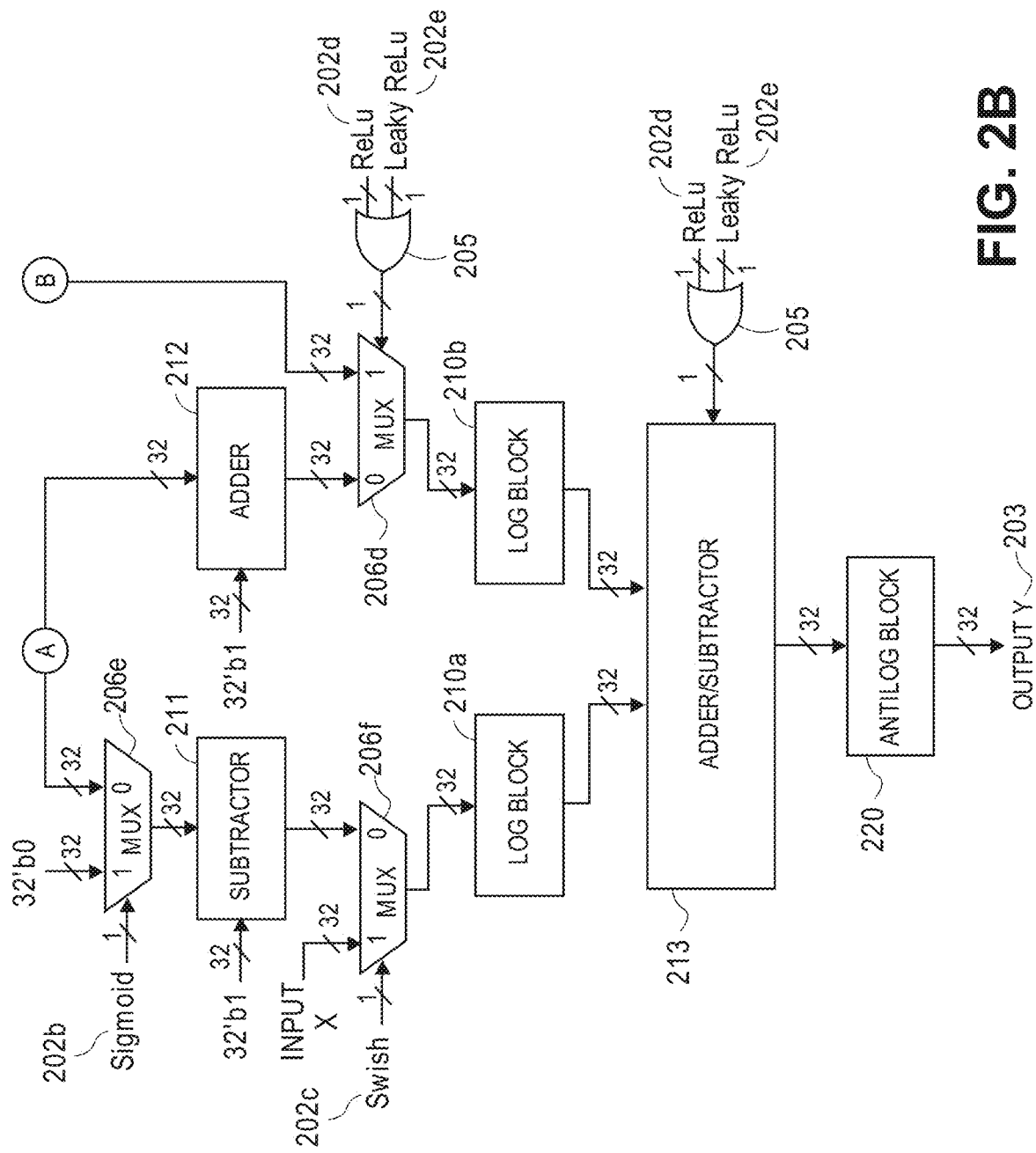

FIGS. 2A-B illustrate an example embodiment of a unified activation function (AF) circuit 200 for artificial neural networks (e.g., deep neural networks (DNNs)). In particular, AF circuit 200 provides support for multiple DNN activation functions on a single hardware component without depending on lookup tables.

In the illustrated embodiment, for example, AF circuit 200 implements the respective activation functions using a novel algorithm that leverages exponent, log base 2 ($\log_2$), and antilog base 2 ($antilog_2$) calculations, which are implemented using piecewise linear approximation, in order to simply the requisite computations for each activation function. For example, many activation functions are non-linear functions that involve complex exponent, division, and/or multiplication operations, which are typically implemented using costly multiplier circuitry (e.g., division may be implemented using multiplier circuitry that multiplies the numerator by the inverse of the denominator). AF circuit 200, however, leverages $\log_2$ and $antilog_2$ calculations in order to eliminate complex division and/or multiplication operations required by certain activation functions and instead convert them into subtraction and/or addition. Further, AF circuit 200 implements exponent, $\log_2$, and $antilog_2$ calculations using piecewise linear approximation in order to further simplify the requisite computations required by activation functions. As a result, $\log_2$ and $antilog_2$ calculations can be performed in a single clock cycle, while exponent calculations can be performed in two clock cycles. In this manner, an activation function can be computed in only five clock cycles, and the underlying computations can easily be pipelined in order to increase throughput. Accordingly, AF circuit 200 leverages the $\log_2$, $antilog_2$, and exponent calculations implemented using piecewise linear approximation to simplify the underlying computations for an activation function, which eliminates the need for lookup tables, reduces the multiplier circuitry requirements, and reduces the overall latency of an activation function. This approach translates directly into significant savings of silicon area (e.g., due to the elimination of lookup tables and reduced multiplier circuitry), as it requires a much smaller number of synthesis gates compared to a typical lookup table approach with similar precision.

In the illustrated embodiment, for example, AF circuit 200 includes log, antilog, and exponent blocks 210, 220, 230 for performing the respective $\log_2$, $\text{antilog}_2$, and exponent calculations using piecewise linear approximation. In some embodiments, for example, log, antilog, and exponent blocks 210, 220, 230 may be implemented using 16-segment piecewise linear approximation, with 12-bit precision in the mantissa of an IEEE-754 single-precision floating-point number (i.e., 1 sign bit+8 exponent bits+12 mantissa bits=21-bit precision). Example implementations of log, antilog, and exponent blocks 210, 220, 230 are further illustrated and described in connection with FIGS. 5A-C, 6A-C, and 7.

AF circuit 200 is a configurable circuit that supports the following activation functions: Sigmoid, Hyperbolic Tangent (Tanh), Rectified Linear Unit (ReLU), Leaky ReLU, and Swish. In other embodiments, however, AF circuit 200 may be designed to support any type or number of activation functions. AF circuit 200 can be configured to use any of the supported activation functions using opcodes. In the illustrated embodiment, for example, AF circuit 200 uses 5-bit opcodes to select the type of activation function desired by a particular layer or node in the implementation of a DNN, and the circuit can be re-configured for other types of activation functions by simply changing the opcode value. In the illustrated embodiment, the five opcode bits 202a-e are designated as Tanh 202a, Sigmoid 202b, Swish 202c, ReLU 202d, and Leaky ReLU 202e, and these respective bit values are set based on the desired type of activation function. TABLE 1 identifies the hardware configuration of AF circuit 200 for the various supported activation functions based on the values of opcode bits 202a-e.

TABLE 1

Activation function opcodes

| OPCODE BITS | | | | | HARDWARE |
|---|---|---|---|---|---|
| Tanh | Sigmoid | Swish | ReLU | Leaky ReLU | ACTIVATION FUNCTION |
| 1 | 0 | 0 | 0 | 0 | Tanh |
| 0 | 0 | 0 | 0 | 1 | Leaky ReLU |
| 0 | 0 | 0 | 1 | 0 | ReLU |
| 0 | 0 | 1 | 0 | 0 | Swish |
| 0 | 1 | 0 | 0 | 0 | Sigmoid |

The operation of AF circuit 200 varies depending on which activation function is selected via opcode bits 202a-e. Accordingly, the functionality of AF circuit 200 is discussed further below in connection with FIGS. 3A-E, which illustrate the various activation functions that are supported by AF circuit 200.

Figure 3A:
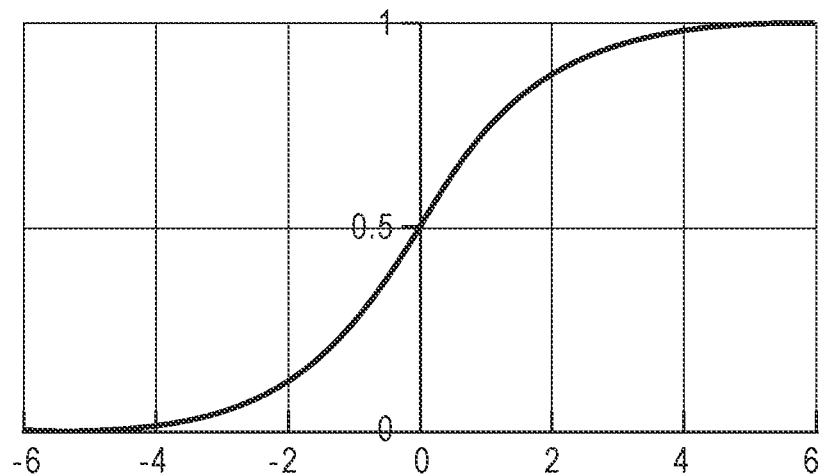
FIGS. 3A-E illustrate example activation functions for a unified activation function circuit.

FIG. 3A illustrates a graph of the Sigmoid activation function, which is represented mathematically as $$Y = \frac{1}{1 + e^{-x}}.$$

The output or Sigmoid (y-axis) has a range between 0 and 1, and its shape resembles a smooth step function, which is an important characteristic that makes it useful as a DNN activation function. In particular, the function is smooth and continuously differentiable, and the gradient is very steep between the interval −4 to 4. This means that a small change in X will cause a large change in Y, which is an important property for back-propagation in DNNs. However, there are also some disadvantages to the Sigmoid function. For example, Sigmoid suffers from the vanishing gradient problem, as the function is almost flat in the regions beyond +4 and −4, which results in a very small gradient and makes it difficult for a DNN to perform course correction. In addition, because the output ranges from 0 to 1, the output is not symmetric around the origin, which causes the gradient update to go in the positive direction.

In general, for a given input X represented in single-precision floating-point format, the Sigmoid of X, or Sigmoid(X), can be computed using the following equation:

$$f(X) = \frac{1}{1 + e^{-X}}$$

Since the above equation requires a costly division operation, however, $\log_2$ and $\text{antilog}_2$ calculations can be leveraged to avoid the division. For example, based on the properties of logarithmic functions, $\log_2$ can be taken on each side of the equation in order to convert the division into subtraction:

$$\log_2 f(X) = \log_2\left(\frac{1}{1 + e^{-X}}\right) = \log_2(1) - \log_2(1 + e^{-X})$$

In order to solve for f(X), however, $\text{antilog}_2$ must also be taken on each side of the equation:

$$f(X) = \frac{1}{1 + e^{-X}} = 2^{\log_2(1) - \log_2(1 + e^{-X})}$$

This alternative equation for the Sigmoid function no longer requires division, as the division has been replaced with subtraction and $\log_2$/$\text{antilog}_2$ calculations. Further, the exponent, $\log_2$, and $\text{antilog}_2$ calculations can be implemented using piecewise linear approximation in order to further simplify the computations required by this alternative equation.

Accordingly, turning back to FIGS. 2A-B, AF circuit 200 implements the Sigmoid function using the simplified approach described above. For example, when AF circuit 200 is configured for the Sigmoid function, the Sigmoid opcode bit (reference numeral 202b) is set to 1 and the remaining opcode bits for the other activation functions (reference numerals 202a,c,d,e) are set to 0. In this manner, when an input X (reference numeral 201) is fed into AF circuit 200, it passes through mux 206a and demux 207 to bias block 208, which adds a bias to input X in order to convert it into a negative number (−X). The result −X is then passed to exponent block 230 in order to compute $e^{-X}$, and that result is then passed to adder 212 in order to compute $1+e^{-X}$. The result of $1+e^{-X}$ passes through mux 206d to log block 210b, which then computes $\log_2(1+e^{-X})$.

Separately, subtractor 211 is supplied with a constant value of 1 as its first operand, while the output of mux 206e is supplied as its second operand. In this case, since the Sigmoid opcode bit 202b that is fed into mux 206e is set to 1, mux 206e selects a constant value of 0 as its output. Accordingly, constant values of 1 and 0 are supplied as the respective operands to subtractor 211, and thus subtractor 211 computes 1−0=1. The resulting value 1 is then passed through mux 206f to log block 210a, which then computes $\log_2(1)$ (which is equal to 0).

Thus, log blocks 210a and 210b respectively output the results of $\log_2(1)$ and $\log^2(1+e^{-X})$, and those results are then passed as operands to adder/subtractor 213. In this case, adder/subtractor 213 performs subtraction in order to compute $\log_2(1)-\log^2(1+e^{-X})$, and that result is then passed to antilog block 220, which performs an $\text{antilog}_2$ calculation: $2^{\log_2(1)-\log_2(1+e^{-X})}$. In this manner, the result computed by antilog block 220 corresponds to the final result of the Sigmoid function. For example, based on the properties of logarithmic functions discussed above:

$$2^{\log_2(1)-\log_2(1+e^{-X})} = 2^{\log_2\left(\frac{1}{1+e^{-X}}\right)} = \frac{1}{1+e^{-X}} = f(X)$$

Accordingly, AF circuit 200 outputs the result of antilog block 220 as the final output Y (reference numeral 203) of the Sigmoid function.

Further, as noted above, the exponent, $\log_2$, and $\text{antilog}_2$ calculations performed by the respective exponent, log, and antilog blocks 210-230 of AF circuit 200 are implemented using piecewise linear approximation in order to further simplify the computations required by this alternative equation.

Figure 3B:
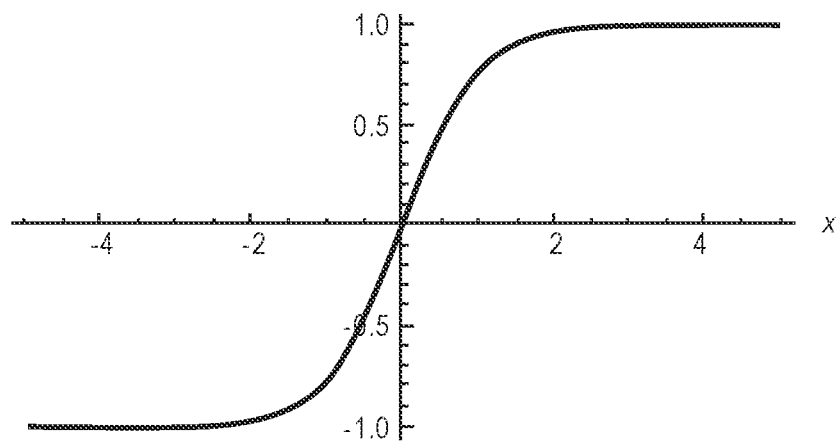

FIG. 3B illustrates a graph of the Hyperbolic Tangent (Tanh) activation function, which is represented mathematically as $$Y = \frac{1-e^{-2x}}{1+e^{-2x}}.$$

This function has an output that ranges from −1 to 1 and is symmetric around the origin, and it also has a steeper gradient than the Sigmoid function, although it still suffers from the vanishing gradient problem.

In general, for a given input X represented in single-precision floating-point format, the hyperbolic tangent of X, or Tanh(X), can be computed using the following equation:

$$f(X) = \frac{1-e^{-2X}}{1+e^{-2X}}$$

Since the above equation requires a costly division operation, the division can be avoided by leveraging $\log_2$ and $\text{antilog}_2$ calculations in a similar manner as described above for the Sigmoid function from FIG. 3A. For example, $\log_2$ can be taken on each side of the equation in order to convert the division into subtraction:

$$\log_2 f(X) = \log_2\left(\frac{1-e^{-2X}}{1+e^{-2X}}\right) = \log_2(1-e^{-2X}) - \log_2(1+e^{-2X})$$

Further, in order to solve for f(X), $\text{antilog}_2$ can then be taken on each side of the equation:

$$f(X) = \frac{1-e^{-2X}}{1+e^{-2X}} = 2^{\log_2(1-e^{-2X})-\log_2(1+e^{-2X})}$$

This alternative equation for the Tanh function no longer requires division, as the division has been replaced with subtraction and $\log_2/\text{antilog}_2$ calculations. Further, the exponent, $\log_2$, and $\text{antilog}_2$ calculations can be implemented using piecewise linear approximation in order to further simplify the computations required by this alternative equation.

Accordingly, turning back to FIGS. 2A-B, AF circuit 200 implements the Tanh function using the simplified approach described above. For example, when AF circuit 200 is configured for the Tanh function, the Tanh opcode bit (reference numeral 202a) is set to 1 and the remaining opcode bits for the other activation functions (reference numerals 202b,c,d,e) are set to 0. In this manner, when an input X (reference numeral 201) is fed into AF circuit 200, it initially passes through shifter 204, which left shifts X by a single bit in order to double its value, thus producing an output of 2X. Moreover, since AF circuit 200 is configured for the Tanh function, the output of 2X from shifter 204 is then passed through mux 206a and demux 207 to bias block 208. For example, since the selection signal of mux 206a is based on the Tanh opcode bit 202a, which is set to 1, mux 206a selects 2X as the output that it passes to demux 207. Further, since the selection signal of demux 207 is based on the output of an OR gate 205 that is fed with the ReLU/Leaky ReLU opcode bits 202d,e as input, which are both set to 0, demux 207 routes the value of 2X to bias block 208.

Bias block 208 then adds a bias to 2X in order to convert it into a negative number (−2X), and the resulting value of −2X is then passed to exponent block 230, which outputs the value of $e^{-2X}$. The output $e^{-2X}$ from exponent block 230 is then passed to both subtractor 211 (via mux 206e) and adder 212, and subtractor 211 then computes the value of $1-e^{-2X}$, while adder 212 computes the value of $1+e^{-2X}$. These outputs from subtractor 211 and adder 212 are respectively passed to log blocks 210a and 210b, which respectively compute the values of $\log_2(1-e^{-2X})$ and $\log_2(1+e^{-2X})$.

The respective outputs from log blocks 210a and 210b are then passed as operands to adder/subtractor 213, which performs subtraction in order to compute $\log_2(1-e^{-2X})-\log_2(16l+e^{-2X})$, and that result is then passed to antilog block 220, which performs an $\text{antilog}_2$ calculation: $2^{\log_2(1-e^{-2X})-\log_2(1+e^{-2X})}$. In this manner, the result computed by antilog block 220 corresponds to the final result of the Tanh function. For example, based on the properties of logarithmic functions discussed above:

$$2^{\log_2(1-e^{-2X})-\log_2(1+e^{-2X})} = 2^{\log_2\left(\frac{1-e^{-2X}}{1+e^{-2X}}\right)} = \frac{1-e^{-2X}}{1+e^{-2X}} = f(X)$$

Accordingly, AF circuit 200 outputs the result of antilog block 220 as the final output Y (reference numeral 203) of the Tanh function.

Further, as noted above, the exponent, $\log_2$, and $\text{antilog}_2$ calculations performed by the respective exponent, log, and antilog blocks 210-230 of AF circuit 200 are implemented using piecewise linear approximation in order to further simplify the computations required by this alternative equation.

Figure 3D:
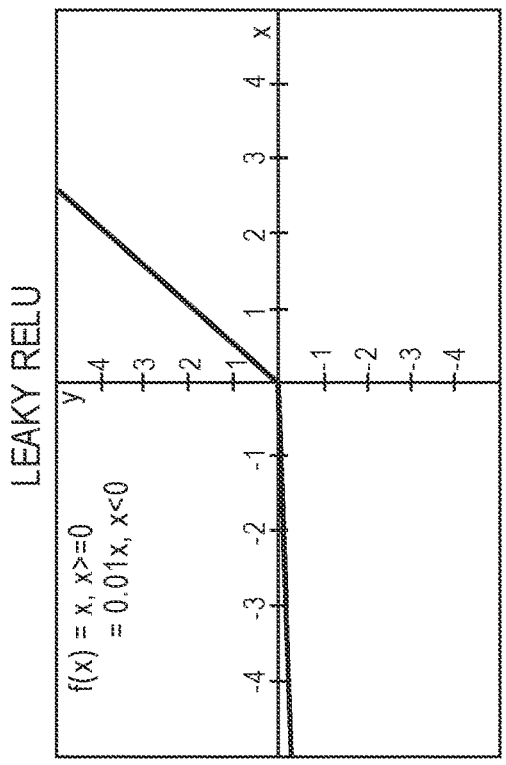
Figure 3C:
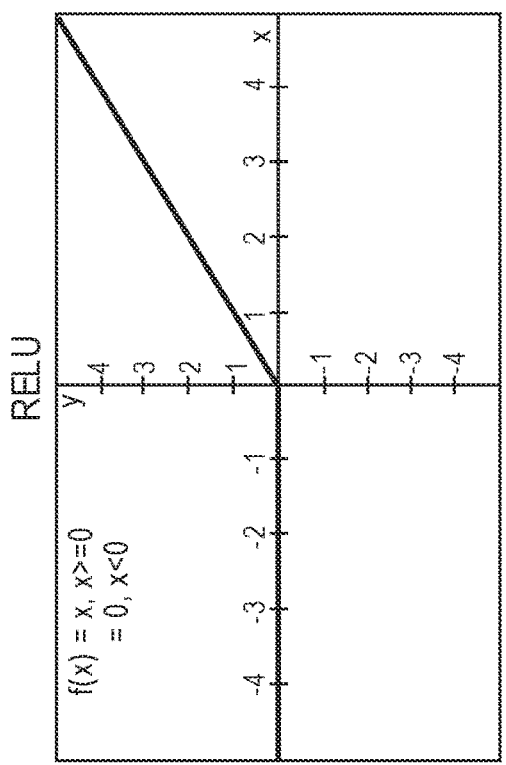

FIG. 3C illustrates a graph of the Rectified Linear Unit (ReLU) activation function, which is represented mathematically as Y=max(0, X). ReLU is a widely used activation function that provides various advantages. In particular, ReLU is a non-linear function that avoids the vanishing gradient problem, it is less complex and thus computationally less expensive than other activation functions, and it has favorable properties that render DNNs sparse and more efficient (e.g., when its input is negative, its output becomes zero, and thus the corresponding neuron does not get activated). On the other hand, weights cannot be updated during back-propagation when the output of ReLU becomes zero, and ReLU can only be used in the hidden layers of a neural network.

In general, for a given input X represented in single-precision floating-point format, the ReLU of X, or ReLU (X), can be computed using the following equation:

$$f(x) = \begin{cases} 0, & x < 0 \\ x, & x \geq 0 \end{cases}$$

The above equation is simple and does not require any costly computations, and thus its implementation is relatively straightforward, as there is no need to leverage exponent, $\log_2$, or antilog$_2$ calculations.

For example, turning back to FIGS. 2A-B, when AF circuit 200 is configured for the ReLU function, the ReLU opcode bit (reference numeral 202d) is set to 1 and the remaining opcode bits for the other activation functions (reference numerals 202a,b,c,e) are set to 0. In this manner, when an input X (reference numeral 201) is fed into AF circuit 200, X initially passes through mux 206a to demux 207, and demux 207 then routes X to mux 206c. Separately, a constant value of 1 is also supplied to mux 206c (via mux 206b). Further, since the selection signal of mux 206c is based on the sign bit of X, mux 206c selects either X or 0 as its output depending on whether X is positive or negative. Since the output of mux 206c is the final result of the ReLU function, the remaining logic of AF circuit 200 is bypassed and the output of mux 206c is ultimately used as the final output Y (reference numeral 203) of AF circuit 200 for the ReLU function.

FIG. 3D illustrates a graph of the Leaky Rectified Linear Unit (Leaky ReLU) activation function, which is represented mathematically as $$Y = \begin{cases} X, & X \geq 0 \\ aX, & X < 0 \end{cases},$$

where a=0.01. Leaky ReLU is an improved variation of ReLU. For example, with respect to ReLU, when the input is negative, the output and gradient become zero, which creates problems during weight updates in back-propagation. Leaky ReLU addresses this issue when the input is negative using multiplication of the input by a small linear component (0.01), which prevents neurons from becoming dead and also prevents the gradient from becoming zero.

In general, for a given input X represented in single-precision floating-point format, the Leaky ReLU of X, or LeakyReLU (X), can be computed using the following equation:

$$f(x) = \begin{cases} 0.01, & x < 0 \\ x, & x \geq 0 \end{cases}$$

As with ReLU, the equation for Leaky ReLU is simple and does not require any costly computations, and thus its implementation is relatively straightforward, as there is no need to leverage exponent, $\log_2$, or antilog$_2$ calculations.

For example, turning back to FIGS. 2A-B, when AF circuit 200 is configured for the Leaky ReLU function, the Leaky ReLU opcode bit (reference numeral 202e) is set to 1 and the remaining opcode bits for the other activation functions (reference numerals 202a,b,c,d) are set to 0. In this manner, when an input X (reference numeral 201) is fed into AF circuit 200, X initially passes through mux 206a to demux 207, and demux 207 then routes X to mux 206c. Separately, a constant value of 0.01 is also supplied to mux 206c (via mux 206b). Further, since the selection signal of mux 206c is based on the sign bit of X, mux 206c selects either X or 0.01 as its output depending on whether X is positive or negative. Since the output of mux 206c is the final result of the Leaky ReLU function, the remaining logic of AF circuit 200 is bypassed and the output of mux 206c is ultimately used as the final output Y (reference numeral 203) of AF circuit 200 for the Leaky ReLU function.

Figure 3E:
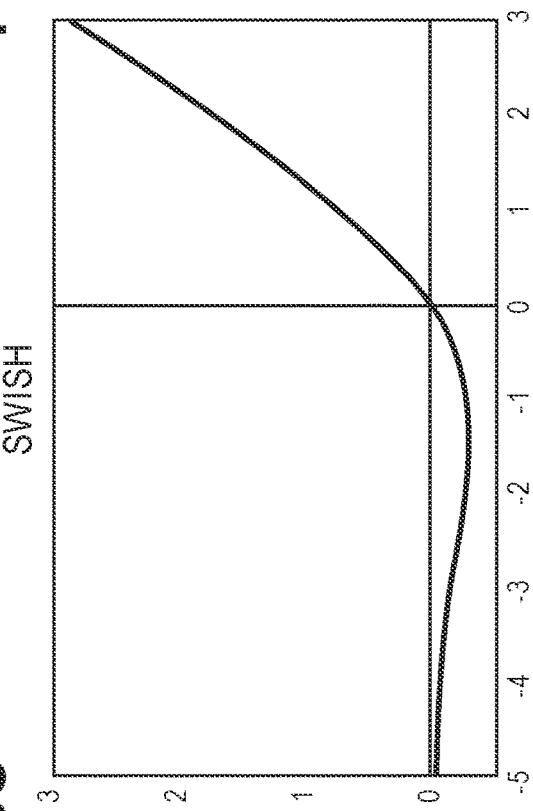

FIG. 3E illustrates a graph of the Swish activation function, which is represented mathematically as Y=X*Sigmoid (X). In many cases, Swish has been shown to provide better accuracy than other activation functions (e.g., ReLU).

In general, for a given input X represented in single-precision floating-point format, the Swish of X, or Swish (X), can be computed using the following equation:

$$f(X) = X * \text{Sigmoid}(X) = X * \frac{1}{1+e^{-X}} = \frac{X}{1+e^{-X}}$$

Since the above equation requires a costly division operation, the division can be avoided by leveraging $\log_2$ and antilog$_2$ calculations in a similar manner as described above for the Sigmoid function from FIG. 3A. For example, $\log_2$ can be taken on each side of the equation in order to convert the division into subtraction:

$$\log_2 f(X) = \log_2\left(\frac{X}{1+e^{-X}}\right) = \log_2(X) - \log_2(1+e^{-X})$$

Further, in order to solve for f(X), antilog$_2$ can then be taken on each side of the equation:

$$f(X) = \frac{X}{1+e^{-X}} = 2^{\log_2(X) - \log_2(1+e^{-X})}$$

This alternative equation for the Swish function no longer requires division, as the division has been replaced with subtraction and $\log_2$/antilog$_2$ calculations. Further, the exponent, $\log_2$, and antilog$_2$ calculations can be implemented using piecewise linear approximation in order to further simplify the computations required by this alternative equation.

Accordingly, turning back to FIGS. 2A-B, AF circuit 200 implements the Swish function using the simplified approach described above. For example, when AF circuit 200 is configured for the Swish function, the Swish opcode bit (reference numeral 202c) is set to 1 and the remaining opcode bits for the other activation functions (reference numerals 202a,b,d,e) are set to 0. In this manner, when an input X (reference numeral 201) is fed into AF circuit 200, X passes through mux 206a to demux 207, and demux 207 then routes X to bias block 208. For example, since the selection signal of mux 206a is based on the Tanh opcode bit 202a, which is set to 0, mux 206a selects X as the output that it passes to demux 207. Further, since the selection signal of demux 207 is based on the output of an OR gate 205 that is fed with the ReLU/Leaky ReLU opcode bits 202d,e as input, which are both set to 0, demux 207 routes the value of X to bias block 208.

Bias block 208 then adds a bias to X in order to convert it into a negative number (−X), and the resulting value −X is then passed to exponent block 230, which outputs the value of $e^{-X}$. The output $e^{-X}$ of exponent block 230 is then passed to adder 212 in order to compute $1+e^{-X}$, and that result then passes through mux 206d to log block 210b, which then computes $\log_2(1+e^{-X})$.

Separately, since the selection signal of mux 206f is based on the Swish opcode bit 202c, which is set to 1, mux 206f selects X as the output that is passed to log block 210a, which then computes $\log_2(X)$.

The respective outputs from log blocks 210a and 210b are then passed as operands to adder/subtractor 213, which performs subtraction in order to compute $\log_2(X)-\log_2(1+e^{-X})$, and that result is then passed to antilog block 220, which performs an antilog$_2$ calculation: $2^{\log_2(X)-\log_2(1+e^{-X})}$. In this manner, the result computed by antilog block 220 corresponds to the final result of the Swish function. For example, based on the properties of logarithmic functions discussed above:

$$2^{\log_2(X)-\log_2(1+e^{-X})} = 2^{\log_2\left(\frac{X}{1+e^{-X}}\right)} = \frac{X}{1+e^{-X}} = f(X)$$

Accordingly, AF circuit 200 outputs the result of antilog block 220 as the final output Y (reference numeral 203) of the Swish function.

Further, as noted above, the exponent, log$_2$, and antilog$_2$ calculations performed by the respective exponent, log, and antilog blocks 210-230 of AF circuit 200 are implemented using piecewise linear approximation in order to further simplify the computations required by this alternative equation.

Accordingly, the illustrated embodiment of AF circuit 200 of FIGS. 2A-B provides numerous advantages, including low latency, high precision, and reduced power consumption using a flexible, low-area hardware design that supports multiple activation functions and is highly scalable and portable. In particular, AF circuit 200 is a unified solution that implements multiple DNN activation functions on a single hardware component (e.g., rather than using separate hardware components for each activation function) without depending on lookup tables. For example, in the illustrated embodiment, AF circuit 200 is implemented using log, antilog, and exponent circuits 210, 220, 230 that perform log$_2$, antilog$_2$, and exponent calculations using piecewise linear approximation, which eliminates the need for lookup tables in the hardware design and reduces the required multiplier circuitry.

In this manner, the illustrated embodiment significantly reduces the requisite silicon area, power consumption, and latency of the hardware, yet still provides high precision. For example, the elimination of lookup tables and reduced multiplier circuitry translates directly into significant savings of silicon area, as a much smaller number of synthesis gates is required in comparison to a typical lookup table approach with similar precision. Further, log$_2$ and antilog$_2$ calculations can be performed in a single clock cycle, while exponent calculations can be performed in two clock cycles, which enables an activation function to be computed in only five clock cycles. Moreover, the underlying computations can easily be pipelined in order to increase throughput.

AF circuit 200 also eliminates the dependency on software for loading/programming lookup tables associated with different activation functions, as AF circuit 200 can be configured for different activation functions by simply programming the appropriate opcode. Programming an opcode on AF circuit 200 is much simpler and requires fewer clock cycles compared to programming a lookup table for an activation function.

AF circuit 200 is also highly scalable. In particular, the flexible implementation of AF circuit 200 allows the underlying hardware to be replicated as needed in order to increase the number of supported parallel operations. In this manner, AF circuit 200 can be easily scaled to support the number of parallel operations required by a particular application or use case. The precision of AF circuit 200 can also be scaled based on application requirements. For example, if an application demands greater precision, the number of segments in the piecewise linear approximation model used by the log, antilog, and exponent circuitry 210, 220, 230 can be increased to accommodate the precision requirements. In this manner, AF circuit 200 is also highly portable, as it can be easily ported and/or scaled for any product or form factor, including mobile devices (e.g., handheld or wearable devices), drones, servers, and/or any other artificial intelligence solutions that require DNN operations without any dependencies or modifications.

Figure 4:
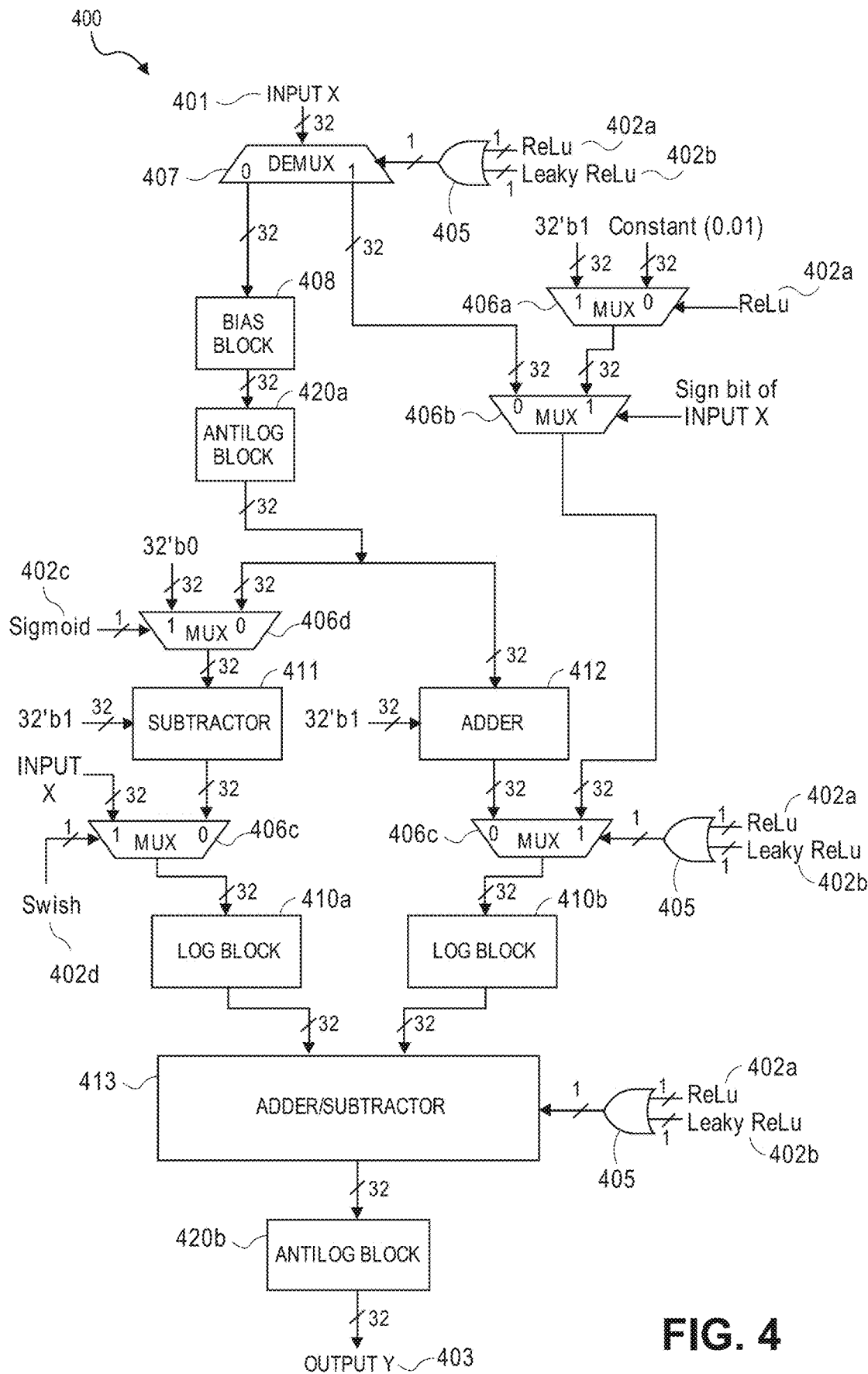
FIG. 4 illustrates an example embodiment of a unified activation function circuit implemented using modified activation function equations with base 2 exponent terms.

FIG. 4 illustrates an alternative embodiment of a unified activation function (AF) circuit 400 for artificial neural networks (e.g., deep neural networks (DNNs)). The AF circuit 400 has an input 401, opcode bits 402a-d, an output 403. The AF circuit includes OR gates 405 (individually referred to as "OR gate 405"), muxes 406a-d, a demux 407, a bias block 408, log blocks 410a-b, a subtractor 411, an adder 412, a adder/subtractor 413, and antilog blocks 420a-b. In particular, AF circuit 400 is similar to AF circuit 200 from FIGS. 2A-B, except certain activation functions are implemented using modified equations that use powers of 2 instead of powers of the exponent constant e. To illustrate, the original and modified equations for the Sigmoid, Swish, and Hyperbolic Tangent activation functions are provided in TABLE 2.

TABLE 2

Modified activation function equations using powers of 2

| | ORIGINAL EQUATION | MODIFIED EQUATION |
| --- | --- | --- |
| SIGMOID | $f(X) = \dfrac{1}{1+e^{-X}}$ | $f(X) = \dfrac{1}{1+2^{-X}}$ |
| SWISH | $f(X) = X * \text{Sigmoid}(X)$ $= X * \dfrac{1}{1+e^{-X}}$ $= \dfrac{X}{1+e^{-X}}$ | $f(X) = X * \text{Sigmoid}(X)$ $= X * \dfrac{1}{1+2^{-X}}$ $= \dfrac{X}{1+2^{-X}}$ |
| HYPERBOLIC TANGENT | $f(X) = \dfrac{1-e^{-2X}}{1+e^{-2X}}$ | $f(X) = \dfrac{1-2^{-2X}}{1+2^{-2X}}$ |

As shown in TABLE 2, the exponents of base e in the original equations are replaced with exponents of base 2 in the modified equations. In this manner, the important non-linear characteristics of the activation functions (e.g., the shape of the curve) are still exhibited by the modified equations, but the underlying activation function hardware can be implemented much more efficiently. In particular, by replacing the exponents of base e with exponents of base 2, an exponent circuit is no longer needed by the modified equations, as all of the exponent operations can now be performed by an antilog circuit. For example, since antilog base 2 of a variable x is equivalent to 2 raised to the power of x ($2^x$), an antilog circuit that performs antilog base 2 operations can be used to compute the powers of base 2 that appear in the modified activation function equations.

Moreover, performing exponent operations using antilog circuitry rather than exponent circuitry reduces both the latency and silicon area of AF circuit 400. By way of comparison, for example, AF circuit 200 of FIGS. 2A-B performs exponent operations using an exponent circuit implemented using piecewise linear approximation (e.g., the exponent circuit of FIG. 7), which can perform an exponent operation in two clock cycles and requires at least one multiplier. AF circuit 400, however, performs exponent operations using an antilog circuit implemented using piecewise linear approximation (e.g., the antilog circuit of FIGS. 6A-C), which can perform an antilog base 2 operation in a single clock cycle and requires no multipliers. Thus, by replacing the exponent circuitry with antilog circuitry, the overall latency of AF circuit 400 is reduced by one clock cycle, thus enabling an activation function to be computed in only four clock cycles, compared to five clock cycles for the activation function circuit of FIGS. 2A-B. Further, AF circuit 400 no longer requires any multiplier circuitry, which results in significant silicon area savings, as the eliminated exponent circuit was the only component that required a multiplier. For example, while AF circuit 200 of FIGS. 2A-B can be implemented using 8,321 gates, AF circuit 400 can be implemented using only 7,221 gates.

Moreover, similar to AF circuit 200 of FIGS. 2A-B, AF circuit 400 leverages log base 2 ($log_2$) and antilog base 2 ($antilog_2$) calculations using piecewise linear approximation in order to simply the requisite computations for certain activation functions. For example, $log_2$ and $antilog_2$ calculations can be used to eliminate the complex division and/or multiplication operations required by certain activation functions and instead convert them into subtraction and/or addition. The log/antilog equations for the modified Sigmoid, Swish, and Hyperbolic Tangent activation functions from TABLE 2 (which use powers of 2 instead of e) are provided in TABLE 3. These log/antilog equations for the modified activation functions are derived in a similar manner as those of the original activation functions, as described in connection with FIGS. 3A-E.

TABLE 3

Log/antilog versions of modified activation functions (using powers of 2)

| | MODIFIED EQUATION | LOG/ ANTILOG EQUATION |
|---|---|---|
| SIGMOID | $f(X) = \dfrac{1}{1 + 2^{-X}}$ | $2^{log2(1) - log2(1 + 2^{-X})}$ |
| SWISH | $f(X) = X * \text{Sigmoid}(X)$ $= X * \dfrac{1}{1 + 2^{-X}}$ $= \dfrac{X}{1 + 2^{-X}}$ | $2^{log2(X) - log2(1 + 2^{-X})}$ |

TABLE 3-continued

Log/antilog versions of modified activation functions (using powers of 2)

| | MODIFIED EQUATION | LOG/ ANTILOG EQUATION |
|---|---|---|
| HYPERBOLIC TANGENT | $f(X) = \dfrac{1 - 2^{-2X}}{1 + 2^{-2X}}$ | $2^{log2(1 - 2^{-2X}) - log2(1 + 2^{-2X})}$ |

In the illustrated embodiment, AF circuit 400 is designed to implement the Sigmoid, Swish, Tanh, ReLU, and Leaky ReLU activation functions. The Sigmoid, Swish, and Tanh activation functions are implemented using the log/antilog equations from TABLE 3, while the ReLU and Leaky ReLU activation functions are implemented using their original equations from FIGS. 3C-D, as they do not require any complex division, multiplication, or exponent operations. The operation of AF circuit 400 is otherwise similar to AF circuit 200 of FIGS. 2A-B.

Figure 5A:
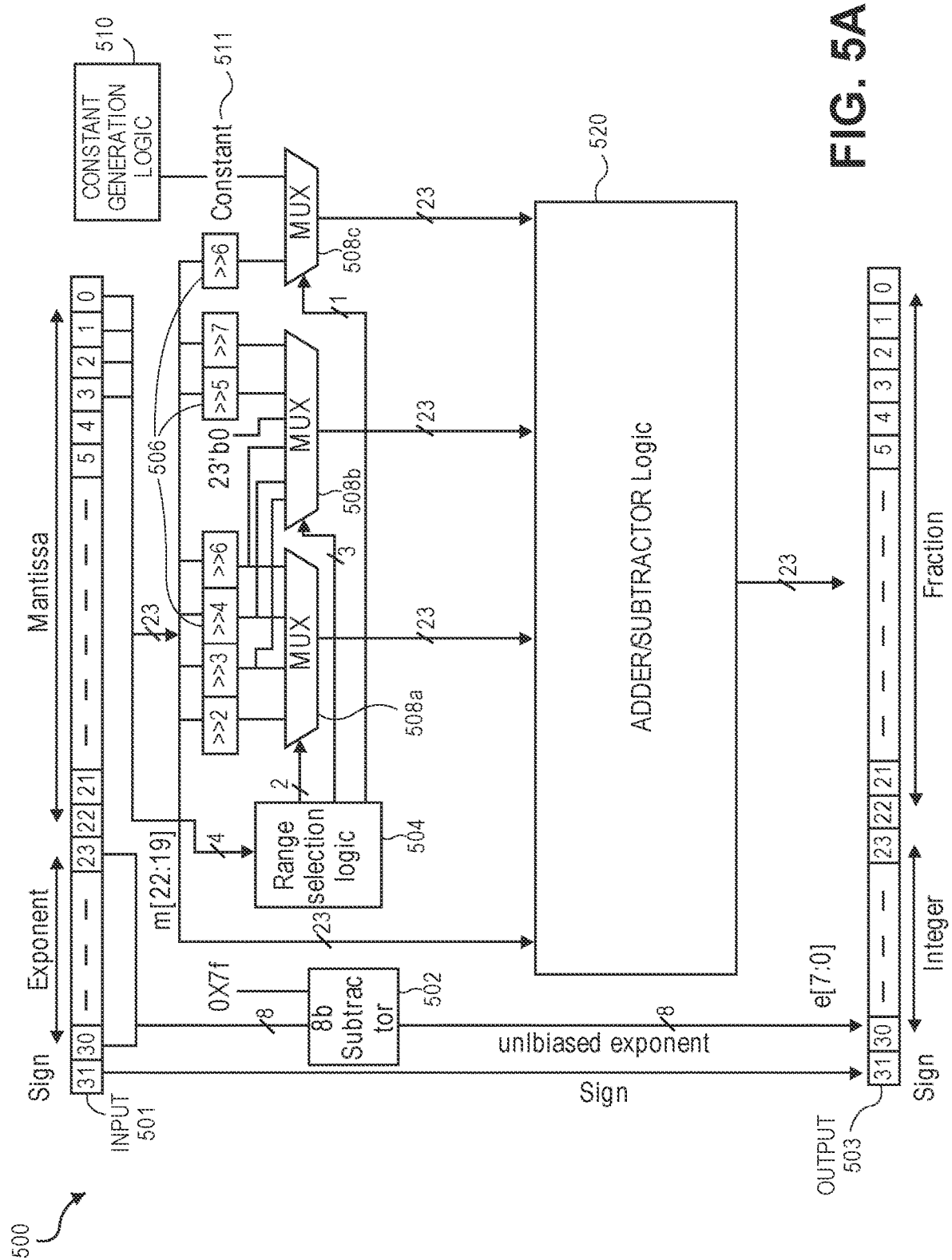
FIGS. 5A-C illustrate an example embodiment of a log circuit implemented using piecewise linear approximation.
Figure 5B:
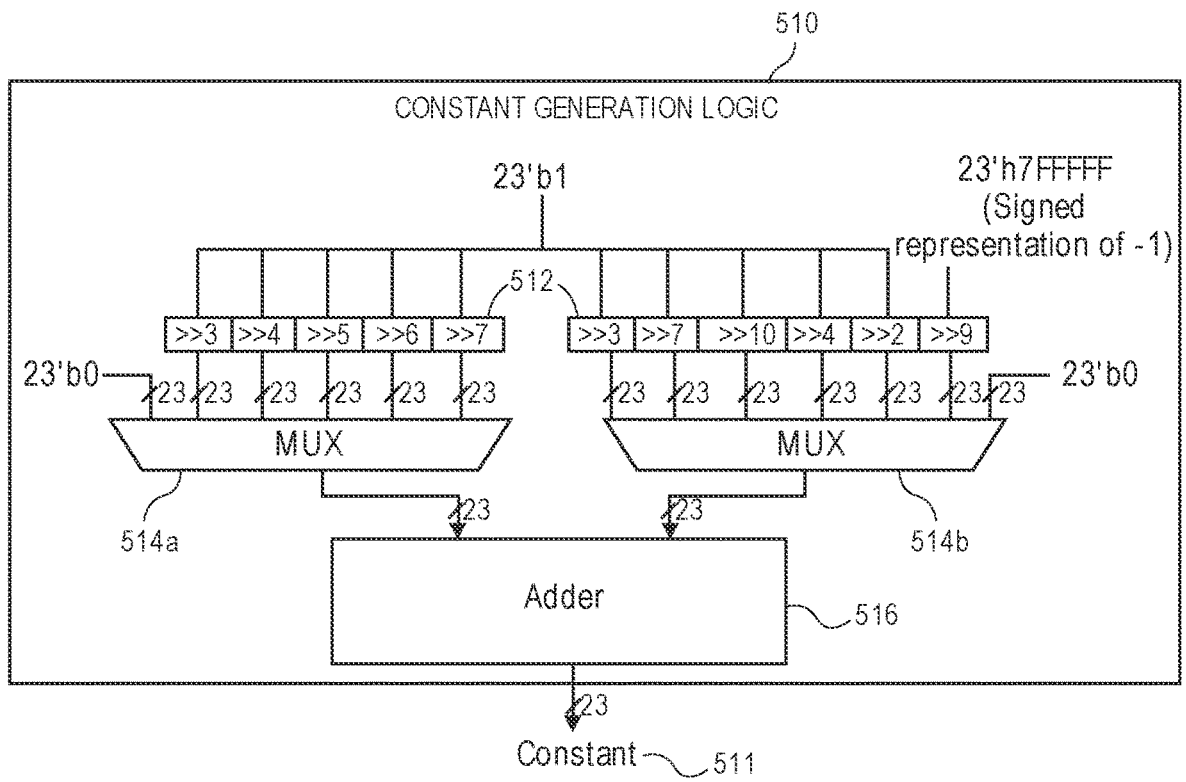
Figure 5C:
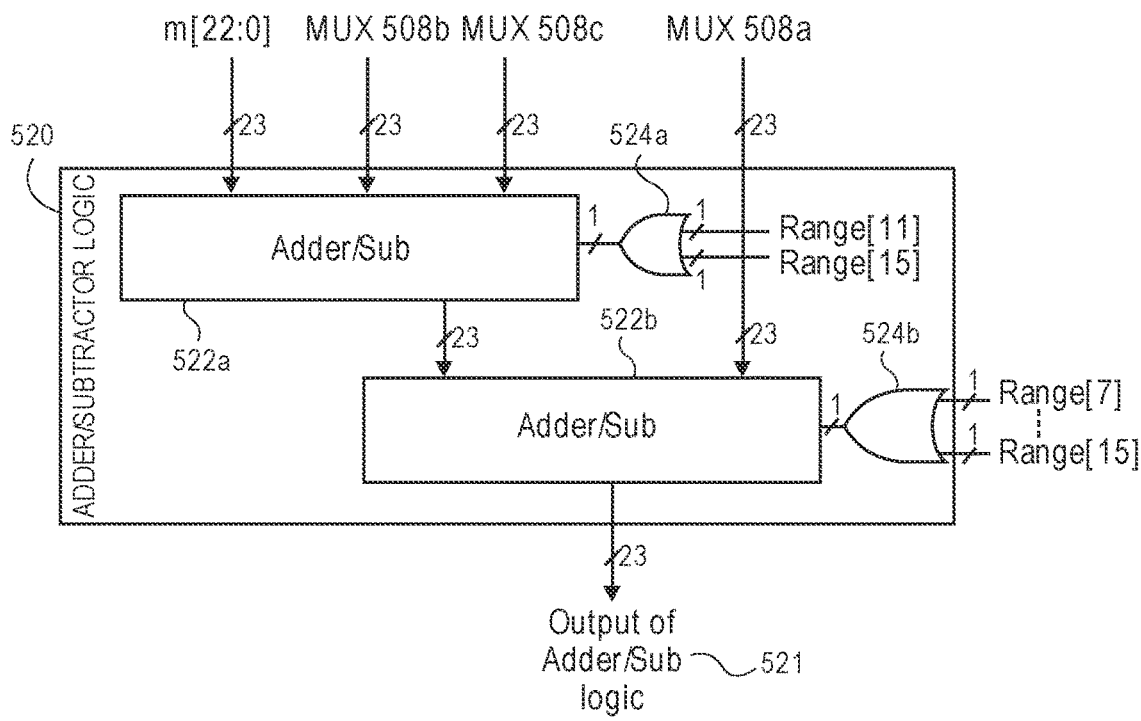

Log, Antilog, and Exponent Circuits Implemented Using Piecewise Linear Approximation FIGS. 5A-C illustrate an example embodiment of a log circuit 500 implemented using piecewise linear approximation. In particular, FIG. 5A illustrates the overall implementation of log circuit 500, while FIGS. 5B and 5C illustrate the implementation of certain components of log circuit 500.

Log circuit 500 performs log calculations using 16-segment piecewise linear approximation. In this manner, no lookup tables or multiplier circuits are required by log circuit 500, and log calculations can be performed in a single clock cycle. The equations used by log circuit 500 to perform piecewise linear approximation for log calculations are shown below in TABLE 4.

TABLE 4

Piecewise linear approximation equations for $log_2(1 + m)$

| RANGE # | RANGE | EQUATION |
|---|---|---|
| 0 | $0 \leq m < 0.0625$ | $m + \dfrac{m}{4} + \dfrac{m}{8} + \dfrac{m}{64}$ |
| 1 | $0.0625 \leq m < 0.125$ | $m + \dfrac{m}{4} + \dfrac{m}{16} + \dfrac{1}{256} + \dfrac{1}{1024}$ |
| 2 | $0.125 \leq m < 0.1875$ | $m + \dfrac{m}{4} + \dfrac{1}{64} - \dfrac{1}{512}$ |
| 3 | $0.1875 \leq m < 0.25$ | $m + \dfrac{m}{8} + \dfrac{m}{16} + \dfrac{1}{64} + \dfrac{1}{128}$ |
| 4 | $0.25 \leq m < 0.3125$ | $m + \dfrac{m}{8} + \dfrac{1}{32} + \dfrac{1}{128}$ |
| 5 | $0.3125 \leq m < 0.375$ | $m + \dfrac{m}{16} + \dfrac{m}{128} + \dfrac{1}{16}$ |
| 6 | $0.375 \leq m < 0.4375$ | $m + \dfrac{m}{64} + \dfrac{m}{128} + \dfrac{1}{16} + \dfrac{1}{128}$ |
| 7 | $0.4375 \leq m < 0.5$ | $m - \dfrac{m}{64} + \dfrac{1}{16} + \dfrac{1}{32}$ |
| 8 | $0.5 \leq m < 0.5625$ | $m - \dfrac{m}{16} + \dfrac{m}{128} + \dfrac{1}{8}$ |
| 9 | $0.5625 \leq m < 0.625$ | $m - \dfrac{m}{8} + \dfrac{m}{32} + \dfrac{1}{8} + \dfrac{1}{128}$ |

TABLE 4-continued

Piecewise linear approximation equations for $\log_2(1 + m)$

| RANGE # | RANGE | EQUATION |
|---|---|---|
| 10 | $0.625 \leq m < 0.6875$ | $m - \frac{m}{8} + \frac{1}{8} + \frac{1}{32}$ |
| 11 | $0.6875 \leq m < 0.75$ | $m - \frac{m}{8} - \frac{m}{32} + \frac{1}{8} + \frac{1}{16}$ |
| 12 | $0.75 \leq m < 0.8125$ | $m - \frac{m}{4} + \frac{m}{16} + \frac{1}{8} + \frac{1}{16}$ |
| 13 | $0.8125 \leq m < 0.875$ | $m - \frac{m}{4} + \frac{m}{32} + \frac{1}{4}$ |
| 14 | $0.875 \leq m < 0.9375$ | $m - \frac{m}{4} + \frac{1}{4}$ |
| 15 | $0.9375 \leq m < 1$ | $m - \frac{m}{4} - \frac{m}{64} + \frac{1}{4} + \frac{1}{64}$ |

The equations in TABLE 4 are designed to compute or approximate the result of $\log_2(1+m)$, where m represents the mantissa portion of a single-precision floating-point input 501. For example, since the mantissa m is always bounded between 0 and 1, and since the result of $\log_2(0)$ is undefined, $\log_2(1+m)$ is computed instead of $\log_2(m)$ in order to avoid an undefined result when m is 0. Moreover, in order to compute $\log_2(1+m)$ using 16-segment piecewise linear approximation, the potential values of m over the interval [0,1] are divided into 16 different ranges or segments, which are designated as ranges 0-15, and separate equations are defined for each range in order to approximate the result of $\log_2(1+m)$. Further, the respective equations are defined exclusively using addition and/or subtraction on any of the following types of operands: m, fractions of m divided by powers of 2, and/or constant values. In this manner, the only division required by the equations is exclusively by powers of 2, and thus all division operations can be implemented using shifters. Further, the loss in precision that results from the limited "shift-based" division is compensated for through use of the constant values that are added and/or subtracted in certain equations. Accordingly, the respective equations can be implemented exclusively using addition, subtraction, and/or shift operations, thus eliminating the need for complex multiplication/division circuitry.

FIG. 5A illustrates the overall logic of log circuit 500, which is designed to implement the equations of TABLE 4. In the illustrated embodiment, log circuit 500 is supplied with a 32-bit single-precision floating-point number as input 501 (e.g., supplied via an input register), and log circuit 500 computes a corresponding 32-bit fixed-point number as output 503 (e.g., returned via an output register), which represents the $\log_2$ value of input 501.

Input 501 includes a sign bit (input[31]), an 8-bit exponent e (input[30:23]), and a 23-bit mantissa m (input[22:0]). Given that the sign of input 501 always matches that of output 503, the sign bit of input 501 (input[31]) is fed directly into the corresponding bit of output 503 (output [31]). Moreover, the exponent e of input 501 (input[30:23]) is fed into an 8-bit subtractor 502, which subtracts a bias of 0x7F from exponent e in order to generate a corresponding 8-bit unbiased exponent. From a mathematical perspective, for example, subtracting the bias from the exponent of a floating-point number always results in a value equivalent to $\log_2$ of the exponent. Accordingly, the resulting unbiased exponent serves as the integer portion of the fixed-point number represented in output 503 (output[30:23]).

Moreover, the mantissa m of input 501 is used to select the corresponding range and equation from TABLE 4 that will be used to compute the fraction field of output 503 (output[22:0]). For example, the four most significant bits of the mantissa m (input[22:19]) are supplied as input to range selection logic 504, which outputs sixteen 1-bit signals (range[0]-range[15]) that correspond to the respective ranges of m from TABLE 4, such that the signal corresponding to the applicable range is set to 1 while the remaining signals are set to 0.

Based on the output of range selection logic 504, multiplexers (muxes) 508a-c are then used to select the operands that correspond to the selected equation from TABLE 4, and those operands are then supplied as input to adder/subtractor 520. In particular, muxes 508a-c select between various fractions of the mantissa m (e.g., generated using shift operations) as well as certain constant values. For example, the mantissa m is fed into multiple shifters 506, which each perform a right shift of m by a certain number of bits in order compute the various fractions of m over powers of 2 that appear throughout the equations in TABLE 5

$$\left(e.g., \frac{m}{4}, \frac{m}{8}, \frac{m}{16}, \frac{m}{32}, \frac{m}{64}, \frac{m}{128}\right).$$

The outputs of these shifters 506 are then fed as inputs to the respective muxes 508a-c in the manner shown in FIG. 5A. A constant value of 0 is additionally supplied as one of the inputs to mux 508b, as that value is output by mux 508b for certain equations that do not otherwise require an operand from mux 508b. Finally, the constant value required by certain equations from TABLE 4

$$\left(e.g., \frac{1}{4}, \frac{1}{8}, \frac{1}{16}, \frac{1}{32}, \frac{1}{64}, \frac{1}{128}, \frac{1}{256}, -\frac{1}{512}, \text{and/or } \frac{1}{1024}\right)$$

is generated by constant generation logic 510 and is further supplied as input to mux 508c. The implementation of constant generation logic 510 is further illustrated and described below in connection with FIG. 5B.

Each mux 508a-c then selects an appropriate output that corresponds to one of the operands for the applicable equation from TABLE 4 (e.g., based on the range selection logic 504), and those outputs are then supplied as inputs to adder/subtractor 520. Further, the mantissa m is also supplied directly as another input to adder/subtractor 520, as the mantissa is an operand for all of the equations from TABLE 4.

Adder/subtractor 520 then performs the appropriate addition and/or subtraction operations on the various operands supplied as input, and the computed result then serves as the 23-bit fraction field of output 503 (output [22:0]). The implementation of adder/subtractor 520 is further illustrated and described below in connection with FIG. 5C.

FIG. 5B illustrates an example implementation of the constant generation logic 510 of log circuit 500 from FIG. 5A, which is used to generate the constant value(s) required by certain equations from TABLE 4. In the illustrated embodiment, constant generation logic 510 includes shifters 512 to generate the collection of constant values that appear throughout the equations from TABLE 4, multiplexers (muxes) 514a,b to select the corresponding constant value(s)

for a selected equation from TABLE 4, and an adder 516 to add the selected constant values.

In the illustrated embodiment, a 23-bit constant value of either +1 or −1 is supplied as input to the respective shifters 512 (e.g., depending on whether each shifter 512 generates a positive or negative fraction constant). For example, a 23-bit constant value of +1 is supplied as input to all but one of the shifters which generate positive results, while a 23-bit signed representation of −1 is supplied as input to the only remaining shifter which generates a negative result (e.g., the shifter that performs a 9-bit right shift to generate $$-\frac{1}{512}\bigg).$$

Each shifter 512 then performs a right shift by a certain number of bits in order to generate the respective fraction constants that appear throughout the equations from TABLE 4

$$\left(\text{e.g., } \frac{1}{4}, \frac{1}{8}, \frac{1}{16}, \frac{1}{32}, \frac{1}{64}, \frac{1}{128}, \frac{1}{256}, -\frac{1}{512}, \frac{1}{1024}\right).$$

Moreover, since the respective equations from TABLE 4 require either zero, one, or two of these fraction constants, the appropriate combination of fraction constants for a selected equation from TABLE 4 is selected using two muxes 514a,b. In particular, the outputs of shifters 512 are supplied as inputs to the two muxes 514a,b in the manner shown in FIG. 5B, and a 23-bit constant value of 0 is also supplied as an input to each mux 514a,b. Each mux 514a,b then outputs either a particular fraction constant or a value of 0. In this manner, muxes 514,a,b can collectively output zero, one, or two of the respective fraction constants generated by shifters 512, depending on the particular equation selected from TABLE 4 (e.g., as determined using the range selection logic 504 of log circuit 500 from FIG. 5A).

The outputs of muxes 514a,b are then supplied as inputs to adder 516, which computes their sum. The result from adder 516 then serves as the final constant value 511 that is output by the constant generation logic 510 of FIG. 5B.

FIG. 5C illustrates an example implementation of the adder/subtractor logic 520 of log circuit 500 from FIG. 5A, which is used to perform addition and/or subtraction on the operands of a selected equation from TABLE 4. In the illustrated embodiment, adder/subtractor logic 520 includes two adder/subtractors 522a,b and two OR gates 524a,b, which are described further below.

The first adder/subtractor 522a is supplied with the mantissa m and the outputs of muxes 508b and 508c of log circuit 500 as its operands. Moreover, the particular combination of addition and/or subtraction performed on these operands by adder/subtractor 522a is dictated by OR gate 524a. For example, OR gate 524a is supplied with the signals corresponding to ranges 11 and 15 from TABLE 4 as input (e.g., as generated by range selection logic 504 of log circuit 500), and the output of OR gate 524a is then fed into adder/subtractor 522a. In this manner, when the output of OR gate 524a is 0, adder/subtractor 522a adds all operands together, but when the output of OR gate 524a is 1 (e.g., the mantissa m falls within either range 11 or range 15), adder/subtractor 522a subtracts the operand corresponding to the output of mux 508b and adds the remaining operands. In other words, for any range of m from TABLE 4 aside from ranges 11 and 15, adder/subtractor 522a outputs the result of m +output of mux 508b +output of mux 508c, but for ranges 11 and 15, adder/subtractor 522a outputs the result of m−output of mux 508b+output of mux 508c.

The second adder/subtractor 522b is then supplied with the output of the first adder/subtractor 522a and the output of mux 508a of log circuit 500 as its respective operands. The output of OR gate 524b dictates whether adder/subtractor 522b performs addition or subtraction on these operands. For example, OR gate 524b is supplied with the signals corresponding to ranges 7 - 15 from TABLE 4 as input (e.g., as generated by range selection logic 504 of log circuit 500), and the output of OR gate 524b is then fed into adder/subtractor 522b. In this manner, when the output of OR gate 524b is 0, adder/subtractor 522b adds both operands together, but when the output of OR gate 524b is 1 (e.g., the mantissa m falls within any of ranges 7-15), the output of mux 508a is subtracted from the output of the first adder/subtractor 522a. In other words, when m falls within ranges 0-6 from TABLE 4, adder/subtractor 522b computes the output of the first adder/subtractor 522a+the output of mux 508a, but when m falls within ranges 7-15, adder/subtractor 522b computes the output of the first adder/subtractor 522a− the output of mux 508a. The result from the second adder/subtractor 522b serves as the final output 521 of the adder/subtractor 520 logic of FIG. 5C.

To illustrate the operation of log circuit 500, the processing flow will be described for an example input 501. Since the sign and exponent fields of input 501 are always processed in the same manner regardless of their underlying values, this example focuses on the processing associated with the mantissa m of input 501. In this example, the mantissa m of input 501 (input[22:0]) is assumed to fall within the range 0.125≤m<0.1875, which corresponds to range 2 of TABLE 4. Accordingly, log circuit 500 will execute the corresponding equation for range 2 from TABLE 4, which is $$m + \frac{m}{4} + \frac{1}{64} - \frac{1}{512}.$$

Log circuit 500 begins by processing the original input 501 in order to generate and/or obtain the respective operands for the above-referenced equation, and log circuit 500 then supplies those operands to adder/subtractor 520 to compute a result of the equation.

The first operand m, which corresponds to the mantissa field of input 501 (input[22:0]), is fed directly from the relevant bitfields of input 501 to adder/subtractor logic 520.

The remaining operands for the above-referenced equation are supplied to adder/subtractor logic 520 by muxes 508a-c. In particular, the collection of operands that appear throughout the various equations from TABLE 4 are supplied as inputs to muxes 508a-c, and muxes 508a-c then output the particular operands required by the appropriate equation from TABLE 4. For example, based on the four most significant bits of the mantissa m, range selection logic 504 outputs a signal that identifies the particular range from TABLE 4 that m falls within, and that range signal is then used by muxes 508a-c to select the appropriate operands to output. In this example, since m falls within range 2 from TABLE 4, range selection logic 504 outputs a range signal that corresponds to range 2, otherwise denoted as the range [2] signal. Based on the range[2] signal, mux 508a selects $$\frac{m}{4}(m \gg 2)$$

as its output, mux 508b selects 0 as its output, and mux 508c selects a constant 511 generated by constant generation logic 510 as its output. Turning to constant generation logic 510 of FIG. 5B, for example, the range[2] signal causes muxes 514a and 514b to select $$\frac{1}{64}(1 \gg 6)$$

and $$-\frac{1}{512}(-1 \gg 9)$$

as their respective outputs, those values are then added together by adder 516, and the resulting constant 511 is output by constant generation logic 510. Accordingly, mux 508c selects this constant 511 as its output, which has a corresponding value of $$\frac{1}{64} - \frac{1}{512}.$$

In this manner, the following operands are ultimately supplied to adder/subtractor 520:

| | |
|---|---|
| $m$ | (supplied directly from input 501); |
| $\frac{m}{4}$ | (supplied by mux 508a); |
| 0 | (supplied by mux 508b); and |
| $\frac{1}{64} - \frac{1}{512}$ | (supplied by mux 508c). |

The range[2] signal causes adder/subtractor 520 to perform addition on all of these operands, thus computing a result of the equation $$m + \frac{m}{4} + 0 + \left(\frac{1}{64} - \frac{1}{512}\right) = m + \frac{m}{4} + \frac{1}{64} - \frac{1}{512},$$

which is the equation for range 2 from TABLE 4. Accordingly, the resulting value serves as the 23-bit fraction field in the output 503 (output [22:0]) generated by log circuit 500.

Figure 6A:
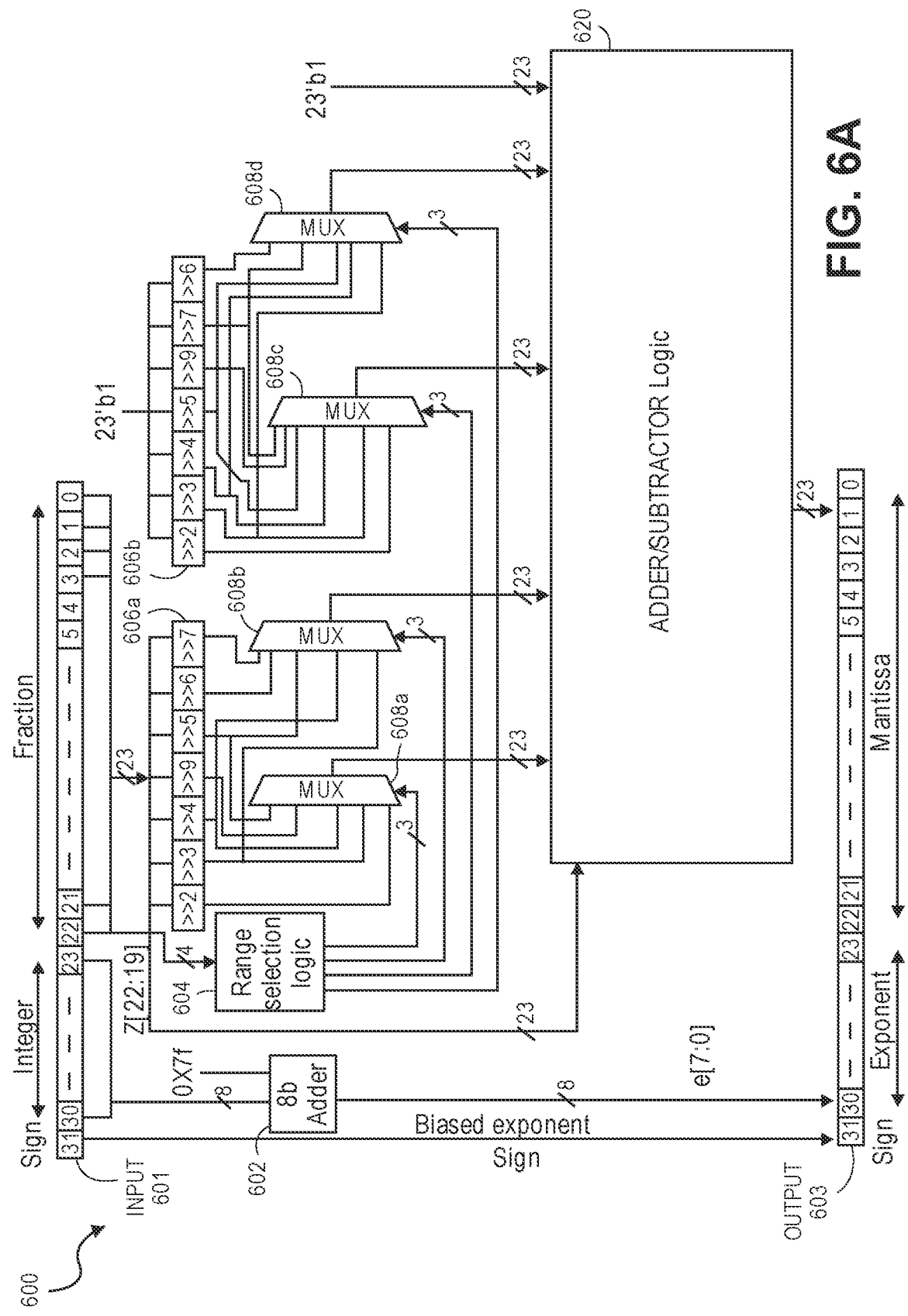
FIGS. 6A-C illustrate example embodiments of an antilog circuit implemented using piecewise linear approximation.
Figure 6B:
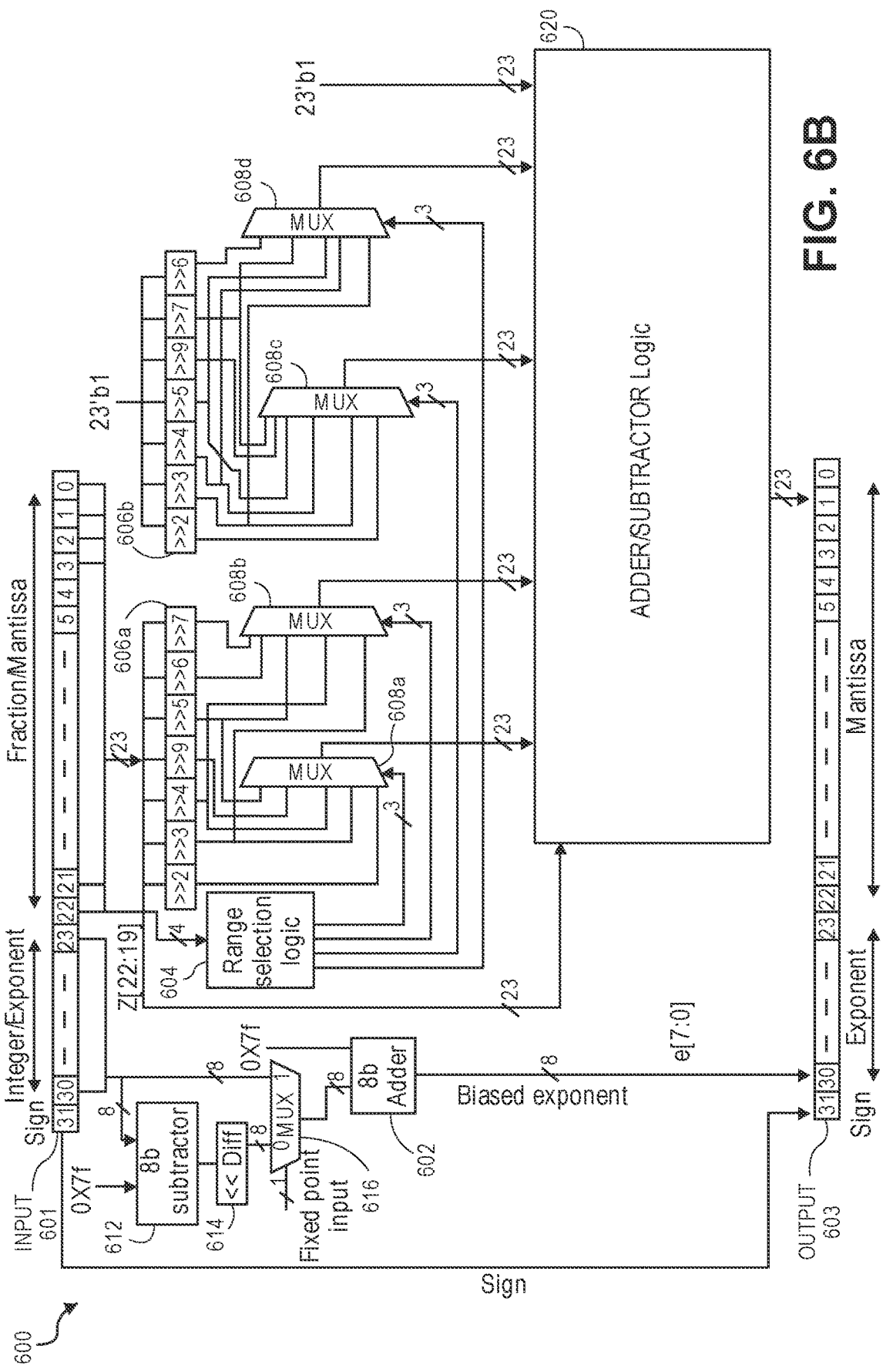
Figure 6C:
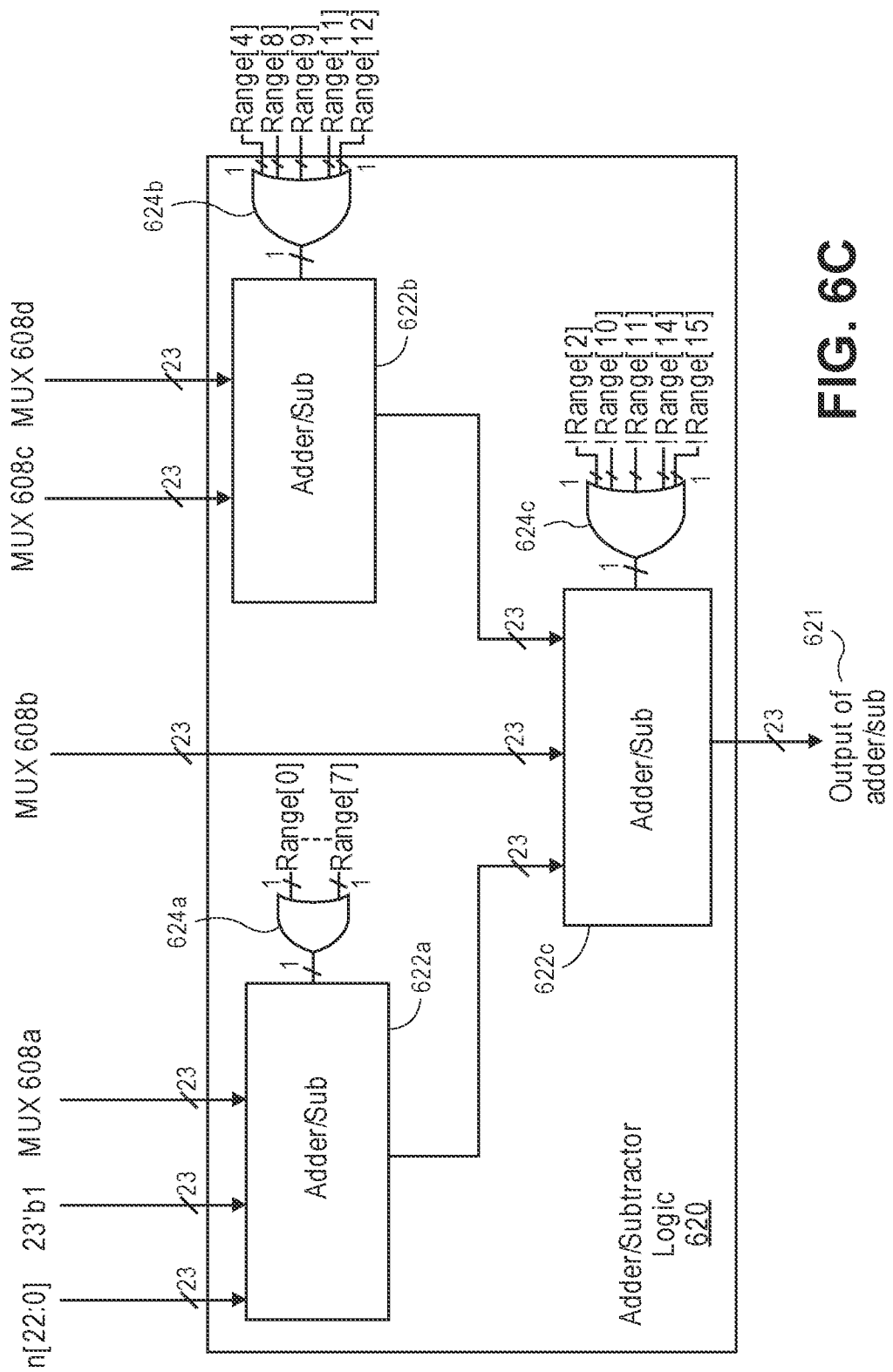

FIGS. 6A-C illustrate example embodiments of an antilog circuit 600 implemented using piecewise linear approximation. In particular, FIGS. 6A and 6B illustrate alternative implementations of the overall antilog circuit 600, while FIG. 6C illustrates the underlying adder/subtractor logic 620 of antilog circuit 600.

Antilog circuit 600 performs antilog calculations using 16-segment piecewise linear approximation. In this manner, no lookup tables or multiplier circuits are required by antilog circuit 600, and antilog calculations can be performed in a single clock cycle. The equations used by antilog circuit 600 to perform piecewise linear approximation for antilog calculations are shown below in TABLE 5.

TABLE 5

Piecewise linear approximation equations for antilog$_2$($\eta$) = $2^\eta$

| RANGE # | RANGE | EQUATION |
|---|---|---|
| 0 | $0 \leq \eta < 0.0625$ | $\eta - \frac{\eta}{4} - \frac{\eta}{32} + 1$ |
| 1 | $0.0625 \leq \eta < 0.125$ | $\eta - \frac{\eta}{4} - \frac{\eta}{64} + 1 - \frac{1}{512}$ |
| 2 | $0.125 \leq \eta < 0.1875$ | $\eta - \frac{\eta}{4} + \frac{\eta}{32} + 1 - \frac{1}{128}$ |
| 3 | $0.1875 \leq \eta < 0.25$ | $\eta - \frac{\eta}{8} - \frac{\eta}{16} + 1 - \frac{1}{64}$ |
| 4 | $0.25 \leq \eta < 0.3125$ | $\eta - \frac{\eta}{8} - \frac{\eta}{32} + 1 - \frac{1}{32} + \frac{1}{128}$ |
| 5 | $0.3125 \leq \eta < 0.375$ | $\eta - \frac{\eta}{8} + 1 - \frac{1}{32}$ |
| 6 | $0.375 \leq \eta < 0.4375$ | $\eta - \frac{\eta}{16} - \frac{\eta}{64} + 1 - \frac{1}{32} - \frac{1}{64}$ |
| 7 | $0.4375 \leq \eta < 0.5$ | $\eta - \frac{\eta}{32} - \frac{\eta}{64} + 1 - \frac{1}{16}$ |
| 8 | $0.5 \leq \eta < 0.5625$ | $\eta + \frac{\eta}{512} + 1 - \frac{1}{8} + \frac{1}{32}$ |
| 9 | $0.5625 \leq \eta < 0.625$ | $\eta + \frac{\eta}{16} - \frac{\eta}{64} + 1 - \frac{1}{8} + \frac{1}{128}$ |
| 10 | $0.625 \leq \eta < 0.6875$ | $\eta + \frac{\eta}{16} + \frac{\eta}{32} + 1 - \frac{1}{8} - \frac{1}{64}$ |
| 11 | $0.6875 \leq \eta < 0.75$ | $\eta + \frac{\eta}{8} + \frac{\eta}{64} + 1 - \frac{1}{4} + \frac{1}{16}$ |
| 12 | $0.75 \leq \eta < 0.8125$ | $\eta + \frac{\eta}{8} + \frac{\eta}{16} + 1 - \frac{1}{4} + \frac{1}{32}$ |
| 13 | $0.8125 \leq \eta < 0.875$ | $\eta + \frac{\eta}{4} - \frac{\eta}{128} + 1 - \frac{1}{4} - \frac{1}{128}$ |
| 14 | $0.875 \leq \eta < 0.9375$ | $\eta + \frac{\eta}{4} + \frac{\eta}{32} + 1 - \frac{1}{4} - \frac{1}{16}$ |
| 15 | $0.9375 \leq \eta < 1$ | $\eta + \frac{\eta}{4} + \frac{\eta}{8} + 1 - \frac{1}{4} - \frac{1}{8}$ |

The equations in TABLE 5 are designed to compute or approximate the result of antilog$_2$ of $\eta$, which is equivalent to 2 raised to the power of $\eta$, or $2^\eta$, where $\eta$ represents the fraction portion of a fixed-point input number 601 (input [22:0]). For example, the fixed-point input 601 of antilog circuit 600 will typically be derived from intermediate DNN computations on the fixed-point outputs 503 of the log circuit(s) 500 from FIGS. 5A-C. Moreover, as discussed above, the fraction portion of the fixed-point output 503 of a log circuit 500 is computed as log$_2$(1+m) rather than log$_2$(m) in order to avoid an undefined result when m=0. Thus, the equations from TABLE 5 for computing antilog$_2$ ($\eta$)=$2^\eta$ are designed to produce a value that is equivalent to 1+m, as reflected by the constant value of +1 in each equation.

In order to compute antilog$_2$($\eta$)=$2^\eta$ using 16-segment piecewise linear approximation, for example, the potential values of $\eta$ over the interval [0,1] are divided into 16 different ranges or segments, which are designated as ranges 0-15, and separate equations are defined for each range in order to approximate the result of antilog$_2$($\eta$) or $2^\eta$. Further, the respective equations are defined exclusively using addition and/or subtraction on any of the following types of operands: 17, fractions $\eta$ divided by powers of 2, and/or constant values. In this manner, the only division required by the equations is exclusively by powers of 2, and thus all division operations can be implemented using shifters. Further, the loss in precision that results from the limited "shift-based" division is compensated for through use of the constant values that are added and/or subtracted in certain equations. Accordingly, the respective equations can be implemented exclusively using addition, subtraction, and/or shift operations, thus eliminating the need for complex multiplication/division circuitry.

FIG. 6A illustrates the overall logic of antilog circuit 600, which is designed to implement the equations of TABLE 5. In the illustrated embodiment, antilog circuit 600 is supplied with a 32-bit fixed-point number as input 601 (e.g., supplied via an input register), and antilog circuit 600 computes a corresponding 32-bit floating-point number as output 603 (e.g., returned via an output register), which represents the antilog$_2$ result for input 601.

Input 601 includes a sign bit (input[31]), an 8-bit integer (input[30:23]), and a 23-bit fraction (input[22:0]). Given that the sign of input 601
always matches that of output 603, the sign bit of input 601 (input[31]) is fed directly
into the corresponding bit of output 603 (output[31]). The integer portion of input 601 (input[30:23]) is fed into an 8-bit adder 602, which adds back a bias of 0x7F in order to generate an 8-bit biased exponent that serves as the exponent field of the floating-point output 603.

Moreover, the fraction portion of input 601 (input [22:0]), which corresponds to the value of 17 in TABLE 5, is used to select the corresponding range and equation from TABLE 5 that will be used to compute the mantissa of the floating-point output 603 (output[22:0]). For example, the four most significant bits of the fraction portion of input 601 (input [22:19]) are supplied as input to range selection logic 604, which outputs sixteen 1-bit signals (range[0]-range[15]) that correspond to the respective ranges of 17 from TABLE 5, such that the signal corresponding to the applicable range is set to 1 while the remaining signals are set to 0. Based on the output of range selection logic 604, multiplexers (muxes) 608a-d are then used to select certain operands required by the corresponding equation from TABLE 5, such as the requisite fractions of 17 and fraction constants.

In particular, muxes 608a and 608b are used to select the fractions of 17 that are required by the corresponding equation from TABLE 5. For example, the value of 17 (input[22:0]) is fed into a first collection of shifters 606a, which each perform a right shift of $\eta$ by a certain number of bits in order compute the various fractions of $\eta$ over powers of 2 that appear throughout the equations from TABLE 5

$$\left(\text{e.g., } \frac{\eta}{4}, \frac{\eta}{8}, \frac{\eta}{16}, \frac{\eta}{32}, \frac{\eta}{64}, \frac{\eta}{128}, \frac{\eta}{512}\right).$$

The outputs of these shifters 606a are then fed as inputs to muxes 608a and 608b in the manner shown in FIG. 6A. Muxes 608a and 608b then select the particular fractions of $\eta$ that are required by the corresponding equation from TABLE 5, which is determined based on the output of range selection logic 604.

Similarly, muxes 608c and 608d are used to select the fraction constants that are required by the corresponding equation from TABLE 5. For example, a 23-bit constant with a value of 1 is fed into a second collection of shifters 606b, which each perform a right shift by a certain number of bits in order to generate the respective fraction constants that appear throughout the equations from TABLE 5

$$\left(\text{e.g., } \frac{1}{4}, \frac{1}{8}, \frac{1}{16}, \frac{1}{32}, \frac{1}{64}, \frac{1}{128}, \frac{1}{512}\right).$$

The outputs of these shifters 606b are then fed as inputs to muxes 608c and 608d in the manner shown in FIG. 6A. Muxes 608c and 608d then select the particular constant fractions that are required by the corresponding equation from TABLE 5, which is determined based on the output of range selection logic 604.

The respective operands selected by muxes 608a-d for the corresponding equation from TABLE 5 are then supplied as inputs to adder/subtractor 620. The value of $\eta$ (input[22:0]) and a constant value of 1 are also supplied as inputs to adder/subtractor 620, as those values are operands in all of the equations from TABLE 5. Adder/subtractor 620 then performs the appropriate addition and/or subtraction operations on these operands (e.g., based on the output of range selection logic 604), as required by the corresponding equation from TABLE 5. The result from adder/subtractor 620 then serves as the 23-bit mantissa portion of the floating-point output 603 (output [22:0]) of antilog circuit 600. The implementation of adder/subtractor 620 is further illustrated and described below in connection with FIG. 6C.

FIG. 6B illustrates an alternative implementation of an antilog circuit 600 implemented using piecewise linear approximation. In particular, while the antilog circuit of FIG. 6A is designed to compute the antilog of a fixed-point number as input, the antilog circuit of FIG. 6B is capable of computing the antilog of either a fixed-point number or a floating-point number as input. In this manner, the antilog circuit of FIG. 6B can compute the antilog$_2$ of either a fixed-point number in the log$_2$ domain (e.g., derived from the output of log circuit 500 from FIGS. 5A-C) or a floating-point number in its original domain. For example, as described in connection with FIG. 4, activation function (AF) circuit 400 uses antilog circuits for two purposes: (1) converting fixed-point numbers in the log$_2$ domain back to floating-point numbers in the original domain; and (2) computing powers of base 2 raised to floating-point exponents. Thus, the operands of antilog circuits of AF circuit 400 include both fixed-point numbers (e.g., for log$_2$ domain conversions) and floating-point numbers (e.g., for powers of base 2). Accordingly, the antilog circuits of AF circuit 400 can be implemented using the antilog circuit of FIG. 6B, which is capable of processing an input represented as either a fixed-point or floating-point number.

The operation of the antilog circuit of FIG. 6B is similar to that of FIG. 6A with the exception of how it processes the integer or exponent field of input 601 (input[30:23]), as described further below.

In particular, if input 601 is a fixed-point number, then it will contain an integer field (input[30:23]), which is supplied as one of the inputs to mux 616. The selection signal of mux 616 is a binary signal that indicates whether input 601 is a fixed-point number. Accordingly, the selection signal of mux 616 will have a value of 1 when input 601 is a fixed-point number, which causes mux 616 to select the integer portion of input 601 (input[30:23]) as its output, which is then supplied as an operand to 8-bit adder 602. Adder 602 then adds back a bias of 0x7F to the integer portion of input 601 (input[30:23]) in order to generate an 8-bit biased exponent, which then serves as the exponent portion of the floating-point output 603.

Alternatively, if input 601 is a floating-point number, then it will contain an exponent field (input[30:23]). The exponent field (input[30:23]) is supplied to an 8-bit subtractor 612, which subtracts a bias of 0x7F in order to generate a corresponding 8-bit unbiased exponent, which mathematically represents the $\log_2$ value of the exponent. The output of subtractor 612 is then fed into shifter 614, which performs a left shift by 2 unbiased exponent in order to compute a corresponding antilog$_2$ value, which is then supplied as one of the inputs to mux 616. The selection signal of mux 616 will have a value of 0 when input 601 is a floating-point number, which causes mux 616 to select the value from shifter 614 as its output. The output of mux 616 is then supplied as an operand to 8-bit adder 602, which adds back a bias of 0x7F in order to generate an 8-bit biased exponent, which then serves as the exponent portion of the floating-point output 603.

FIG. 6C illustrates an example implementation of the adder/subtractor logic 620 of antilog circuit 600 of FIGS. 6A and 6B, which is used to perform addition and/or subtraction on the operands of a corresponding equation from TABLE 5. In the illustrated embodiment, adder/subtractor logic 620 includes three adder/subtractors 622a-c and three OR gates 624a-c, which are described further below.

The first adder/subtractor 622a is supplied with the following operands as input: the value of η (input[22:0]), a constant value of 1, and the output of mux 608a. The particular combination of addition and/or subtraction performed on these operands is dictated by OR gate 624a, which is fed with the signals for range[0]-range[7] as input. In this manner, when η falls within ranges 0-7 from TABLE 5, the output of OR gate 624a will be 1, which causes adder/subtractor 622a to compute: η+1−output of mux 608a. Alternatively, when η falls within ranges 8−the output of OR gate 624a will be 0, which causes adder/subtractor 622a to compute: η+1+output of mux 608a.

The second adder/subtractor 622b is supplied with the following operands as input: the output of mux 608c and the output of mux 608d. The particular combination of addition and/or subtraction performed on these operands is dictated by OR gate 624b, which is fed with the signals for range[4], range[8], range[9], range[11], and range[12] as input. In this manner, when η falls within range 4, 8, 9, 11, or 12 from TABLE 5, the output of OR gate 624a will be 1, which causes adder/subtractor 622b to compute: output of mux 608c−output of mux 608d. Alternatively, when η falls within any of the remaining ranges from TABLE 5, the output of OR gate 624a will be 0, which causes adder/subtractor 622b to compute: output of mux 608c+output of mux 608d.

The third adder/subtractor 622c is supplied with the following operands as input: the output of adder/subtractor 622a, the output of adder/subtractor 622b, and the output of mux 608b. The particular combination of addition and/or subtraction performed on these operands is dictated by OR gate 624c, which is fed with the inverse or NOT value of the signals for range[2], range[10], range[11], range[14], and range[15] as input. In this manner, when η falls within any range from TABLE 5 other than range 2, 10, 11, 14, and 15, the output of OR gate 624c will be 1, which causes adder/subtractor 622c to compute: output of adder/subtractor 622a−output of adder/subtractor 622b−output of mux 608b. Alternatively, when 17 falls within range 2, 10, 11, 14, or 15 from TABLE 5, the output of OR gate 624c will be 0, which causes adder/subtractor 622c to compute: output of adder/subtractor 622a−output of adder/subtractor 622b+output of mux 608b.

The result from the third adder/subtractor 622c serves as the final output 621 of the adder/subtractor logic 620 of FIG. 6C.

Figure 7:
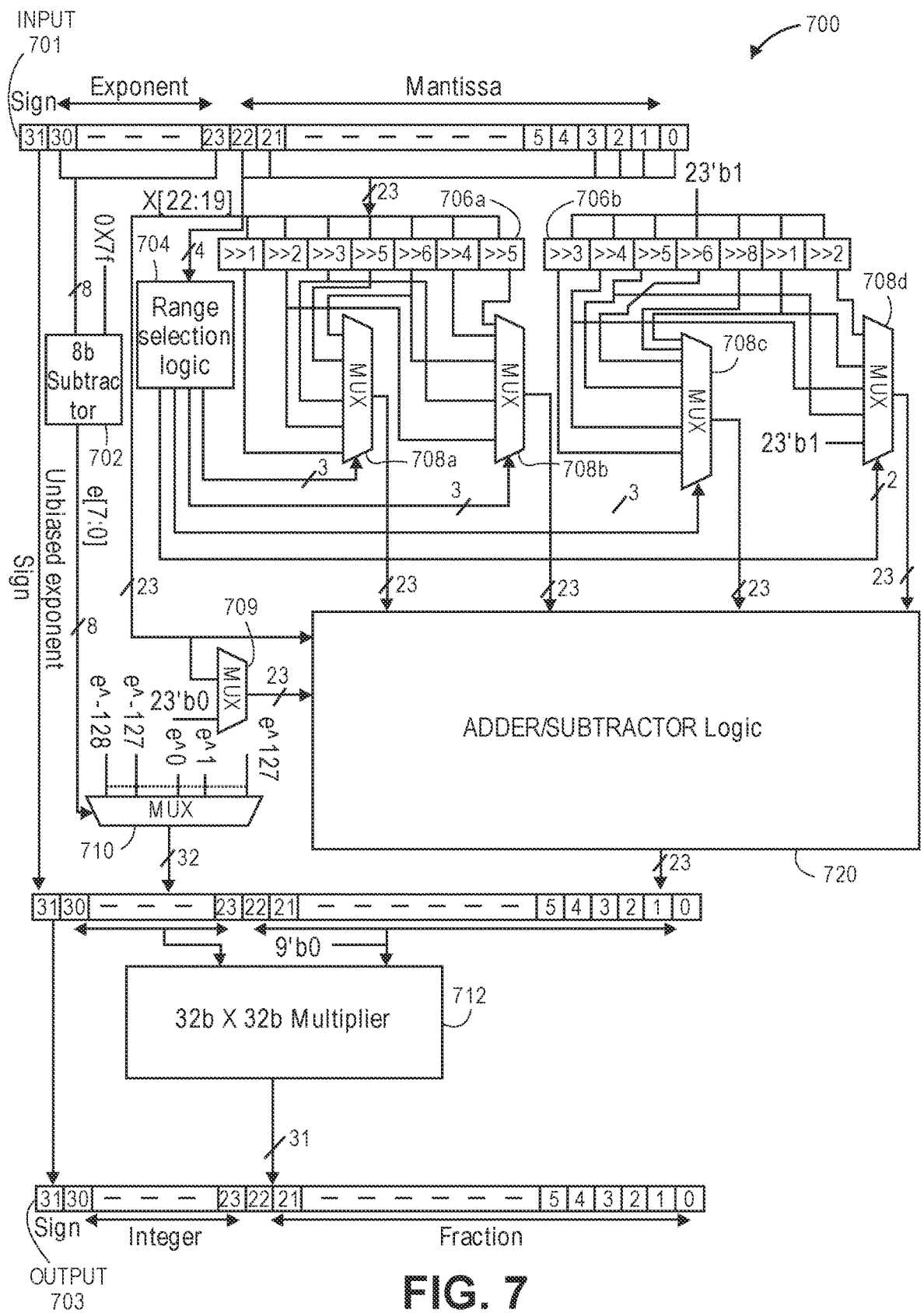
FIG. 7 illustrates an example embodiment of an exponent circuit implemented using piecewise linear approximation.

FIG. 7 illustrates an example embodiment of an exponent circuit 700 implemented using piecewise linear approximation. In particular, exponent circuit 700 performs exponent calculations using 16-segment piecewise linear approximation. In this manner, exponent circuit 700 requires no lookup tables and only one multiplier, and exponent calculations can be performed in two clock cycles.

The equations used by exponent circuit 700 to perform piecewise linear approximation for exponent calculations are shown below in TABLE 6.

TABLE 6

Piecewise linear approximation equations for exponent $e^x$

| RANGE # | RANGE | EQUATION |
|---|---|---|
| 0 | 0 ≤ x < 0.0625 | $x + \frac{x}{32} + 1$ |
| 1 | 0.0625 ≤ x < 0.125 | $x + \frac{x}{64} + \frac{x}{32} + 1 - \frac{1}{256}$ |
| 2 | 0.125 ≤ x < 0.1875 | $x + \frac{x}{8} + \frac{x}{32} + 1 - \frac{1}{64}$ |
| 3 | 0.1875 ≤ x < 0.25 | $x + \frac{x}{4} + 1 - \frac{1}{32}$ |
| 4 | 0.25 ≤ x < 0.3125 | $x + \frac{x}{4} + \frac{x}{16} + 1 - \frac{1}{16}$ |
| 5 | 0.3125 ≤ x < 0.375 | $x + \frac{x}{4} + \frac{x}{8} + 1 - \frac{1}{16}$ |
| 6 | 0.375 ≤ x < 0.4375 | $x + \frac{x}{2} + 1 - \frac{1}{8}$ |
| 7 | 0.4375 ≤ x < 0.5 | $x + \frac{x}{2} + \frac{x}{8} + 1 - \frac{1}{8} - \frac{1}{16}$ |
| 8 | 0.5 ≤ x < 0.5625 | $2x - \frac{x}{4} - \frac{x}{32} + 1 - \frac{1}{4} + \frac{1}{32}$ |
| 9 | 0.5625 ≤ x < 0.625 | $2x - \frac{x}{8} - \frac{x}{16} + 1 - \frac{1}{4} - \frac{1}{64}$ |
| 10 | 0.625 ≤ x < 0.6875 | $2x - \frac{x}{16} - \frac{x}{64} + 1 - \frac{1}{4} - \frac{1}{8}$ |
| 11 | 0.6875 ≤ x < 0.75 | $2x + \frac{x}{16} + 1 - \frac{1}{2} + \frac{1}{16}$ |
| 12 | 0.75 ≤ x < 0.8125 | $2x + \frac{x}{2} + \frac{x}{16} + 1 - \frac{1}{2} - \frac{1}{32}$ |
| 13 | 0.8125 ≤ x < 0.875 | $2x + \frac{x}{4} + \frac{x}{16} + \frac{1}{4} + \frac{1}{8}$ |
| 14 | 0.875 ≤ x < 0.9375 | $2x + \frac{x}{2} - \frac{x}{16} + \frac{1}{4} - \frac{1}{64}$ |
| 15 | 0.9375 ≤ x < 1 | $2x + \frac{x}{2} + \frac{x}{8} + \frac{1}{16}$ |

The equations in TABLE 6 are designed to compute or approximate the result of the natural exponential function ex, where e represents the natural exponent constant (e.g., Euler's number) and x represents the 23-bit mantissa of a 32-bit floating-point input 701 (input[22:0]). In order to compute $e^x$ using 16-segment piecewise linear approximation, for example, the potential values of x over the interval [0,1] are divided into 16 different ranges or segments, which are designated as ranges 0-15, and separate equations are defined for each range in order to approximate the result of $e^x$. Further, the respective equations are defined exclusively using addition and/or subtraction on any of the following types of operands: x, 2x, fractions of x divided by powers of 2, and/or constant values. In this manner, the only division required by the equations is exclusively by powers of 2, and thus all division operations can be implemented using shifters. Further, the loss in precision that results from the limited "shift-based" division is compensated for through use of the constant values that are added and/or subtracted in certain equations. Accordingly, the respective equations for ex can be implemented exclusively using addition, subtraction, and/or shift operations.

In order to complete the exponent operation, the resulting value of $e^x$, which represents e raised to the power of the mantissa portion of input 701 (input[22:0]), must then be multiplied with the value of e raised to the power of the exponent portion of input 701 (input[30:23]). Accordingly, only one multiplication operation is required for the exponent operation, and thus exponent circuit 700 only requires a single multiplier circuit.

The overall logic of exponent circuit 700 is illustrated in FIG. 7. In the illustrated embodiment, exponent circuit 700 is supplied with a 32-bit floating-point number as input 701, and exponent circuit 700 computes a corresponding 32-bit fixed-point number as output 703, which corresponds to the natural exponent constant e raised to the power of the floating-point number represented by input 701, or $e^{input}$.

Floating-point input 701 includes a sign bit (input[31]), an 8-bit exponent (input[30:23]), and a 23-bit mantissa (input [22:0]). Given that the sign of input 701 always matches that of output 703, the sign bit of input 701 (input[31]) is fed directly into the corresponding bit of output 703 (output[31]).

The exponent portion of input 701 (input[30:23]) is fed into an 8-bit subtractor 702, which subtracts a bias of 0x7F in order to generate an 8-bit unbiased exponent. The value of the natural exponent constant e raised to the power of the unbiased exponent, or $e^{unbiased\_exponent}$, is then output by mux 710. For example, an 8-bit unbiased exponent has $2^8$=256 potential values, which range from −128 to +127. The values of e raised to all 256 potential values of the unbiased exponent ($e^{-128}, e^{-127}, \ldots, e^0, e^1, \ldots, e^{127}$) are precomputed and fed as constants inputs into mux 710. The 8-bit unbiased exponent output by subtractor 702 serves as the selection signal of mux 710, which causes mux 710 to select the precomputed constant input that corresponds to $e^{unbiased\_exponent}$. The output of mux 710 ($e^{unbiased\_exponent}$) is then fed into multiplier 712 as one of its operands, as discussed further below.

The mantissa portion of input 701 (input [22:0]) is processed according to the equations from TABLE 6. For example, exponent circuit 700 is designed to compute the natural exponent constant e raised to the power of the mantissa (input [22:0]), or ex, where x represents the mantissa (input [22:0]). Moreover, exponent circuit 700 computes ex using piecewise linear approximation based on the equations from TABLE 6. In particular, the mantissa portion of input 701 (input [22:0]) (which corresponds to the value of x in TABLE 6) is used to select the corresponding range and equation from TABLE 6 that will be used to compute the value of ex. For example, the four most significant bits of the mantissa of input 701 (input[22:19]) are supplied as input to range selection logic 704, which outputs sixteen 1-bit signals (range[0]-range[15]) corresponding to the respective ranges of x from TABLE 6, such that the signal corresponding to the applicable range is set to 1 while the remaining signals are set to 0. Based on the output of range selection logic 704, multiplexers (muxes) 708a-d are then used to select certain operands required by the corresponding equation from TABLE 6, such as the requisite fractions of x and constant values that appear in the equation.

For example, muxes 708a and 708b are used to select the fractions of x that are required by the corresponding equation from TABLE 6. For example, the value of x (input[22: 0]) is fed into a first collection of shifters 706a, which each perform a right shift of x by a certain number of bits in order compute the various fractions of x over powers of 2 that appear throughout the equations from TABLE 6

$$\left(\text{e.g., } \frac{x}{2}, \frac{x}{4}, \frac{x}{8}, \frac{x}{16}, \frac{x}{32}, \frac{x}{64}\right).$$

The outputs of these shifters 706a are then fed as inputs to muxes 708a and 708b in the manner shown in FIG. 7. Muxes 708a and 708b then select the particular fractions of x that are required by the corresponding equation from TABLE 6, which is determined based on the output of range selection logic 704.

Similarly, muxes 708c and 708d are used to select the constant values that are required by the corresponding equation from TABLE 6, such as the fraction constants and/or the constant value of 1 required by certain equations. For example, a 23-bit constant with a value of 1 is fed into a second collection of shifters 706b, which each perform a right shift by a certain number of bits in order to generate the respective fraction constants that appear throughout the equations from TABLE 6

$$\left(\text{e.g., } \frac{1}{2}, \frac{1}{4}, \frac{1}{8}, \frac{1}{16}, \frac{1}{32}, \frac{1}{64}, \frac{1}{256}\right).$$

The outputs of these shifters 706b are then fed as inputs to muxes 708c and 708d in the manner shown in FIG. 7. Further, a constant value of 1 (which is required by certain equations from TABLE 6) is also supplied as one of the inputs to mux 708d. Muxes 708c and 708d then select the particular combination of constants that are required by the corresponding equation from TABLE 6, which is determined based on the output of range selection logic 704.

The respective operands selected by muxes 708a-d for the corresponding equation from TABLE 6 are then supplied as inputs to adder/subtractor 720. The value of x (input[22:0]) is also supplied to adder/subtractor 720 through either one or two of its inputs, depending on whether the corresponding equation from TABLE 6 requires an operand of x or 2x. For example, the value of x is always directly supplied as one of the inputs of adder/subtractor 720, and in some cases, it may also be supplied through mux 709 as another input of adder/subtractor 720. In particular, the value of x and a 23-bit constant of 0 are supplied as inputs to mux 709, and mux 709 selects one of those values to supply as input to adder/subtractor 720. For example, if the corresponding equation from TABLE 6 requires x as an operand rather than 2x, mux 709 selects the constant of 0 as its output to adder/subtractor 720, since the value of x has already been supplied directly through another input of adder/subtractor 720. Alternatively, if the corresponding equation from TABLE 6 requires 2x as an operand rather than x, mux 709 selects the value of x as its output to adder/subtractor 720, since that results in the value of x being supplied through two inputs to adder/subtractor 720.

Adder/subtractor 720 then performs the appropriate addition and/or subtraction operations on these operands (e.g., based on the output of range selection logic 704), as required by the corresponding equation from TABLE 6. In this manner, the output of adder/subtractor 720 corresponds to the final result for ex, which is equivalent to the natural exponent constant e raised to the power of the mantissa of input 701 (input[22:0]).

The output of mux 710 (e raised to the power of the unbiased exponent of input 701), and the output of adder/subtractor 720 (e raised to the power of the mantissa of input 701), are then supplied as operands to multiplier 712, which multiplies those values together in order to generate the integer and fraction portions of the fixed-point output 703 of exponent circuit 700.

Figure 8:
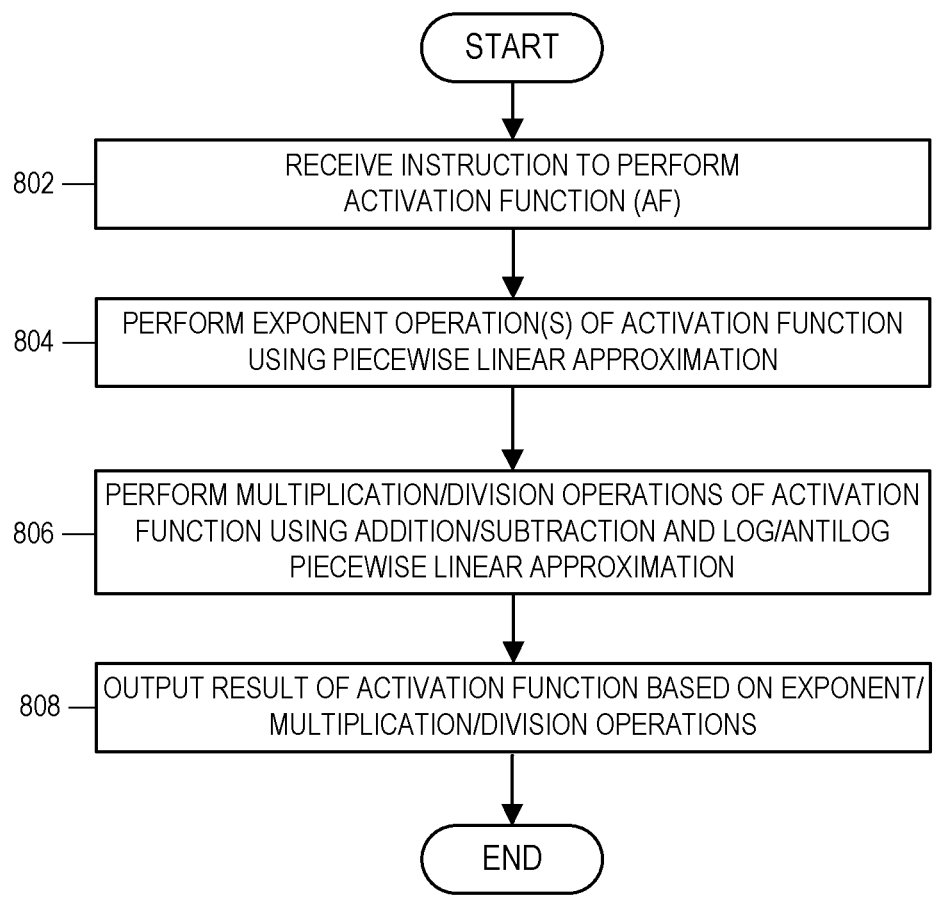
FIG. 8 illustrates a flowchart for an example processing architecture used to implement artificial neural networks.

FIG. 8 illustrates a flowchart 800 for an example processing architecture used to implement artificial neural networks (e.g., a deep neural network (DNN)). Flowchart 800 may be implemented, for example, using the embodiments and functionality described throughout this disclosure. For example, in some embodiments, flowchart 800 may be implemented using the activation circuit of FIGS. 2A-B or 4, the log circuit of FIGS. 5A-C, the antilog circuit of FIGS. 6A-C, and/or the exponent circuit of FIG. 7.

In the illustrated flowchart, a particular activation function is performed by an activation function circuit that is designed to accelerate performance of activation functions. In some embodiments, for example, the activation function circuit may be designed to support multiple types of activation functions that are commonly used to implement artificial or deep neural networks. Moreover, the activation function circuit may leverage log, antilog, and/or exponent circuits implemented using piecewise linear approximation in order to accelerate the calculations associated with the supported activation functions.

In some embodiments, for example, the activation function circuit may be implemented on and/or used in connection with processors, devices, and/or systems that execute applications with artificial neural networks (e.g., deep neural networks, convolutional neural networks, feedforward neural networks, recurrent neural networks, and so forth). In this manner, applications can leverage the activation function circuit in order to accelerate the activation functions used to implement artificial neural networks. For example, an application with an artificial neural network may be stored in memory and executed by a processor on a particular device or system. When the application needs to perform an activation function in connection with an operation in the artificial neural network, the application may issue a corresponding instruction or command to the processor and/or the activation function circuit, and the processor may then leverage the activation function circuit to perform the activation function. The result of the activation function may then be provided back to the processor and/or the application and subsequently used by the artificial neural network.

The flowchart begins at block 802, where an instruction or command to perform a particular activation function is received. The instruction or command, for example, may be issued by the application and received by the processor and/or the activation function circuit. In some embodiments, the instruction or command may identify the desired activation function and any operands or other parameters associated with the activation function.

Further, in some cases, the selected activation function may contain a combination of exponent, multiplication, and/or division operations. Accordingly, the flowchart first proceeds to block 804 to perform any exponent operations associated with the activation function. In some embodiments, for example, the exponent operations may be performed using piecewise linear approximation in order to reduce the latency associated with those operations (e.g., using the exponent circuit of FIG. 7). In some embodiments, however, if an exponent operation contains a base of 2, it can be computed using an antilog circuit (using an antilog base 2 operation) instead of the exponent circuit to reduce latency.

The flowchart then proceeds to block 806 to perform any multiplication and/or division operations associated with the activation function. In some embodiments, for example, multiplication and/or division operations of the activation function may be performed using a combination of log, antilog, and addition/subtraction operations. For example, by leveraging the properties of logarithmic functions, log and antilog operations can be used to convert the expensive multiplication/division operations into addition and/or subtraction. Further, the log and antilog operations can be performed using piecewise linear approximation in order to reduce the latency associated with those operations.

In some embodiments, for example, a log circuit may be used to perform log operations using piecewise linear approximation (e.g., the log circuit of FIGS. 5A-C). For example, the log circuit may be designed to compute the logarithm of an input represented as a floating-point number (e.g., with an exponent and a mantissa), and the log circuit may represent the resulting output as a fixed-point number (e.g., with an integer and a fraction). The log circuit first identifies the input or operand associated with the logarithm operation, and it then identifies or determines a particular range that the input falls within for purposes of piecewise linear approximation. For example, a plurality of ranges or segments, along with associated equations, are defined for performing logarithm operations using piecewise linear approximation. Accordingly, the corresponding range that the input falls within is identified, and the operands required by the equation for that range are obtained and/or generated. In some embodiments, for example, certain operands may be extracted, obtained, and/or computed using the input, such as the mantissa of the input, as well as fraction operands with denominators that are powers of 2, which may be generated using shift circuits (e.g., by shifting the bits in order to perform the division). The appropriate operands are then selected using one or more multiplexers, and a result of the equation is computed using the selected operands. For example, the result may be computed by performing addition and/or subtraction on the respective operands using an adder-subtractor circuit. Moreover, the exponent of the floating-point input may be converted into an unbiased exponent by subtracting a bias using a subtractor circuit. The output of the logarithm operation is then generated using the result from the corresponding equation and the unbiased exponent. For example, the unbiased exponent serves as the integer of the resulting fixed-point output, and the result of the equation serves as the fraction of the fixed-point output.

Similarly, an antilog circuit may be used to perform the antilog operations using piecewise linear approximation (e.g., the antilog circuit of FIGS. 6A-C). The antilog operations may be implemented in a similar manner, except using different computations for the integer/exponent portion and different equations for piecewise linear approximation.

The flowchart then proceeds to block 808 to output a result of the activation function based on the results of the exponent, multiplication, and/or division operations.

At this point, the flowchart may be complete. In some embodiments, however, the flowchart may restart and/or certain blocks may be repeated. For example, in some embodiments, the flowchart may restart at block 802 to continue performing activation functions.

DNN Performance

Figure 9A:
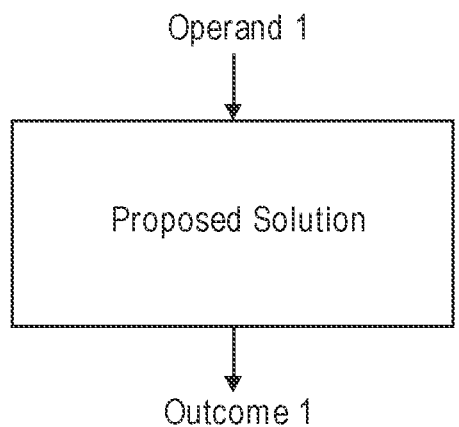
FIGS. 9A-B illustrate the scalability of example processing architectures for artificial neural networks with respect to the supported number of parallel operations.
Figure 9B:
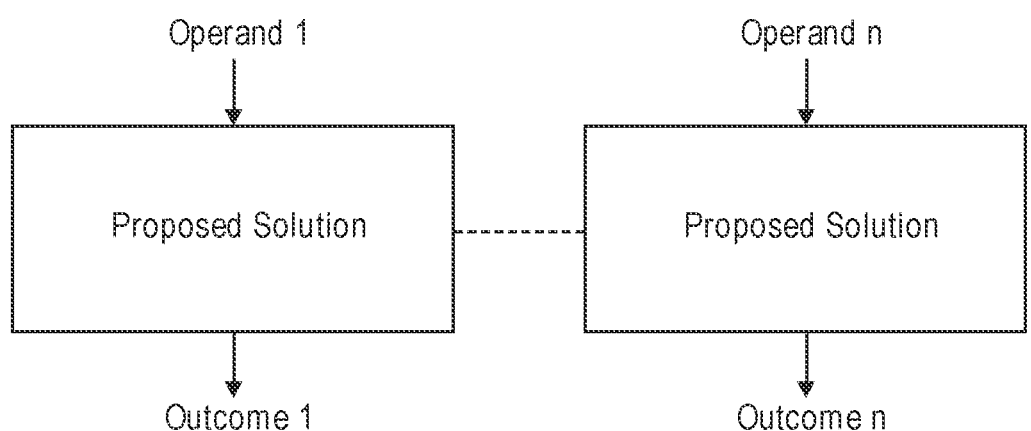

FIGS. 9A-B illustrate the scalability of the described embodiments with respect to the supported number of parallel operations. In particular, the described embodiments are implemented using a flexible design that enables the underlying hardware to be replicated in order to increase the number of parallel operations that are supported. In this manner, the described embodiments can be scaled as necessary in order to support the number of parallel operations required by a particular application or use case. For example, as shown by FIGS. 9A-B, the proposed solution can simply be replicated in order to scale it from a single operand to n operands. In particular, FIG. 9A illustrates the proposed solution for a single operand, whereas FIG. 9B illustrates the same for n operands. Further, the proposed solution can be pipelined to reduce latency and improve throughput.

Figure 10A:
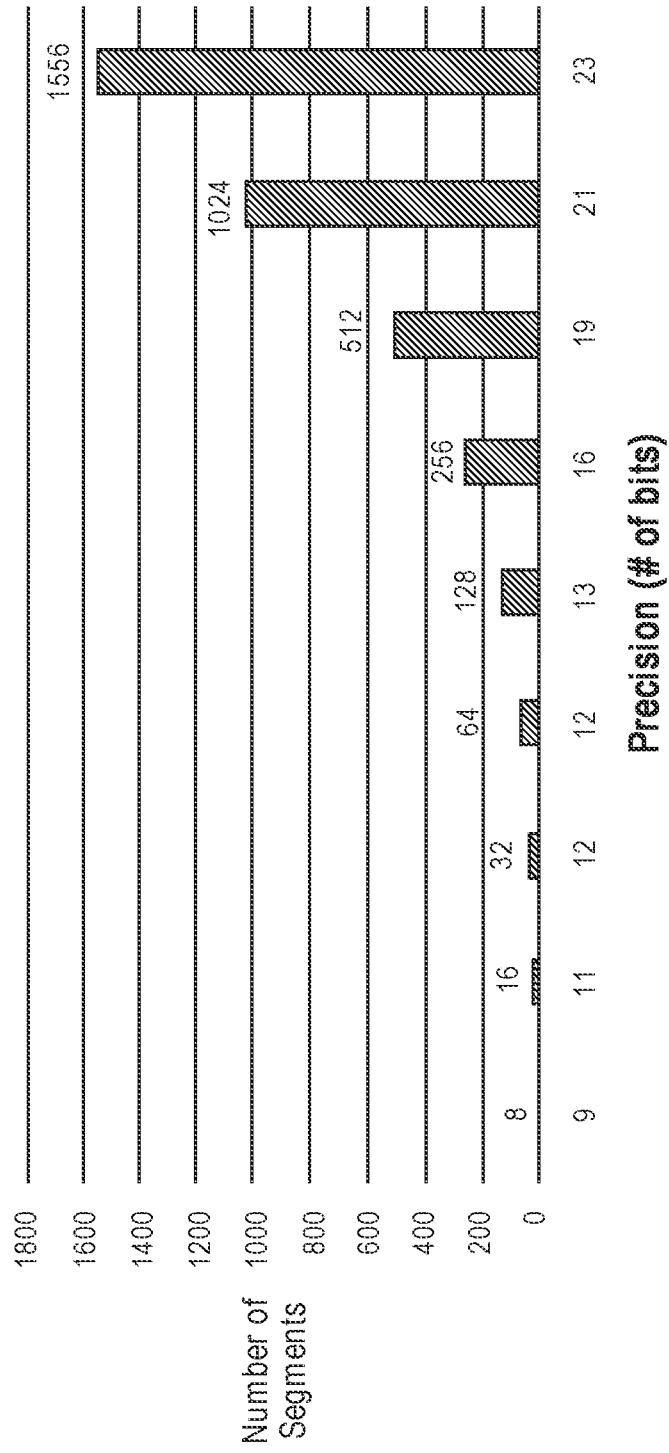
FIGS. 10A-E illustrate various performance aspects of example processing architectures for artificial neural networks.

FIG. 10A illustrates the scalability of the described embodiments with respect to precision. In particular, the described embodiments can be scaled to provide varying levels of precision by simply adjusting the number of segments in the piecewise linear approximation models implemented by the log, antilog, and/or exponent circuits. In this manner, the described embodiments can be scaled as necessary in order to provide the level of precision required for different applications and use cases. For example, if an application demands greater precision, the number of segments involved in the piecewise linear approximation models can be increased in order to accommodate the higher precision requirements.

The number of segments required in a piecewise linear approximation model for varying levels of precision is shown in FIG. 10A. As shown by FIG. 10A, for example, if an application demands 23-bit precision out of a 23-bit mantissa, the piecewise linear approximation model should be implemented using at least 1,556 segments. The number of segments used for piecewise linear approximation can be adjusted in a similar manner in order to provide any requisite level of precision.

Figure 10B:
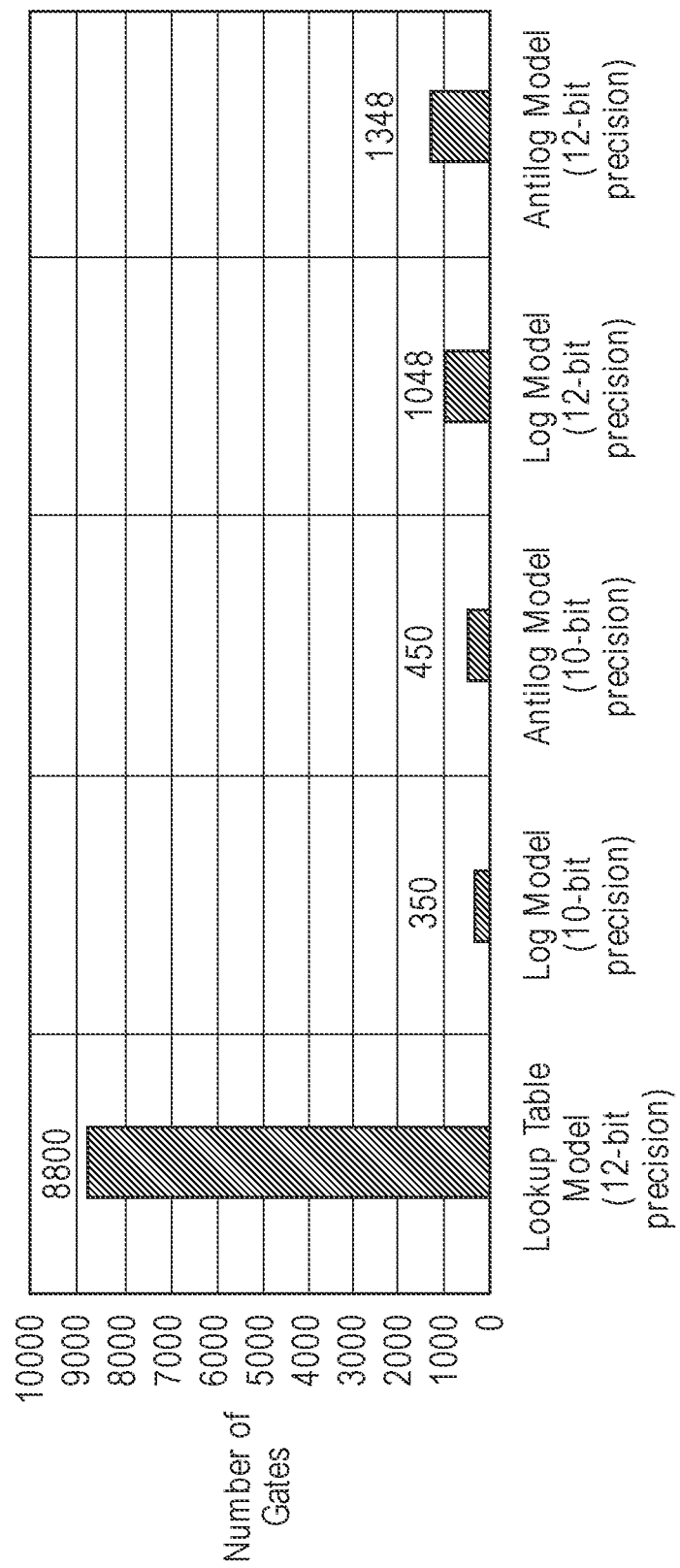

FIG. 10B compares the silicon area requirements for various implementations of log and antilog hardware. In particular, FIG. 10B illustrates the number of synthesis gates in a solution implemented using the lookup table method (with 12-bit precision) versus log and antilog circuits implemented using piecewise linear approximation (PLA) (with either 10-bit or 12-bit precision). As shown in FIG. 10B, the log and antilog circuits implemented using piecewise linear approximation use significantly fewer gates than the solution implemented using the lookup table method. For example, the lookup table solution uses 8,800 gates for 12-bit precision, while the piecewise linear approximation (PLA) log and antilog circuits respectively use 350 and 450 gates for 10-bit precision and 1,048 and 1,348 gates for 12-bit precision.

Figure 10C:
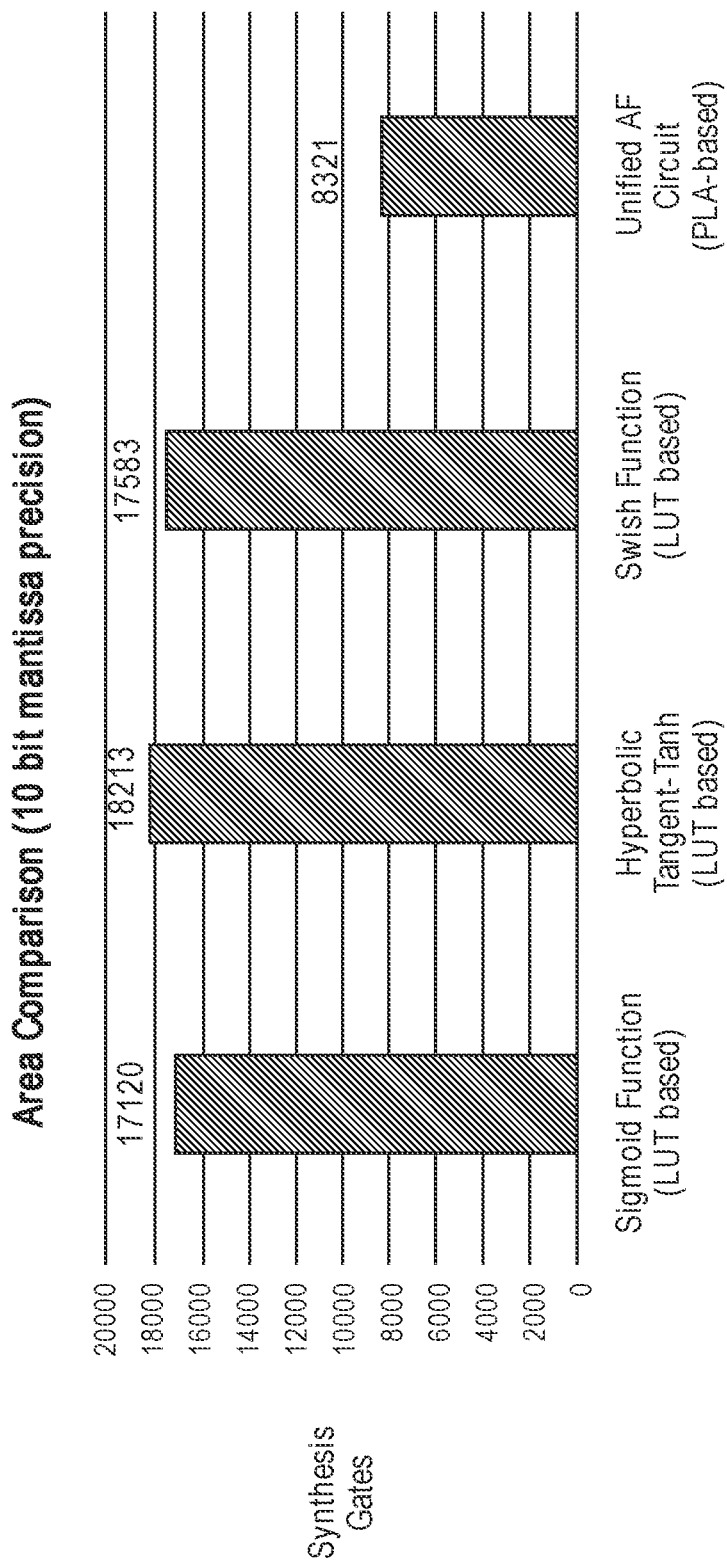

FIG. 10C compares the silicon area requirements for various implementations of activation function hardware (with 10-bit precision). In particular, FIG. 10C illustrates the number of synthesis gates for various individual activation functions implemented using lookup tables (LUTs) (e.g., Sigmoid, Hyperbolic Tangent (Tanh), and Swish), versus the number of synthesis gates for a unified activation function circuit that supports multiple activation functions and is implemented using piecewise linear approximation (PLA) (e.g., activation function circuit 200 of FIGS. 2A-B). As shown in FIG. 10C, for example, the unified circuit uses significantly fewer gates than any one of the LUT-based circuits, yet it supports multiple activation functions. For example, the unified circuit can be implemented using 8,321 total synthesis gates, as its simplified equations enable the exponent, logarithm, and antilogarithm blocks to be implemented using only 4,387, 1,048, and 1,348 synthesis gates, respectively. By comparison, each LUT-based circuit requires approximately 17,000-18,000 synthesis gates for only a single activation function.

Figure 10D:
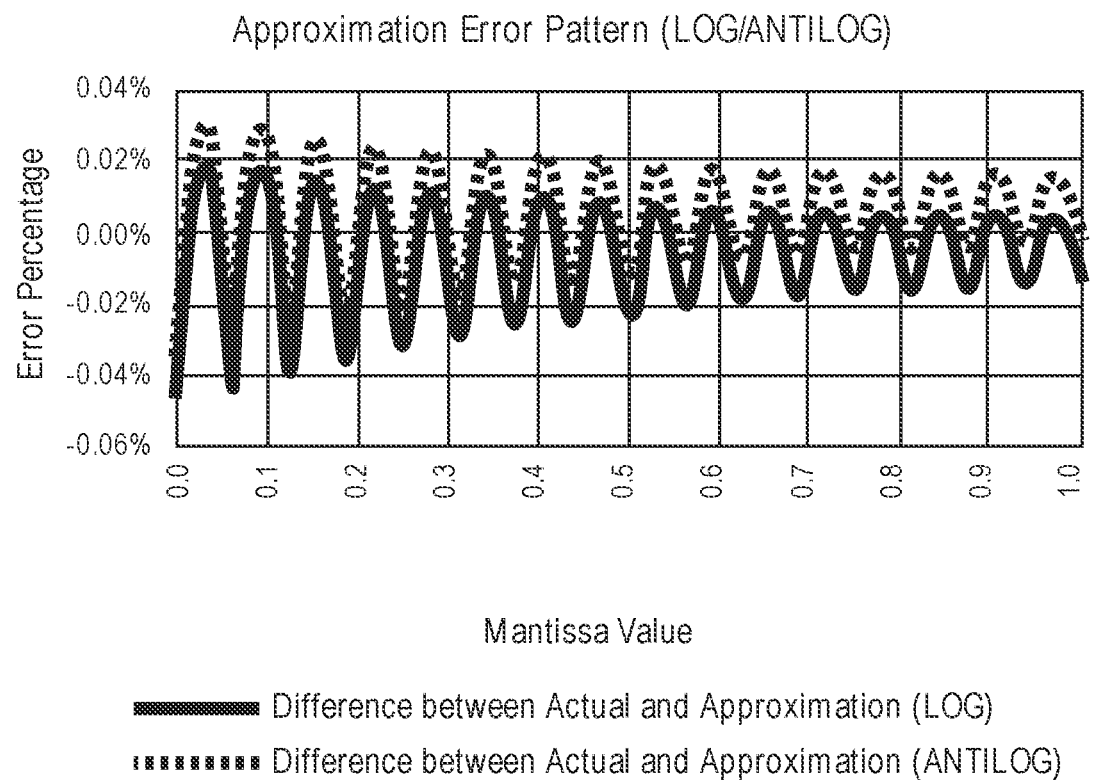
Figure 10E:
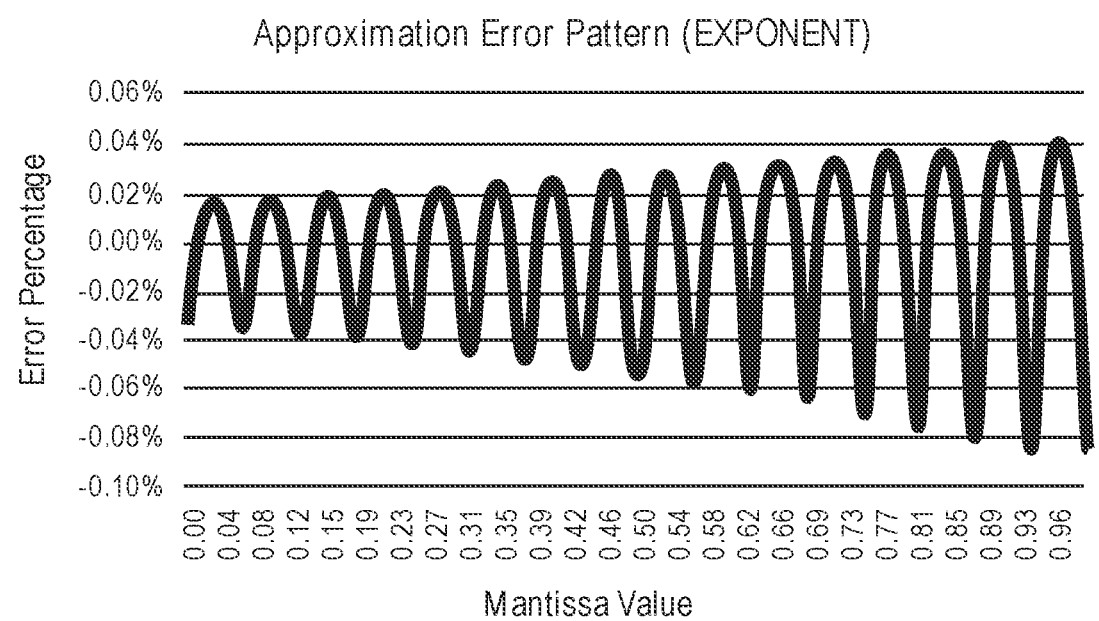

FIG. 10D illustrates the approximation error for log and antilog circuits implemented using piecewise linear approximation (e.g., FIGS. 5A-C and 6A-C), while FIG. 10E illustrates the approximation error for an exponent circuit implemented using piecewise linear approximation (e.g., FIG. 7). In particular, these circuits can be implemented with an absolute error of 0.045% (ABS) for the respective $\log_2$, and $\text{antilog}_2$, and exponent calculations, which translates into 12-bit precision in mantissa for an IEEE-754 single-precision floating-point number (e.g., 1 sign bit+8 exponent bits+12-bit mantissa=21-bit precision).

The overall precision of a unified activation function circuit implemented using the log, antilog, and exponent circuits (e.g., AF circuit 200 of FIGS. 2A-B) is 10 mantissa bits for an IEEE-754 single-precision floating-point number (e.g., 1 sign bit+8 exponent bits+10-bit mantissa=19-bit precision).

Figure 11A:
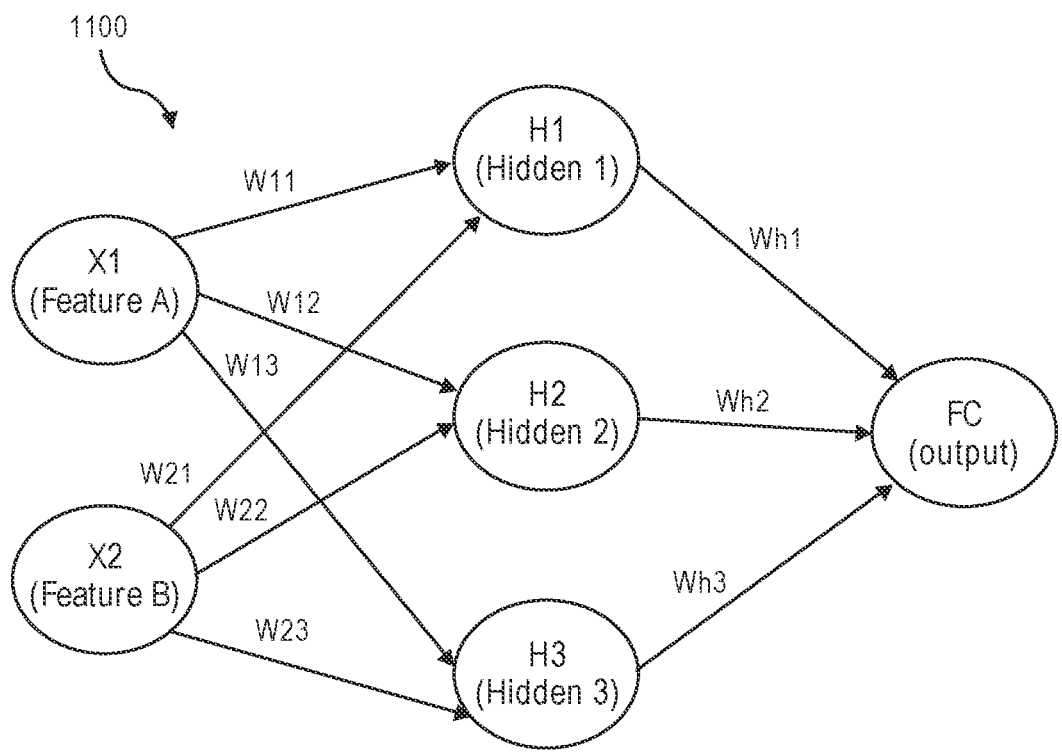
FIGS. 11A-C illustrate examples of DNNs implemented using traditional activation functions versus modified activation functions with base 2 exponent terms.
Figure 11B:
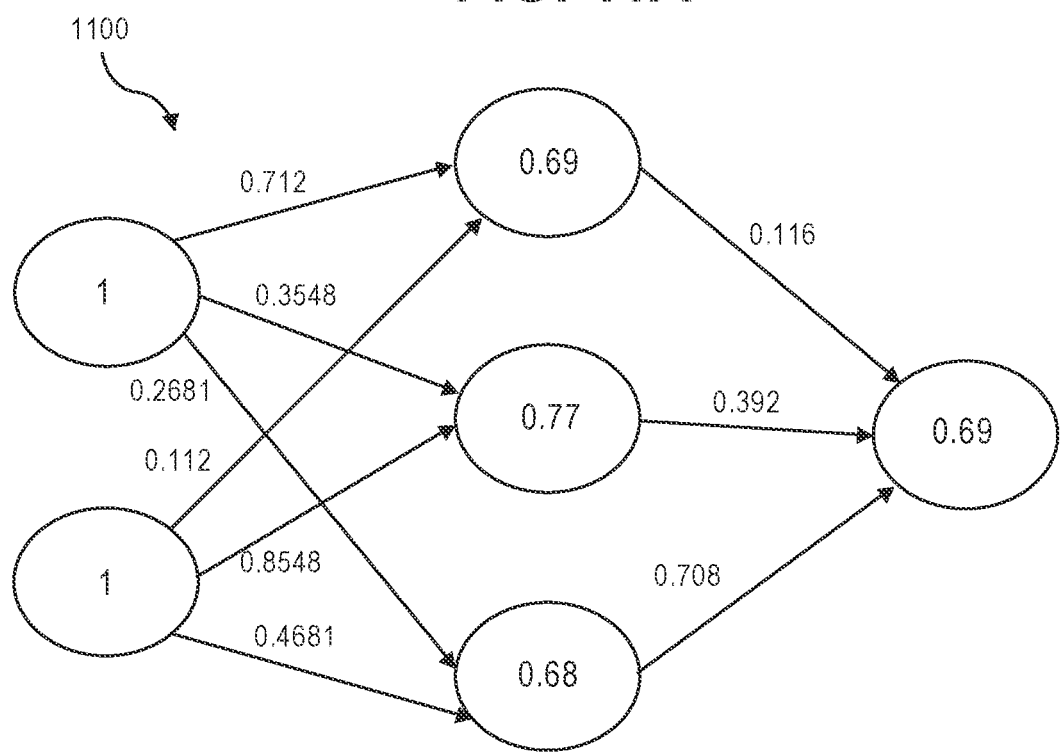
Figure 11C:
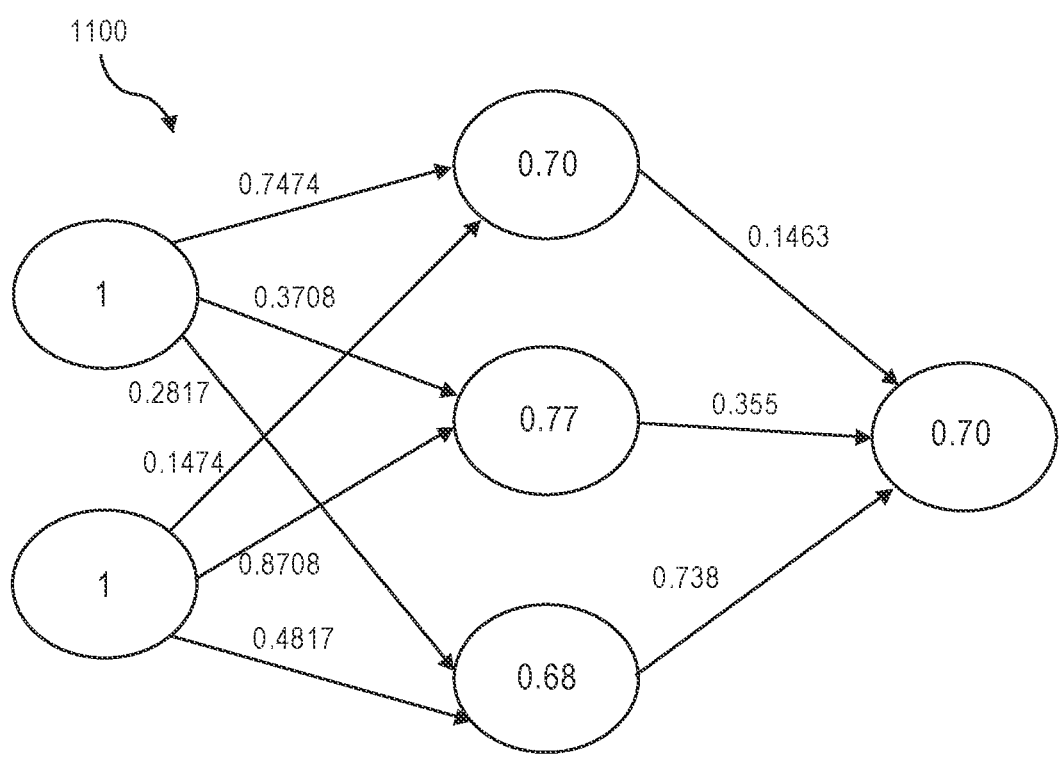

FIGS. 11A-C illustrate a performance comparison of deep neural networks (DNNs) implemented using traditional activation function equations (with powers of the exponent constant e) versus modified activation function equations (using powers of base 2). For example, as discussed above, AF circuit 200 of FIGS. 2A-B and AF circuit 400 of FIG. 4 both leverage piecewise linear approximation in order to implement activation functions. However, AF circuit 200 implements traditional activation functions, while AF circuit 400 implements modified activation functions that use powers of 2 instead of powers of the exponent constant e. The performance of these respective approaches is compared in the example illustrated by FIGS. 11A-C.

FIG. 11A illustrates an example DNN 1100 that includes an input layer with two input neurons, a single hidden layer with three neurons, and a fully connected layer with one output neuron. For simplicity, DNN 1100 implements the feature mapping shown in TABLE 7, which has the same behavior of an XOR gate.

TABLE 7

| Mapping of DNN feature sets | | |
|---|---|---|
| FEATURE A | FEATURE B | OUTPUT |
| 0 | 0 | 0 |
| 0 | 1 | 1 |
| 1 | 0 | 1 |
| 1 | 1 | 0 |

The illustrated example focuses on one of these feature sets, namely A=1 and B =1, which is expected to have an output of 0. In the illustrated example, input neuron X1 corresponds to feature A and input neuron X2 corresponds to feature B.

FIG. 11B illustrates the processing that is performed when DNN 1100 is implemented using the traditional Sigmoid activation function:

$$f(x) = \frac{1}{1+e^{-x}}.$$

During the forward propagation stage, the weights are selected randomly as follows: W11=0.8, W12=0.4, W13=0.3, W21=0.2, W22=0.9, WW23=0.5, Wh1=Wh2=0.5, and Wh3=0.9. The output of the hidden layer nodes (H) is then computed as follows:
H1=X1*W11+X2*W21=0.8+0.2=1;
H2=X1*W12+X2*W22=0.4+0.9=1.3;
H3=X1*W13+X2*W23=0.3+0.5=0.8.

A bias of 0 is taken in the illustrated example for simplicity. After applying the Sigmoid activation function, the updated hidden layer neurons have the following values:
H1=0.7310;
H2=0.7858;
H3=0.6899.

The fully connected (FC) layer can then be computed as: FC=H1*Wh1+H2*Wh2+H3*Wh3=0.7310*0.3+ 0.7858*0.5+0.6899*0.9=1.235. After applying the Sigmoid activation function to the fully connected layer, FC=0.7746. The error is then computed as follows: error=expected−calculated=0-0.7746=−0.7746.

During the backwards propagation and weight update stage, the derivative of the Sigmoid activation function $$f'(x) = \frac{e^{-x}}{(1+e^{-x})^2}$$

is used, and the following calculations are performed:
ΔFC=f'(FC value without activation function)*error=f' (1.235)*(−=−0.13439;
ΔFC=hidden layer neurons*hidden layer weights=H1*Wh1+H2*Wh2+H3*Wh3;
ΔWh1=AFC/H1=−0.13439/0.7310=−0.1838;
ΔWh2=AFC/H2=−0.13439/0.7858=−0.1710;
ΔWh3=AFC/H3=−0.13439/0.6899=−0.1920.

The following calculations are then performed with respect to ΔH1, ΔH2 and ΔH3:
New hidden layer values=ΔFC*f' (hidden layer neuron values without activation function)/hidden layer weights:
ΔH1=ΔFC*f'(1)/Wh1=−0.13439*0.1966/0.3=−0.088;
ΔH2=ΔFC*f'(1.3)/Wh2=−0.13439*0.1683=−0.0452;
ΔH1=ΔFC*f'(0.8)/Wh3=−0.13439*0.2139=−0.0319.

After back propagation, the new hidden layer weights have the following values:
Wh1=Wh1+ΔWh1=0.3−0.1838=0.1162;
Wh2=Wh2+ΔWh2=0.5−0.1710=0.392;
Wh3=Wh3+ΔWh3=0.9−0.1920=0.708.

The weight update between the input and hidden layers is then computed as follows:
Delta of weights=delta of hidden layer/inputs:
ΔW11=ΔH1/X1=−0.088/1=−0.088;
ΔW12=666 H2/X1=−0.0452/1=−0.0452;
ΔW13=ΔH3/X1=−0.0319/1=−0.0319;
ΔW21=ΔH1/X2=−0.088/1=−0.088;
ΔW22=ΔH2/X2=−0.0452/1=−0.0452;
ΔW23=ΔH3/X2=−0.0319/1=−0.0319.
New weights:
W11=W11+ΔW11=0.8−0.088=0.712;
W12=W12+ΔW12=0.4−0.0452=0.3548;
W13=W13+ΔW13=0.3−0.0319=0.2681;
W21=W21+ΔW 21=0.2−0.088=0.112;
W22=W22+ΔW22=0.9−0.0452=0.8548;
W23=W23+ΔW23=0.5−0.0319=0.4681.

FIG. 11B illustrates the state of DNN 1100 after the weights have been updated based on the calculations above. The output of the DNN is 0.69 after this iteration, which is an improvement over the output of 0.77 after the first iteration. The iterations continue in this manner until the loss function gradient reaches an acceptable level.

FIG. 11C illustrates the processing that is performed when DNN 1100 is implemented using the modified Sigmoid activation function, which has an exponent term with a base of 2 instead of a base of e:

$$f(x) = \frac{1}{1+2^{-x}}.$$

During the forward propagation stage, the weights are selected randomly as follows: W11=0.8, W12=0.4, W13=0.3, W21=0.2, W22=0.9, WW23=0.5, Wh1=0.3, Wh2=0.5, and Wh3=0.9. The output of the hidden layer nodes (H) is then computed as follows:
H1=X1*W11+X2*W21=0.8+0.2=1;
H2=X1*W12+X2*W22=0.4+0.9=1.3;
H3=X1*W13+X2*W23=0.3+0.5=0.8.

A bias of 0 is taken in the illustrated example for simplicity. After applying the modified Sigmoid activation function, the updated hidden layer neurons have the following values:
H1=0.6667;
H2=0.7117;
H3=0.6351.

The fully connected (FC) layer can then be computed as: FC=H1*Wh1+H2*Wh2+H3*Wh3=0.6667*0.3+ 0.7117*0.5+0.6351*0.9=1.1272. After applying the modified Sigmoid activation function to the fully connected layer, FC=The error is then computed as follows: error=expected−calculated=0−=−0.6859.

During the backwards propagation and weight update stage, the derivative of the modified Sigmoid activation function $$f'(x) = \frac{\ln(2)\cdot 2^x}{(1+2^{-x})^2}$$

is used, and the following calculations are performed:

$\Delta FC=f'$(FC value without activation function)*error=f'(1.1272)*(−0.6859)=−0.1024;

$\Delta FC$=hidden layer neurons*hidden layer weights=H1*Wh1+H2*Wh2+H3*Wh3;

$\Delta Wh1=\Delta FC/H1=-0.1024/0.6667=-0.15364$;

$\Delta Wh2=\Delta FC/H2=-0.1024/0.7117=-0.14402$;

$\Delta Wh3=\Delta FC/H3=-0.1024/0.6351=-0.16125$.

The following calculations are then performed with respect to $\Delta H1$, $\Delta H2$ and $\Delta H3$:

New hidden layer values=$\Delta FC*f'$ (hidden layer neuron values without activation function)/hidden layer weights:

$\Delta H1=\Delta FC*f'(1)/Wh1=-0.13439*0.1966/0.3=-0.05259$;

$\Delta H2=\Delta FC*f'(1.3)/Wh2=-0.13439*0.1683=-0.02917$;

$\Delta H1=\Delta FC*f'(0.8)/Wh3=-0.13439*0.2139=-0.01828$.

After back propagation, the new hidden layer weights have the following values:

$Wh1=Wh1+\Delta Wh1=0.3 -0.15364=0.1463$;

$Wh2=Wh2+\Delta Wh2=0.5 -0.14402=0.3559$;

$Wh3=Wh3+\Delta Wh3=0.9 -0.16125=0.7387$.

The weight update between the input and hidden layers is then computed as follows:

Delta of weights=delta of hidden layer/inputs:

$\Delta W11=\Delta H1/X1=-0.05259/1=-0.05259$;

$\Delta W12=\Delta H2/X1=-0.02917/1=-0.02917$;

$\Delta W13=\Delta H3/X1=-0.01828/1=-0.01828$;

$\Delta W21=\Delta H1/X2=-0.02917/1=-0.05259$;

$\Delta W22=\Delta H2/X2=-0.0452/1=-0.02917$;

$\Delta W23=\Delta H3/X2=-0.01828/1=-0.01828$;

New weights:

$W11=W11+\Delta W11=0.8-0.05259=0.7474$;

$W12=W12+\Delta W12=0.4-0.02917=0.3708$;

$W13=W13+\Delta W13=0.3-0.01828=0.2817$;

$W21=W21+\Delta W21=0.2-0.05259=0.1474$;

$W22=W22+\Delta W22=0.9-0.02917=0.8708$;

$W23=W23+\Delta W23=0.5-0.01828=0.4817$.

FIG. 11C illustrates the state of DNN 1100 after the weights have been updated based on the calculations above (e.g., using the modified Sigmoid activation function). The output of the DNN of FIG. 11C is 0.70 after this iteration, which is comparable to the output of 0.69 for the DNN of FIG. 11B. The iterations continue in this manner until the loss function gradient reaches an acceptable level.

Figure 12A:
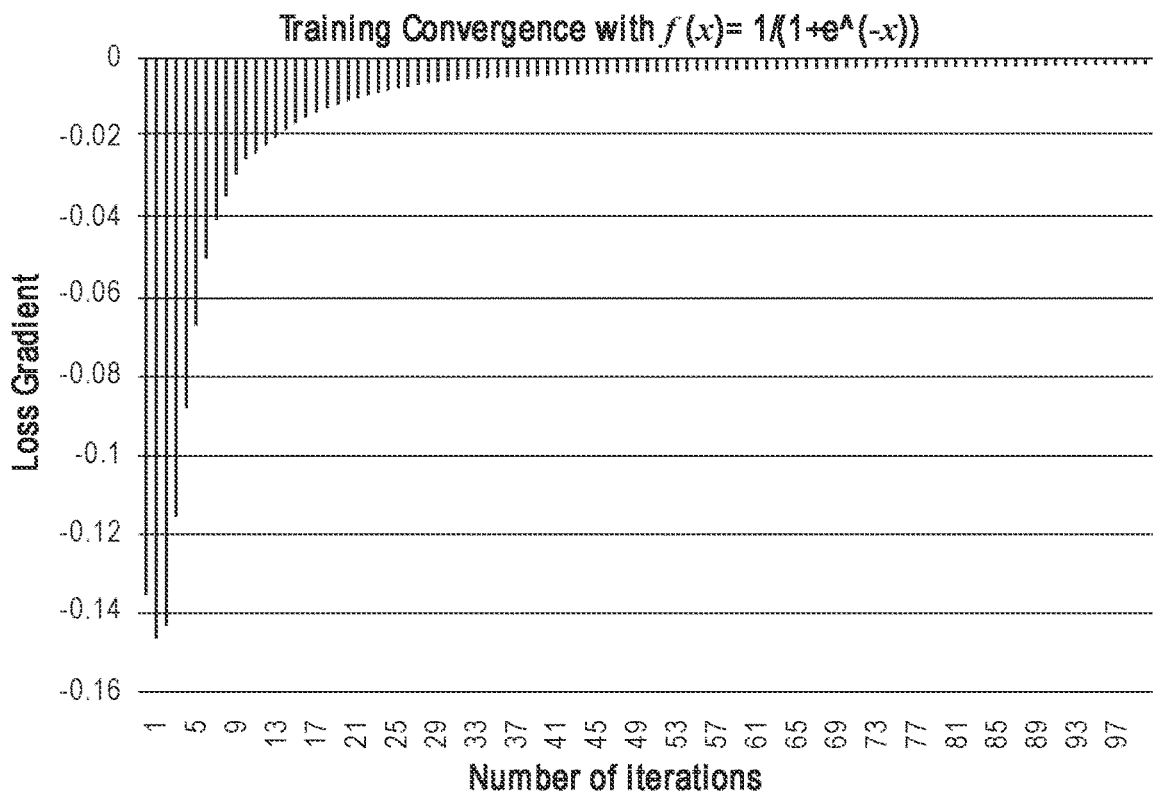
FIGS. 12A-B and 13 illustrate various performance aspects of DNNs implemented using traditional activation functions versus modified activation functions.
Figure 12B:
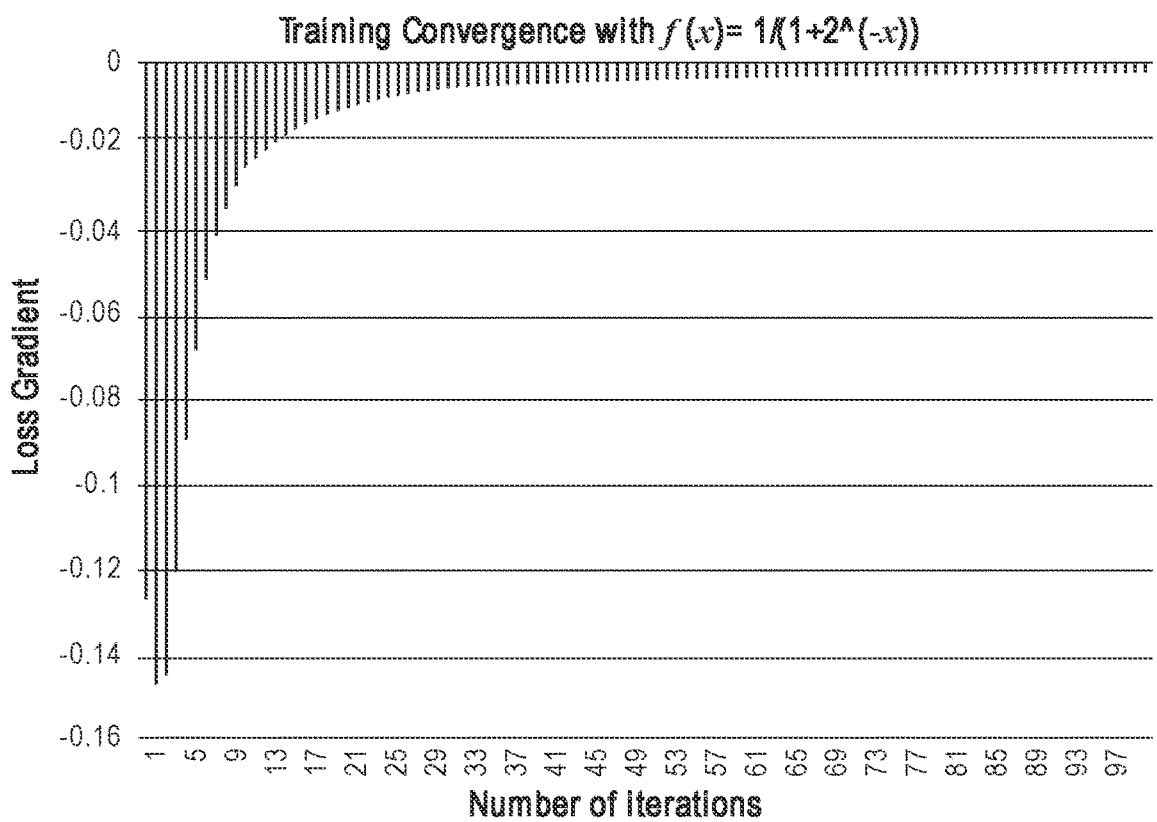
Figure 13:
Figure 14:
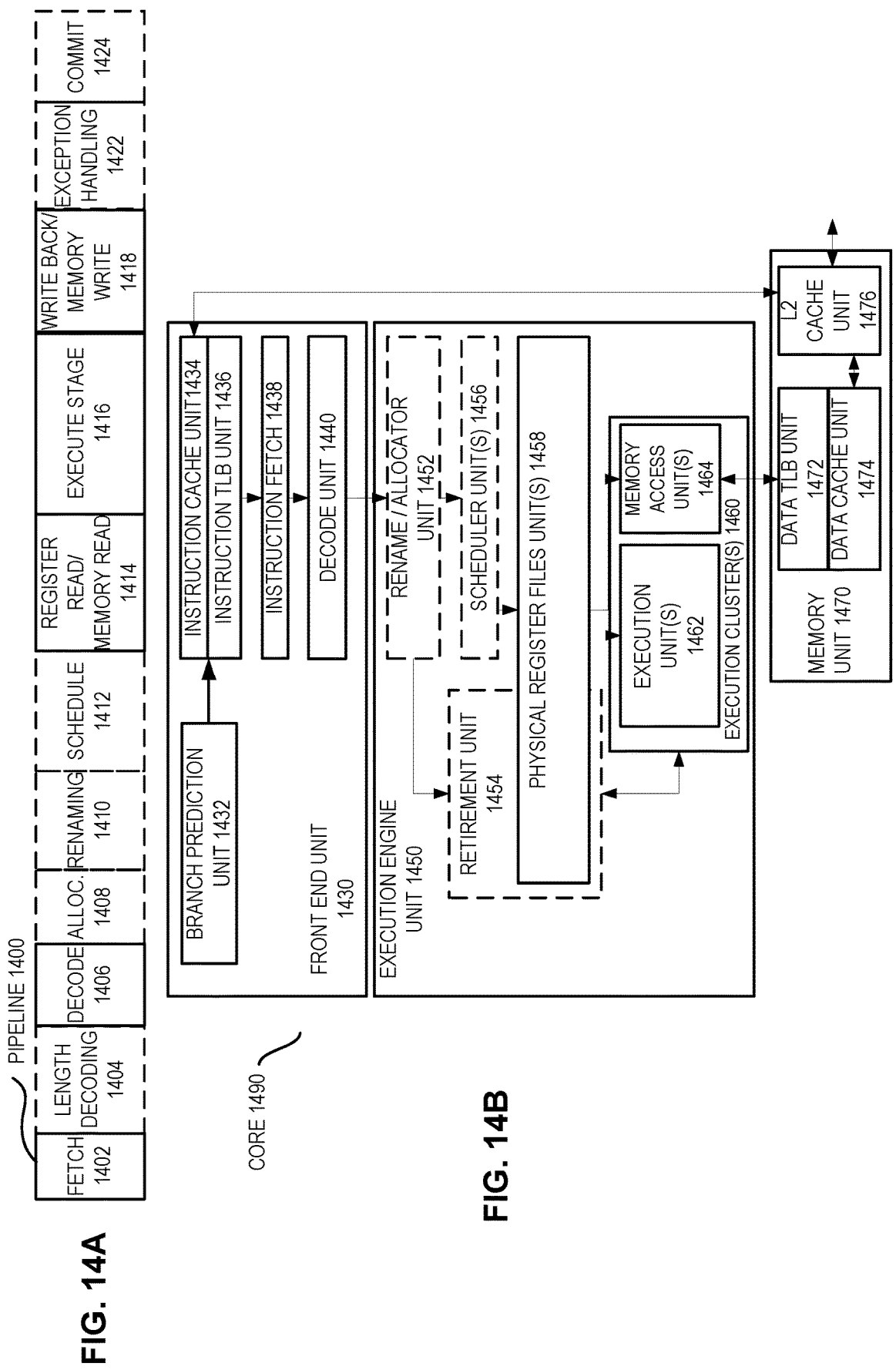
FIGS. 14A-B, 15, 16, 17, and 18 illustrate example implementations of computer architectures that can be used in accordance with embodiments disclosed herein.

FIGS. 12A-B illustrate a comparison of the training convergence for the respective DNNs of FIGS. 11B and 11C. In particular, FIG. 12A illustrates the rate of convergence for the original Sigmoid activation function used by the DNN of FIG. 11B, while FIG. 12B illustrates the rate of convergence for the modified Sigmoid activation function (e.g., using a power of base 2 instead of e) used by the DNN of FIG. 11C. FIG. 13 illustrates the error percentage or accuracy of these approaches.

Example Computing Architectures

FIGS. 14-18 illustrate example implementations of computing environments and architectures that can be used in accordance with embodiments disclosed herein. In various embodiments, for example, these example computer architectures may be used in conjunction with and/or used to implement the Deep Neural Network (DNN) processing functionality described throughout this disclosure.

Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

FIG. 14A is a block diagram illustrating both an exemplary in-order pipeline and an exemplary register renaming, out-of-order issue/execution pipeline according to embodiments of the invention. FIG. 14B is a block diagram illustrating both an exemplary embodiment of an in-order architecture core and an exemplary register renaming, out-of-order issue/execution architecture core to be included in a processor according to embodiments of the invention. The solid lined boxes in FIGS. 14A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 14A, a processor pipeline 1400 includes a fetch stage 1402, a length decode stage 1404, a decode stage 1406, an allocation stage 1408, a renaming stage 1410, a scheduling (also known as a dispatch or issue) stage 1412, a register read/memory read stage 1414, an execute stage 1416, a write back/memory write stage 1418, an exception handling stage 1422, and a commit stage 1424.

FIG. 14B shows processor core 1490 including a front end unit 1430 coupled to an execution engine unit 1450, and both are coupled to a memory unit 1470. The core 1490 may be a reduced instruction set computing (RISC) core, a complex instruction set computing (CISC) core, a very long instruction word (VLIW) core, or a hybrid or alternative core type. As yet another option, the core 1490 may be a special-purpose core, such as, for example, a network or communication core, compression engine, coprocessor core, general purpose computing graphics processing unit (GPGPU) core, graphics core, or the like.

The front end unit 1430 includes a branch prediction unit 1432 coupled to an instruction cache unit 1434, which is coupled to an instruction translation lookaside buffer (TLB) 1436, which is coupled to an instruction fetch unit 1438, which is coupled to a decode unit 1440. The decode unit 1440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1490 includes a microcode ROM or other medium that stores microcode for certain macroinstructions (e.g., in decode unit 1440 or otherwise within the front end unit 1430). The decode unit 1440 is coupled to a rename/allocator unit 1452 in the execution engine unit 1450.

The execution engine unit 1450 includes the rename/allocator unit 1452 coupled to a retirement unit 1454 and a set of one or more scheduler unit(s) 1456. The scheduler unit(s) 1456 represents any number of different schedulers, including reservations stations, central instruction window, etc. The scheduler unit(s) 1456 is coupled to the physical register file(s) unit(s) 1458. Each of the physical register file(s) units 1458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1458 comprises a vector registers unit, a write mask registers unit, and a scalar registers unit. These register units may provide architectural vector registers, vector mask registers, and general purpose registers. The physical register file(s) unit(s) 1458 is overlapped by the retirement unit 1454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1454 and the physical register file(s) unit(s) 1458 are coupled to the execution cluster(s) 1460. The execution cluster(s) 1460 includes a set of one or more execution units 1462 and a set of one or more memory access units 1464. The execution units 1462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1456, physical register file(s) unit(s) 1458, and execution cluster(s) 1460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1464). It should also be understood that where separate pipelines are used, one or more of these pipelines may be out-of-order issue/execution and the rest in-order.

The set of memory access units 1464 is coupled to the memory unit 1470, which includes a data TLB unit 1472 coupled to a data cache unit 1474 coupled to a level 2 (L2) cache unit 1476. In one exemplary embodiment, the memory access units 1464 may include a load unit, a store address unit, and a store data unit, each of which is coupled to the data TLB unit 1472 in the memory unit 1470. The instruction cache unit 1434 is further coupled to a level 2 (L2) cache unit 1476 in the memory unit 1470. The L2 cache unit 1476 is coupled to one or more other levels of cache and eventually to a main memory.

By way of example, the exemplary register renaming, out-of-order issue/execution core architecture may implement the pipeline 1400 as follows: 1) the instruction fetch 1438 performs the fetch and length decoding stages 1402 and 1404; 2) the decode unit 1440 performs the decode stage 1406; 3) the rename/allocator unit 1452 performs the allocation stage 1408 and renaming stage 1410; 4) the scheduler unit(s) 1456 performs the schedule stage 1412; 5) the physical register file(s) unit(s) 1458 and the memory unit 1470 perform the register read/memory read stage 1414; the execution cluster 1460 perform the execute stage 1416; 6) the memory unit 1470 and the physical register file(s) unit(s) 1458 perform the write back/memory write stage 1418; 7) various units may be involved in the exception handling stage 1422; and 8) the retirement unit 1454 and the physical register file(s) unit(s) 1458 perform the commit stage 1424.

The core 1490 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1434/1474 and a shared L2 cache unit 1476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 15:
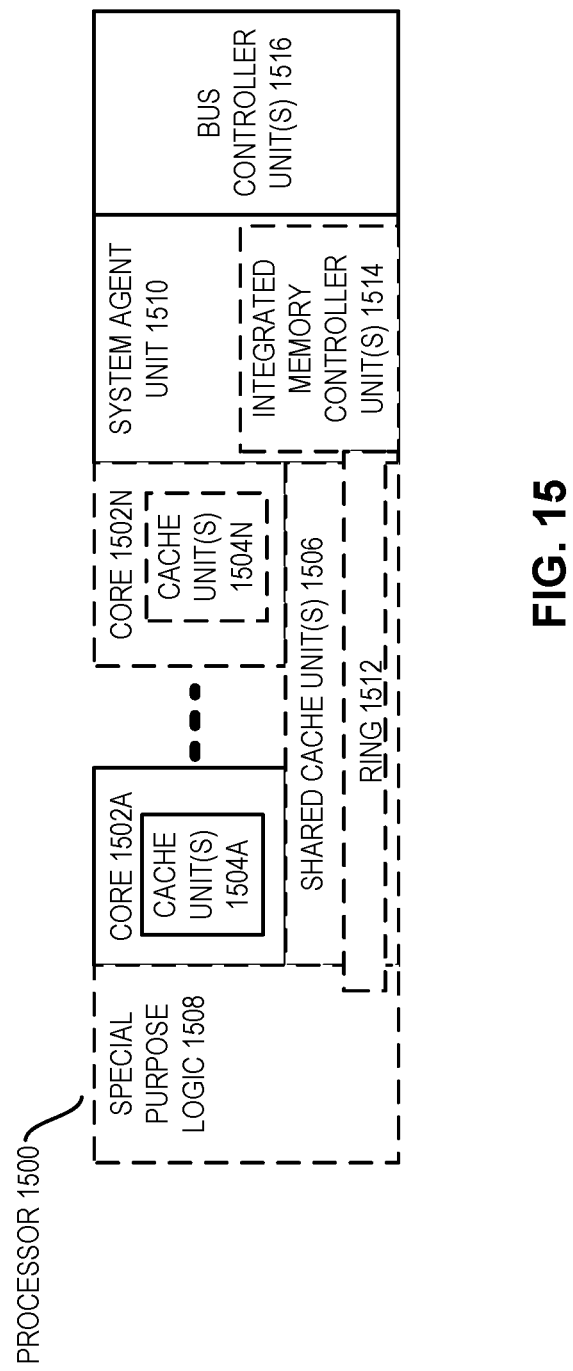

FIG. 15 is a block diagram of a processor 1500 that may have more than one core, may have an integrated memory controller, and may have integrated graphics according to embodiments of the invention. The solid lined boxes in FIG. 15 illustrate a processor 1500 with a single core 1502A, a system agent 1510, a set of one or more bus controller units 1516, while the optional addition of the dashed lined boxes illustrates an alternative processor 1500 with multiple cores 1502A-N, a set of one or more integrated memory controller unit(s) 1514 in the system agent unit 1510, and special purpose logic 1508.

Thus, different implementations of the processor 1500 may include: 1) a CPU with the special purpose logic 1508 being integrated graphics and/or scientific (throughput) logic (which may include one or more cores), and the cores 1502A-N being one or more general purpose cores (e.g., general purpose in-order cores, general purpose out-of-order cores, a combination of the two); 2) a coprocessor with the cores 1502A-N being a large number of special purpose cores intended primarily for graphics and/or scientific (throughput); and 3) a coprocessor with the cores 1502A-N being a large number of general purpose in-order cores. Thus, the processor 1500 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1500 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1506, and external memory (not shown) coupled to the set of integrated memory controller units 1514. The set of shared cache units 1506 may include one or more mid-level caches, such as level 2 (L2), level 3 (L3), level 4 (L4), or other levels of cache, a last level cache (LLC), and/or combinations thereof. While in one embodiment a ring based interconnect unit 1512 interconnects the integrated graphics logic 1508, the set of shared cache units 1506, and the system agent unit 1510/integrated memory controller unit(s) 1514, alternative embodiments may use any number of well-known techniques for interconnecting such units. In one embodiment, coherency is maintained between one or more cache units 1506 and cores 1502-A-N.

In some embodiments, one or more of the cores 1502A-N are capable of multi-threading. The system agent 1510 includes those components coordinating and operating cores 1502A-N. The system agent unit 1510 may include for example a power control unit (PCU) and a display unit. The PCU may be or include logic and components needed for regulating the power state of the cores 1502A-N and the integrated graphics logic 1508. The display unit is for driving one or more externally connected displays. As shown in FIG. 15, the cores 1502A-N include cache units 1504A-N, respectively.

The cores 1502A-N may be homogenous or heterogeneous in terms of architecture instruction set; that is, two or more of the cores 1502A-N may be capable of execution the same instruction set, while others may be capable of executing only a subset of that instruction set or a different instruction set.

Figure 16:
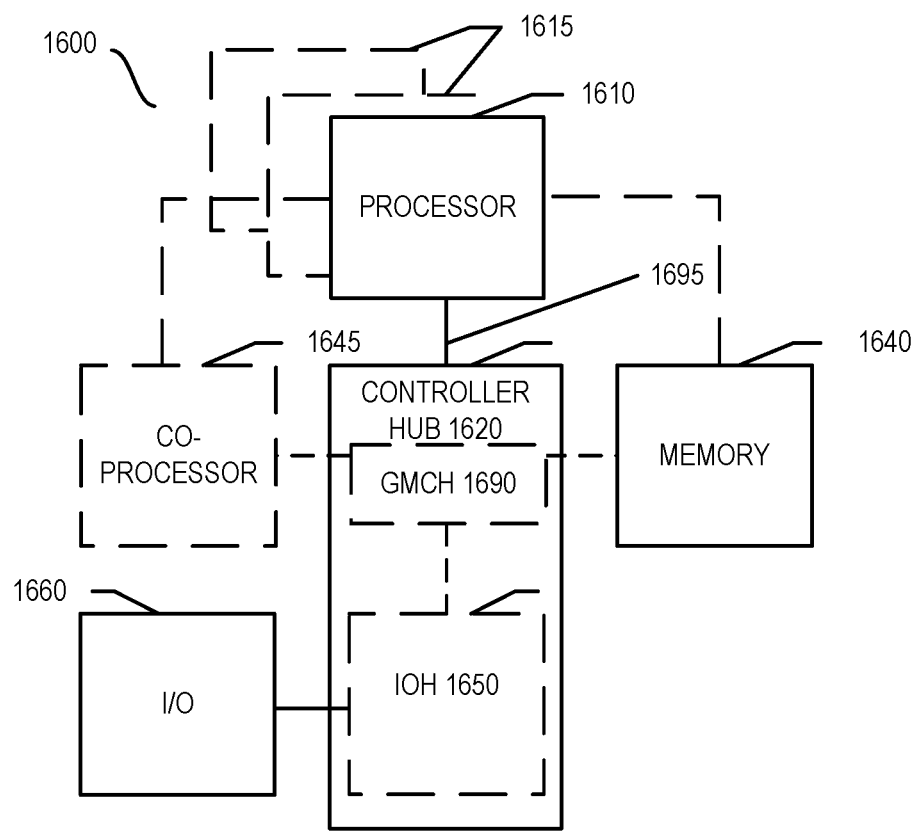

Referring now to FIG. 16, shown is a block diagram of a system 1600 in accordance with one embodiment of the present invention. The system 1600 may include one or more processors 1610, 1615, which are coupled to a controller hub 1620. In one embodiment the controller hub 1620 includes a graphics memory controller hub (GMCH) 1690 and an Input/Output Hub (IOH) 1650 (which may be on separate chips); the GMCH 1690 includes memory and graphics controllers to which are coupled memory 1640 and a coprocessor 1645; the IOH 1650 is couples input/output (I/O) devices 1660 to the GMCH 1690. Alternatively, one or both of the memory and graphics controllers are integrated within the processor (as described herein), the memory 1640 and the coprocessor 1645 are coupled directly to the processor 1610, and the controller hub 1620 in a single chip with the IOH 1650.

The optional nature of additional processors 1615 is denoted in FIG. 16 with broken lines. Each processor 1610, 1615 may include one or more of the processing cores described herein and may be some version of the processor 1500.

The memory 1640 may be, for example, dynamic random access memory (DRAM), phase change memory (PCM), or a combination of the two. For at least one embodiment, the controller hub 1620 communicates with the processor(s) 1610, 1615 via a multi-drop bus, such as a frontside bus (FSB), point-to-point interface such as QuickPath Interconnect (QPI), or similar connection 1695.

In one embodiment, the coprocessor 1645 is a special-purpose processor, such as, for example, a high-throughput MIC processor, a network or communication processor, compression engine, graphics processor, GPGPU, embedded processor, or the like. In one embodiment, controller hub 1620 may include an integrated graphics accelerator.

There can be a variety of differences between the physical resources 1610, 1615 in terms of a spectrum of metrics of merit including architectural, microarchitectural, thermal, power consumption characteristics, and the like.

In one embodiment, the processor 1610 executes instructions that control data processing operations of a general type. Embedded within the instructions may be coprocessor instructions. The processor 1610 recognizes these coprocessor instructions as being of a type that should be executed by the attached coprocessor 1645. Accordingly, the processor 1610 issues these coprocessor instructions (or control signals representing coprocessor instructions) on a coprocessor bus or other interconnect, to coprocessor 1645. Coprocessor(s) 1645 accept and execute the received coprocessor instructions.

Figure 17:
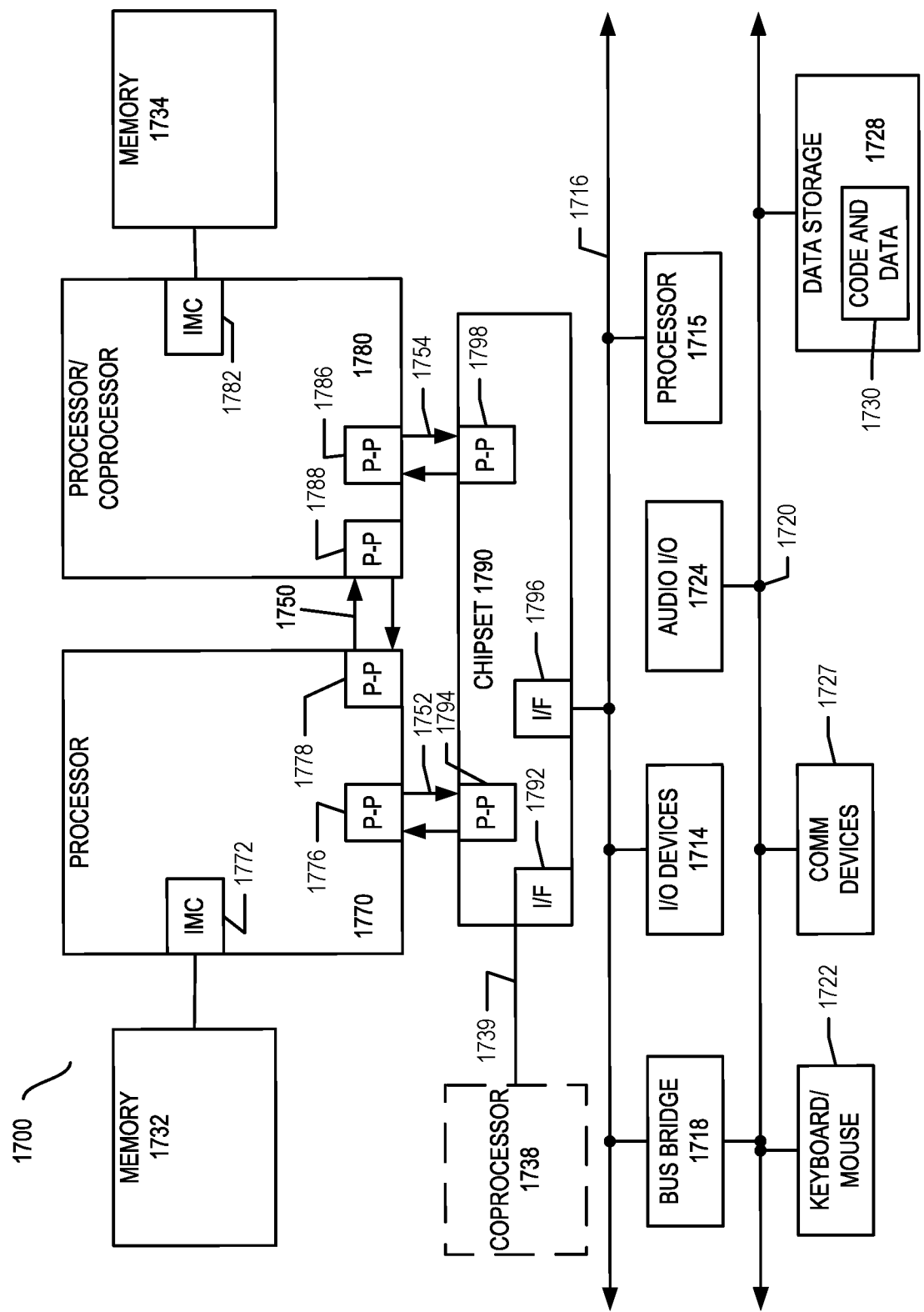

Referring now to FIG. 17, shown is a block diagram of a first more specific exemplary system 1700 in accordance with an embodiment of the present invention. As shown in FIG. 17, multiprocessor system 1700 is a point-to-point interconnect system, and includes a first processor 1770 and a second processor 1780 coupled via a point-to-point interconnect 1750. Each of processors 1770 and 1780 may be some version of the processor 1500. In one embodiment of the invention, processors 1770 and 1780 are respectively processors 1610 and 1615, while coprocessor 1738 is coprocessor 1645. In another embodiment, processors 1770 and 1780 are respectively processor 1610 coprocessor 1645.

Processors 1770 and 1780 are shown including integrated memory controller (IMC) units 1772 and 1782, respectively. Processor 1770 also includes as part of its bus controller units point-to-point (P-P) interfaces 1776 and 1778; similarly, second processor 1780 includes P-P interfaces 1786 and 1788. Processors 1770, 1780 may exchange information via a point-to-point (P-P) interface 1750 using P-P interface circuits 1778, 1788. As shown in FIG. 17, IMCs 1772 and 1782 couple the processors to respective memories, namely a memory 1732 and a memory 1734, which may be portions of main memory locally attached to the respective processors.

Processors 1770, 1780 may each exchange information with a chipset 1790 via individual P-P interfaces 1752, 1754 using point to point interface circuits 1776, 1794, 1786, 1798. Chipset 1790 may optionally exchange information with the coprocessor 1738 via a high-performance interface 1739. In one embodiment, the coprocessor 1738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1790 may be coupled to a first bus 1716 via an interface 1796. In one embodiment, first bus 1716 may be a Peripheral Component Interconnect (PCI) bus, or a bus such as a PCI Express bus or another third generation I/O interconnect bus, although the scope of the present invention is not so limited.

As shown in FIG. 17, various I/O devices 1714 may be coupled to first bus 1716, along with a bus bridge 1718 which couples first bus 1716 to a second bus 1720. In one embodiment, one or more additional processor(s) 1715, such as coprocessors, high-throughput MIC processors, GPGPU's, accelerators (such as, e.g., graphics accelerators or digital signal processing (DSP) units), field programmable gate arrays, or any other processor, are coupled to first bus 1716. In one embodiment, second bus 1720 may be a low pin count (LPC) bus. Various devices may be coupled to a second bus 1720 including, for example, a keyboard and/or mouse 1722, communication devices 1727 and a storage unit 1728 such as a disk drive or other mass storage device which may include instructions/code and data 1730, in one embodiment. Further, an audio I/O 1724 may be coupled to the second bus 1720. Note that other architectures are possible. For example, instead of the point-to-point architecture of FIG. 17, a system may implement a multi-drop bus or other such architecture.

Figure 18:
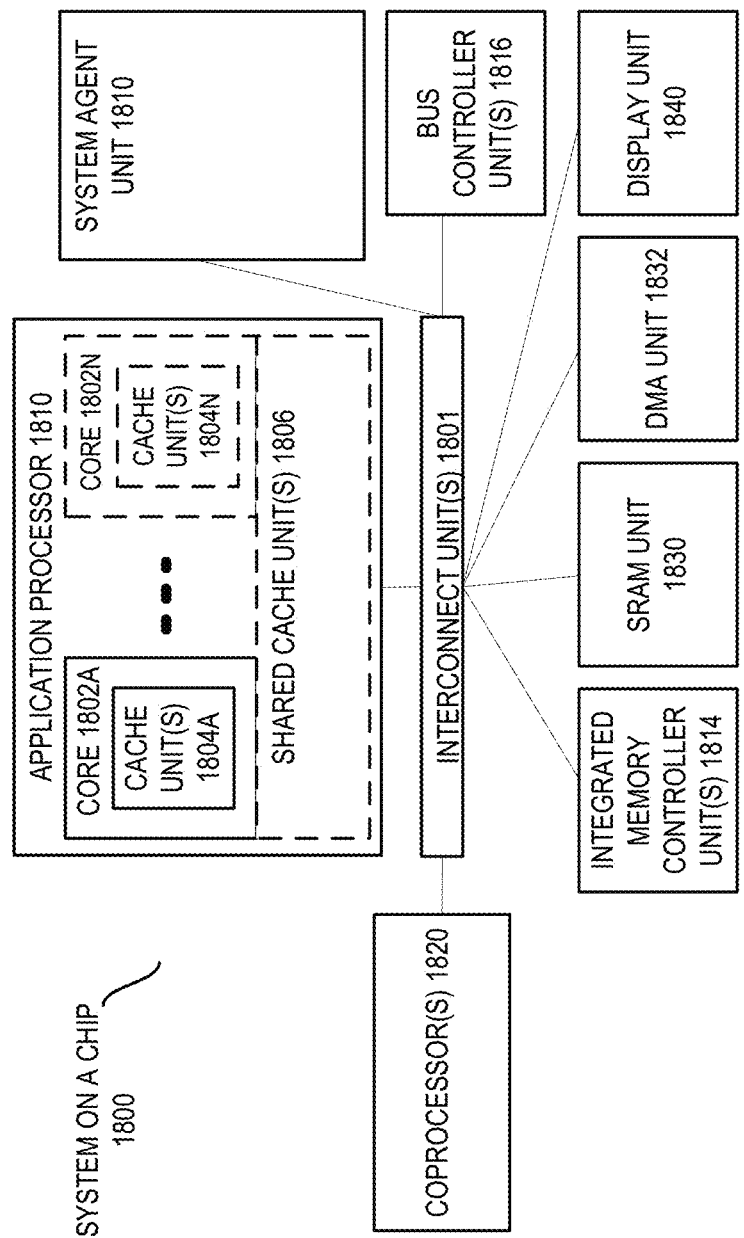

Referring now to FIG. 18, shown is a block diagram of a SoC 1800 in accordance with an embodiment of the present invention. Similar elements in FIG. 15 bear like reference numerals. Also, dashed lined boxes are optional features on more advanced SoCs. In FIG. 18, an interconnect unit(s) 1801 is coupled to: an application processor 1810 which includes a set of one or more cores 1802A-N and shared cache unit(s) 1806; a system agent unit 1810; a bus controller unit(s) 1816; an integrated memory controller unit(s) 1814; a set or one or more coprocessors 1820 which may include integrated graphics logic, an image processor, an audio processor, and a video processor; an static random access memory (SRAM) unit 1830; a direct memory access (DMA) unit 1832; and a display unit 1840 for coupling to one or more external displays. In one embodiment, the coprocessor(s) 1820 include a special-purpose processor, such as, for example, a network or communication processor, compression engine, GPGPU, a high-throughput MIC processor, embedded processor, or the like. As shown in FIG. 18, the cores 1802A-N include cache units 1804A-N, respectively.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1730 illustrated in FIG. 17, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

The flowcharts and block diagrams in the FIGURES illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or alternative orders, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing disclosure outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

As used throughout this specification, the term "processor" or "microprocessor" should be understood to include not only a traditional microprocessor (such as Intel's® industry-leading x86 and x64 architectures), but also graphics processors, matrix processors, and any ASIC, FPGA, microcontroller, digital signal processor (DSP), programmable logic device, programmable logic array (PLA), microcode, instruction set, emulated or virtual machine processor, or any similar "Turing-complete" device, combination of devices, or logic elements (hardware or software) that permit the execution of instructions.

Note also that in certain embodiments, some of the components may be omitted or consolidated. In a general sense, the arrangements depicted in the figures should be understood as logical divisions, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute instructions associated with data or microcode to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), or microcode), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor to perform the disclosed operations. A non-transitory storage medium also expressly includes a processor having stored thereon hardware-coded instructions, and optionally microcode instructions or sequences encoded in hardware, firmware, or software.

Computer program logic implementing all or part of the functionality described herein is embodied in various forms, including, but in no way limited to, hardware description language, a source code form, a computer executable form, machine instructions or microcode, programmable hardware, and various intermediate forms (for example, forms generated by an HDL processor, assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as standalone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Example Implementations

The following examples pertain to embodiments described throughout this disclosure.

One or more embodiments may include an apparatus, comprising: a log circuit, wherein the log circuit comprises circuitry to: identify, via an input register, an input associated with a logarithm operation, wherein the logarithm operation is to be performed by the log circuit using piecewise linear approximation; identify, using range selection circuitry, a first range that the input falls within, wherein the first range is identified from a plurality of ranges associated with a plurality of piecewise linear approximation (PLA) equations for the logarithm operation, and wherein the first range corresponds to a first equation of the plurality of PLA equations; obtain a plurality of operands associated with the first equation; compute, using adder-subtractor circuitry, a result of the first equation based on the plurality of operands; and return, via an output register, an output associated with the logarithm operation, wherein the output is generated based at least in part on the result of the first equation.

In one example embodiment of an apparatus, the logarithm operation is associated with an artificial neural network operation.

In one example embodiment of an apparatus: the input comprises a floating-point number, wherein the floating-point number comprises an exponent and a mantissa; and the output comprises a fixed-point number, wherein the fixed-point number comprises an integer and a fraction.

In one example embodiment of an apparatus, the plurality of operands comprises the mantissa and one or more fraction operands, wherein the one or more fraction operands each comprise a denominator that comprises a power of two.

In one example embodiment of an apparatus, the log circuit further comprises one or more shift circuits to generate the one or more fraction operands.

In one example embodiment of an apparatus, the log circuit further comprises a subtractor circuit to subtract a bias from the exponent of the floating-point number to generate an unbiased exponent.

In one example embodiment of an apparatus, the circuitry to return, via the output register, the output associated with the logarithm operation is further to: generate the integer of the fixed-point number based on the unbiased exponent; and generate the fraction of the fixed-point number based on the result of the first equation.

In one example embodiment of an apparatus, wherein the log circuit further comprises one or more multiplexers to select the plurality of operands associated with the first equation.

In one example embodiment of an apparatus, wherein the adder-subtractor circuitry is to perform one or more addition or subtraction operations on the plurality of operands.

In one example embodiment of an apparatus, the apparatus further comprises an antilog circuit, wherein the antilog circuit comprises circuitry to: identify a second input associated with an antilogarithm operation, wherein the antilogarithm operation is to be performed by the antilog circuit using piecewise linear approximation; identify a second range that the second input falls within, wherein the second range is identified from a second plurality of ranges associated with a second plurality of piecewise linear approximation (PLA) equations for the antilogarithm operation, and wherein the second range corresponds to a second equation of the second plurality of PLA equations; compute a second result of the second equation based on a second plurality of operands associated with the second equation; and generate a second output associated with the antilogarithm operation, wherein the second output is generated based at least in part on the second result of the second equation.

In one example embodiment of an apparatus, the apparatus further comprises an activation function circuit, wherein the activation function circuit comprises the log circuit and the antilog circuit, and wherein the activation function circuit further comprises circuitry to: receive an instruction to perform an activation function selected from a plurality of available activation functions, wherein the activation function comprises one or more multiplication or division operations; perform the one or more multiplication or division operations using one or more logarithm operations and one or more antilogarithm operations, wherein the one or more logarithm operations are performed using the log circuit and the one or more antilogarithm operations are performed using the antilog circuit; and generate an activation output associated with the activation function, wherein the activation output is generated based at least in part on one or more results of the one or more multiplication or division operations.

In one example embodiment of an apparatus: the activation function further comprises one or more exponent operations; and the activation function circuit further comprises an exponent circuit to perform the one or more exponent operations using piecewise linear approximation.

One or more embodiments may include a system, comprising: a memory to store information associated with an application; a processor to execute one or more instructions associated with the application; and an activation function circuit to perform a plurality of activation functions, wherein the activation function circuit comprises circuitry to: receive an instruction to perform an activation function associated with the application, wherein the activation function is selected from the plurality of activation functions, and wherein the activation function comprises one or more multiplication or division operations; perform the one or more multiplication or division operations using one or more log operations and one or more antilog operations, wherein the one or more log operations are performed by a log circuit using piecewise linear approximation, and wherein the one or more antilog operations are performed by an antilog circuit using piecewise linear approximation; and generate an output associated with the activation function, wherein the output is generated based at least in part on one or more results of the one or more multiplication or division operations.

In one example embodiment of a system, the application comprises an artificial neural network, and wherein the activation function is associated with an operation of the artificial neural network.

In one example embodiment of a system, the circuitry to perform the one or more multiplication or division operations using the one or more log operations and the one or more antilog operations is further to: perform one or more logarithm base 2 operations on one or more operands associated with the one or more multiplication or division operations, wherein the one or more logarithm base 2 operations are performed using piecewise linear approximation; perform one or more addition or subtraction operations on one or more results of the one or more logarithm base 2 operations; and perform one or more antilogarithm base 2 operations on one or more results of the one or more addition or subtraction operations, wherein the one or more antilogarithm base 2 operations are performed using piecewise linear approximation.

In one example embodiment of a system: the activation function further comprises one or more exponent operations; and the activation function circuit further comprises circuitry to perform the one or more exponent operations using piecewise linear approximation.

In one example embodiment of a system: the one or more exponent operations each comprise a base of 2; and the circuitry to perform the one or more exponent operations using piecewise linear approximation is further to perform the one or more exponent operations using one or more antilogarithm base 2 operations, wherein the one or more antilogarithm base 2 operations are performed using piecewise linear approximation.

In one example embodiment of a system, the plurality of activation functions comprises: a sigmoid function; a hyperbolic tangent function; a swish function; and a rectified linear unit function.

In one example embodiment of a system: at least one of the sigmoid function, the hyperbolic tangent function, or the swish function is defined using one or more exponent operations that exclusively comprise a base of 2; and the activation function circuit further comprises circuitry to perform the one or more exponent operations using one or more antilogarithm base 2 operations, wherein the one or more antilogarithm base 2 operations are performed using piecewise linear approximation.

One or more embodiments may include at least one machine accessible storage medium having instructions stored thereon, wherein the instructions, when executed on a machine, cause the machine to: receive, by an activation function circuit, an instruction to perform an activation function selected from a plurality of available activation functions, wherein the activation function comprises one or more multiplication or division operations; perform the one or more multiplication or division operations using one or more log operations and one or more antilog operations, wherein the one or more log operations and the one or more antilog operations are performed using piecewise linear approximation; and generate an output associated with the activation function, wherein the output is generated based at least in part on one or more results of the one or more multiplication or division operations.

In one example embodiment of a storage medium, the instructions that cause the machine to perform the one or more multiplication or division operations using the one or more log operations and the one or more antilog operations further cause the machine to: perform one or more logarithm base 2 operations on one or more operands associated with the one or more multiplication or division operations, wherein the one or more logarithm base 2 operations are performed using piecewise linear approximation; perform one or more addition or subtraction operations on one or more results of the one or more logarithm base 2 operations; and perform one or more antilogarithm base 2 operations on one or more results of the one or more addition or subtraction operations, wherein the one or more antilogarithm base 2 operations are performed using piecewise linear approximation.

In one example embodiment of a storage medium: the activation function further comprises one or more exponent operations; and the instructions further cause the machine to perform the one or more exponent operations using piecewise linear approximation.

In one example embodiment of a storage medium: at least one activation function of the plurality of available activation functions is defined using one or more exponent operations that exclusively comprise a base of 2; and the instructions further cause the machine to perform the one or more exponent operations using one or more antilogarithm base 2 operations, wherein the one or more antilogarithm base 2 operations are performed using piecewise linear approximation.

One or more embodiments may include a method, comprising: receiving, by an activation function circuit, an instruction to perform an activation function selected from a plurality of available activation functions, wherein the activation function comprises one or more multiplication or division operations; performing the one or more multiplication or division operations using one or more log operations and one or more antilog operations, wherein the one or more log operations and the one or more antilog operations are performed using piecewise linear approximation; and generating an output associated with the activation function, wherein the output is generated based at least in part on one or more results of the one or more multiplication or division operations.

In one example embodiment of a method, the method further comprises performing one or more logarithm base 2 operations on one or more operands associated with the one or more multiplication or division operations, wherein the one or more logarithm base 2 operations are performed using piecewise linear approximation; performing one or more addition or subtraction operations on one or more results of the one or more logarithm base 2 operations; and performing one or more antilogarithm base 2 operations on one or more results of the one or more addition or subtraction operations, wherein the one or more antilogarithm base 2 operations are performed using piecewise linear approximation.

What is claimed is:

1. A method for implementing a deep neural network, the method comprising:
   receiving an input vector to be processed in the deep neural network, the input vector comprising one or more floating-point input elements, the deep neural network comprising one or more hidden layers;
   converting the one or more floating-point input elements into one or more fixed-point input elements;
   inputting the one or more fixed-point input elements into the one or more hidden layers;
   computing, by the one or more hidden layers, one or more fixed-point output elements by:
       converting one or more floating-point weights of the one or more hidden layers into one or more fixed-point weights, and
       performing, in the one or more hidden layers, a convolution using the one or more fixed-point weights and the one or more fixed-point input elements;
   converting the one or more fixed-point output elements into one or more floating-point output elements; and
   generating an output of the deep neural network using the one or more floating-point output elements.

2. The method of claim 1, wherein converting the one or more floating-point input elements into the one or more fixed-point input elements comprises:

applying a logarithm base two function on the one or more floating-point input elements, the logarithm base two function outputting the one or more fixed-point input elements.

3. The method of claim 1, wherein converting the one or more fixed-point output elements into the one or more floating-point output elements comprises:
  applying an antilogarithm base two function on the one or more fixed-point output elements, the antilogarithm base two function outputting the one or more floating-point output elements.

4. The method of claim 1, wherein the one or more hidden layers comprises one or more convolutional layers, one or more pooling layers, or one or more fully connected layers.

5. The method of claim 1, wherein computing, by the one or more hidden layers, the one or more fixed-point output elements based on the one or more fixed-point input elements comprises:
  performing one or more fixed-point additions on the one or more fixed-point input elements.

6. The method of claim 1, wherein converting the one or more fixed-point output elements into the one or more floating-point output elements comprises:
  converting a fixed-point output element into a floating-point output element in one clock cycle.

7. The method of claim 1, wherein the one or more hidden layers comprises a convolutional layer and a fully connected layer, the convolution is performed in the convolutional layer, and the one or more fixed-point output elements are output from the fully connected layer.

8. One or more non-transitory computer-readable media storing instructions executable to perform operations for implementing a deep neural network, the operations comprising:
  receiving an input vector to be processed in the deep neural network, the input vector comprising one or more floating-point input elements, the deep neural network comprising one or more hidden layers;
  converting the one or more floating-point input elements into one or more fixed-point input elements;
  inputting the one or more fixed-point input elements into the one or more hidden layers;
  computing, by the one or more hidden layers, one or more fixed-point output elements by:
    converting one or more floating-point weights of the one or more hidden layers into one or more fixed-point weights, and
    performing, in the one or more hidden layers, a convolution using the one or more fixed-point weights and the one or more fixed-point input elements;
  converting the one or more fixed-point output elements into one or more floating-point output elements; and
  generating an output of the deep neural network using the one or more floating-point output elements.

9. The one or more non-transitory computer-readable media of claim 8, wherein converting the one or more floating-point input elements into the one or more fixed-point input elements comprises:
  applying a logarithm base two function on the one or more floating-point input elements, the logarithm base two function outputting the one or more fixed-point input elements.

10. The one or more non-transitory computer-readable media of claim 8, wherein converting the one or more fixed-point output elements into the one or more floating-point output elements comprises:
  applying an antilogarithm base two function on the one or more fixed-point output elements, the antilogarithm base two function outputting the one or more floating-point output elements.

11. The one or more non-transitory computer-readable media of claim 8, wherein the one or more hidden layers comprises one or more convolutional layers, one or more pooling layers, or one or more fully connected layers.

12. The one or more non-transitory computer-readable media of claim 8, wherein computing, by the one or more hidden layers, the one or more fixed-point output elements based on the one or more fixed-point input elements comprises:
  performing one or more fixed-point additions on the one or more fixed-point input elements.

13. The one or more non-transitory computer-readable media of claim 8, wherein converting the one or more fixed-point output elements into the one or more floating-point output elements comprises:
  converting a fixed-point output element into a floating-point output element in one clock cycle.

14. The one or more non-transitory computer-readable media of claim 8, wherein the one or more hidden layers comprises a convolutional layer and a fully connected layer, the convolution is performed in the convolutional layer, and the one or more fixed-point output elements are output from the fully connected layer.

15. An apparatus, comprising:
  a computer processor for executing computer program instructions; and
  a non-transitory computer-readable memory storing computer program instructions executable by the computer processor to perform operations for implementing a deep neural network, the operations comprising:
    receiving an input vector to be processed in the deep neural network, the input vector comprising one or more floating-point input elements, the deep neural network comprising one or more hidden layers,
    converting the one or more floating-point input elements into one or more fixed-point input elements,
    inputting the one or more fixed-point input elements into the one or more hidden layers,
    computing, by the one or more hidden layers, one or more fixed-point output elements by:
      converting one or more floating-point weights of the one or more hidden layers into one or more fixed-point weights, and
      performing, in the one or more hidden layers, a convolution using the one or more fixed-point weights and the one or more fixed-point input elements,
    converting the one or more fixed-point output elements into one or more floating-point output elements, and
    generating an output of the deep neural network using the one or more floating-point output elements.

16. The apparatus of claim 15, wherein converting the one or more floating-point input elements into the one or more fixed-point input elements comprises:
  applying a logarithm base two function on the one or more floating-point input elements, the logarithm base two function outputting the one or more fixed-point input elements.

17. The apparatus of claim 15, wherein converting the one or more fixed-point output elements into the one or more floating-point output elements comprises:

applying an antilogarithm base two function on the one or more fixed-point output elements, the antilogarithm base two function outputting the one or more floating-point output elements.

18. The apparatus of claim 15, wherein computing, by the one or more hidden layers, the one or more fixed-point output elements based on the one or more fixed-point input elements comprises:

performing one or more fixed-point additions on the one or more fixed-point input elements.

19. The apparatus of claim 15, wherein converting the one or more fixed-point output elements into the one or more floating-point output elements comprises:

converting a fixed-point output element into a floating-point output element in one clock cycle.

20. The apparatus of claim 15, wherein the one or more hidden layers comprises a convolutional layer and a fully connected layer, the convolution is performed in the convolutional layer, and the one or more fixed-point output elements are output from the fully connected layer.

* * * * *